(12) United States Patent
Fryman et al.

(10) Patent No.: US 12,724,614 B2
(45) Date of Patent: Sep. 1, 2026

(54) COMPUTING ARCHITECTURE

(71) Applicant: Intel Corporation, Santa Clara, CA (US)

(72) Inventors: Joshua B. Fryman, Corvallis, OR (US); Byoungchan Oh, Portland, OR (US); Sai Dheeraj Polagani, Hillsboro, OR (US); Kevin P. Ma, Beaverton, OR (US); Robert S. Pawlowski, Beaverton, OR (US); Bharadwaj Coimbatore Krishnamurthy, Hillsboro, OR (US); Shruti Sharma, Hillsboro, OR (US); Smitha P. Vasantha Kumar, Hillsboro, OR (US); Jason Howard, Portland, OR (US); Daniel S. Klowden, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 18/566,068

(22) PCT Filed: Mar. 31, 2022

(86) PCT No.: PCT/US2022/022886
§ 371 (c)(1),
(2) Date: Nov. 30, 2023

(87) PCT Pub. No.: WO2023/121700
PCT Pub. Date: Jun. 29, 2023

(65) Prior Publication Data

US 2024/0256283 A1 Aug. 1, 2024

Related U.S. Application Data

(60) Provisional application No. 63/293,590, filed on Dec. 23, 2021.

(51) Int. Cl.
*G06F 9/38* (2018.01)
*G06F 11/34* (2006.01)
*G06F 15/80* (2006.01)

(52) U.S. Cl.
CPC ........ *G06F 9/3851* (2013.01); *G06F 11/3409* (2013.01)

(58) Field of Classification Search
None
See application file for complete search history.

(56) References Cited

U.S. PATENT DOCUMENTS 10,007,549 B2 6/2018 Gottschlich et al.
10,409,763 B2 9/2019 Lai et al.
(Continued)

OTHER PUBLICATIONS

PCT International Search Report and Written Opinion issued in PCT/US2022/022886, dated Nov. 18, 2022; 13 pages.
(Continued)

*Primary Examiner* — Michael Sun
(74) *Attorney, Agent, or Firm* — Alliance IP, LLC

(57) ABSTRACT

A system is provided that includes a set of graph processing cores and a set of dense compute cores, where the set of graph processing cores and the set of dense cores are interconnected in a network. The dense compute cores include offload queue circuitry to receive an offload request from the set of graph processing cores to handle dense compute workloads. Memory controllers are also provided in the system for use by the graph processing cores in reading and writing to memory in association with sparse graph applications, the memory controllers enhanced to efficiently handle memory transactions in sparse graph applications.

25 Claims, 40 Drawing Sheets

(56) References Cited

U.S. PATENT DOCUMENTS

| | | | |
|---|---|---|---|
| 10,768,997 | B2 | 9/2020 | Agarwal et al. |
| 10,871,950 | B2 * | 12/2020 | De Smet ............. G06F 16/9024 |
| 11,016,776 | B2 * | 5/2021 | Han .................... G06F 9/30145 |
| 11,080,046 | B2 | 8/2021 | Kaul et al. |
| 11,294,815 | B2 * | 4/2022 | Kreinin ................. G06F 9/3001 |
| 2011/0302559 | A1 | 12/2011 | Naik |
| 2015/0263991 | A1 * | 9/2015 | Macchiano ........... H04L 49/118 370/400 |
| 2016/0364578 | A1 * | 12/2016 | Karn ................... G06F 21/6209 |
| 2018/0018199 | A1 | 1/2018 | Innes et al. |
| 2019/0278639 | A1 | 9/2019 | Colmone et al. |
| 2019/0347125 | A1 * | 11/2019 | Sankaran ............ G06F 9/30036 |
| 2020/0160181 | A1 * | 5/2020 | Zlateski ................... G06N 3/08 |
| 2020/0319914 | A1 | 10/2020 | Wu et al. |
| 2020/0409709 | A1 | 12/2020 | ChoFleming et al. |
| 2020/0409751 | A1 * | 12/2020 | Ould-Ahmed-Vall ....................... G06F 9/4881 |
| 2021/0055934 | A1 | 2/2021 | Sodani et al. |

OTHER PUBLICATIONS

EPO European Extended Search Report in EP Application Serial No. 22912177.7 mailed on Nov. 13, 2025, 11 pages.

Aananthakrishnan, Sriram, et al. "The Intel Programmable and Integrated Unified Memory Architecture Graph Analytics Processor." IEEE Micro, vol. 43, No. 5, Sep. 2023, pp. 78-87. IEEE Xplore, https://doi.org/10.1109/MM.2023.3295848.

India Patent Office; Office Action issued in IN Patent Application No. 202347086365, dated Feb. 10, 2026; 10 pages including partial English translation.

Shi, Feng, et al. "VersaGNN: A Versatile Accelerator for Graph Neural Networks." arXiv:2105.01280, arXiv, May 4, 2021. arXiv.org, https://doi.org/10.48550/arXiv.2105.01280, 13 pages.

Weng, Jian, et al. "A Hybrid Systolic-Dataflow Architecture for Inductive Matrix Algorithms." 2020 IEEE International Symposium on High Performance Computer Architecture (HPCA), 2020, pp. 703-716. IEEE Xplore, https://doi.org/10.1109/HPCA47549.2020.00063.

* cited by examiner

350

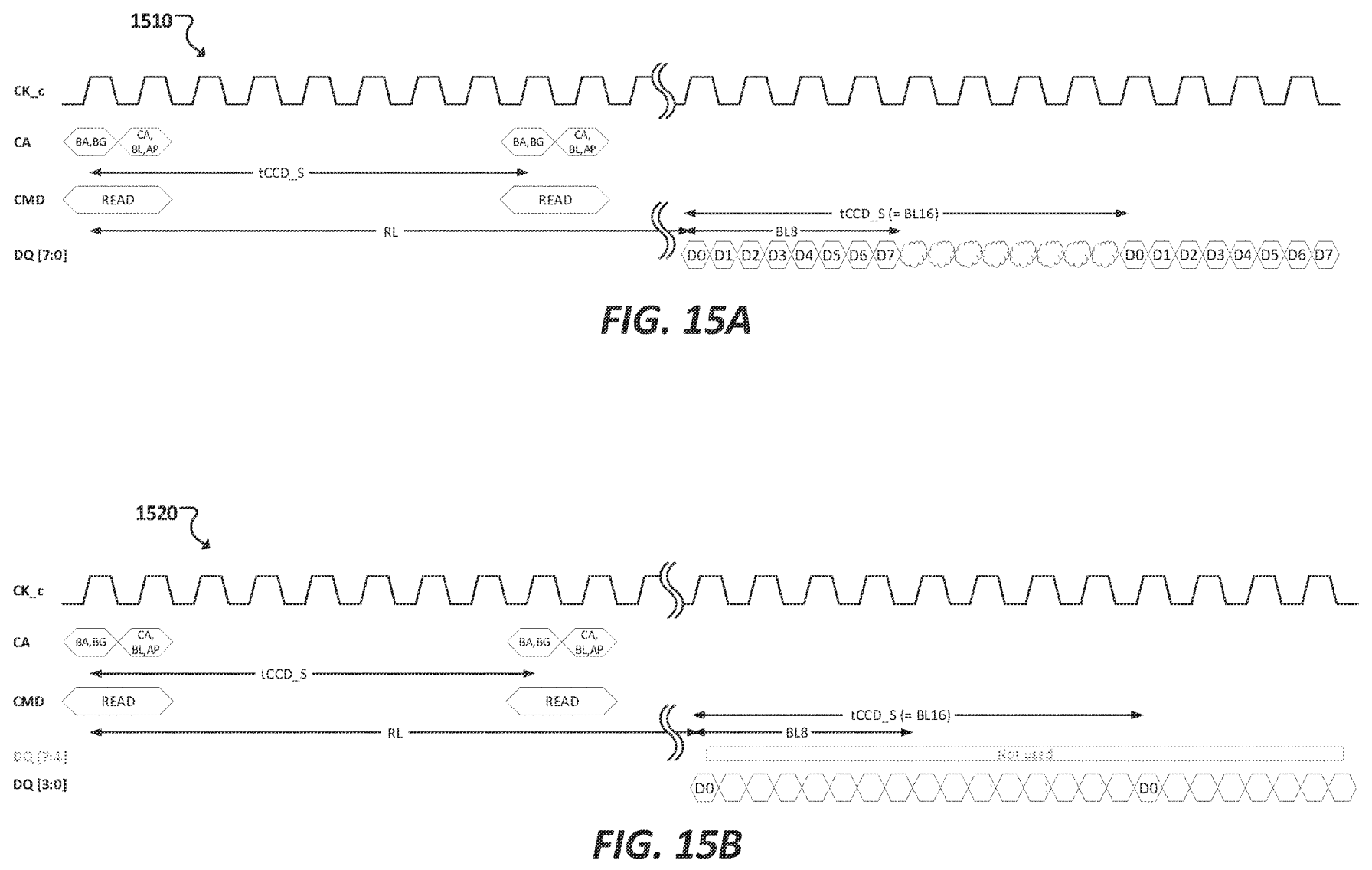

1510

CK_c
CA
CMD
DQ [7:0]

BA,BG
CA, BL,AP
READ
tCCD_S
RL
BL8
tCCD_S (= BL16)
D0 D1 D2 D3 D4 D5 D6 D7
D0 D1 D2 D3 D4 D5 D6 D7

CK_c
CA
CMD
DQ [7:4]
DQ [3:0]

BA,BG
CA, BL,AP
READ
tCCD_S
RL
BL8
tCCD_S (= BL16)
Not used
D0
D0

FIG. 15B

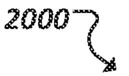
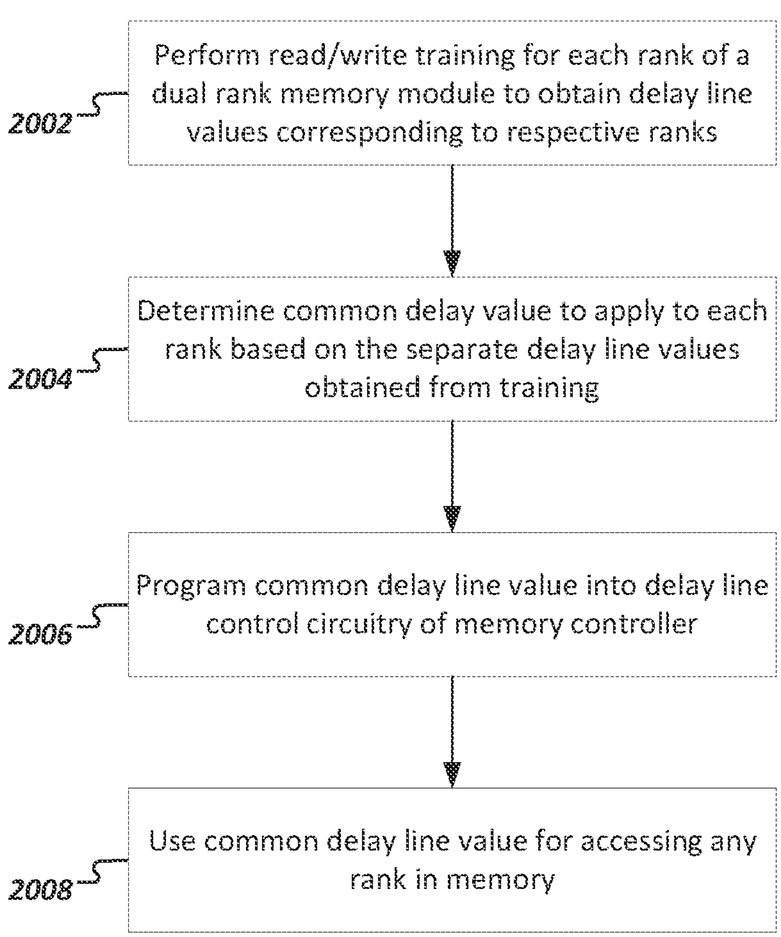
FIG. 20

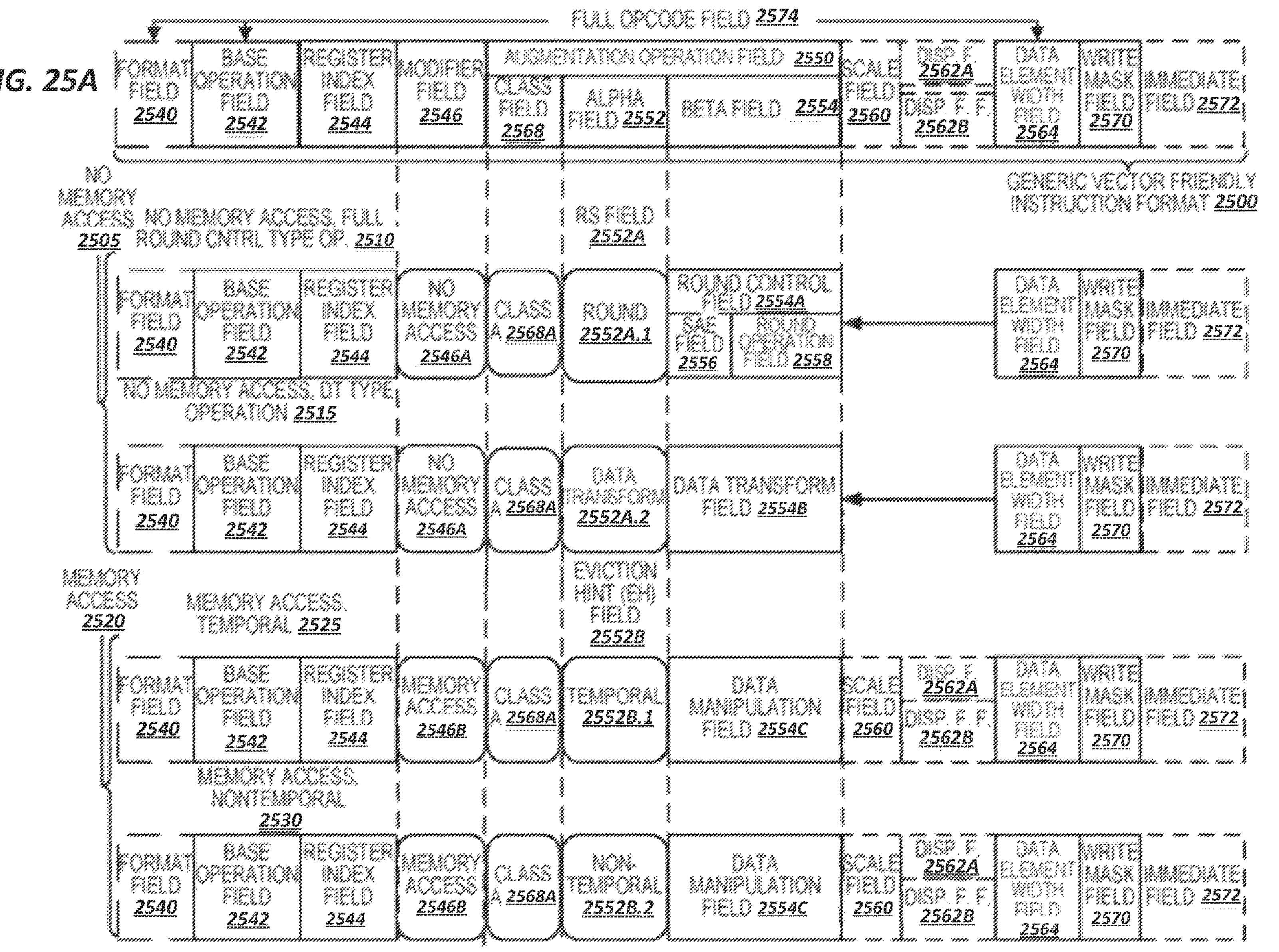
FIG. 25A
FULL OPCODE FIELD 2574
FORMAT FIELD 2540
BASE OPERATION FIELD 2542
REGISTER INDEX FIELD 2544
MODIFIER FIELD 2546
AUGMENTATION OPERATION FIELD 2550
CLASS FIELD 2568
ALPHA FIELD 2552
BETA FIELD 2554
SCALE FIELD 2560
DISP. F. 2562A
DISP. F. F. 2562B
DATA ELEMENT WIDTH FIELD 2564
WRITE MASK FIELD 2570
IMMEDIATE FIELD 2572
GENERIC VECTOR FRIENDLY INSTRUCTION FORMAT 2500
NO MEMORY ACCESS 2505
NO MEMORY ACCESS, FULL ROUND CNTRL TYPE OP. 2510
RS FIELD 2552A
NO MEMORY ACCESS 2546A
CLASS A 2568A
ROUND 2552A.1
ROUND CONTROL FIELD 2554A
SAE FIELD 2556
ROUND OPERATION FIELD 2558
NO MEMORY ACCESS, DT TYPE OPERATION 2515
DATA TRANSFORM 2552A.2
DATA TRANSFORM FIELD 2554B
MEMORY ACCESS 2520
MEMORY ACCESS, TEMPORAL 2525
EVICTION HINT (EH) FIELD 2552B
MEMORY ACCESS 2546B
TEMPORAL 2552B.1
DATA MANIPULATION FIELD 2554C
MEMORY ACCESS, NONTEMPORAL 2530
NON-TEMPORAL 2552B.2

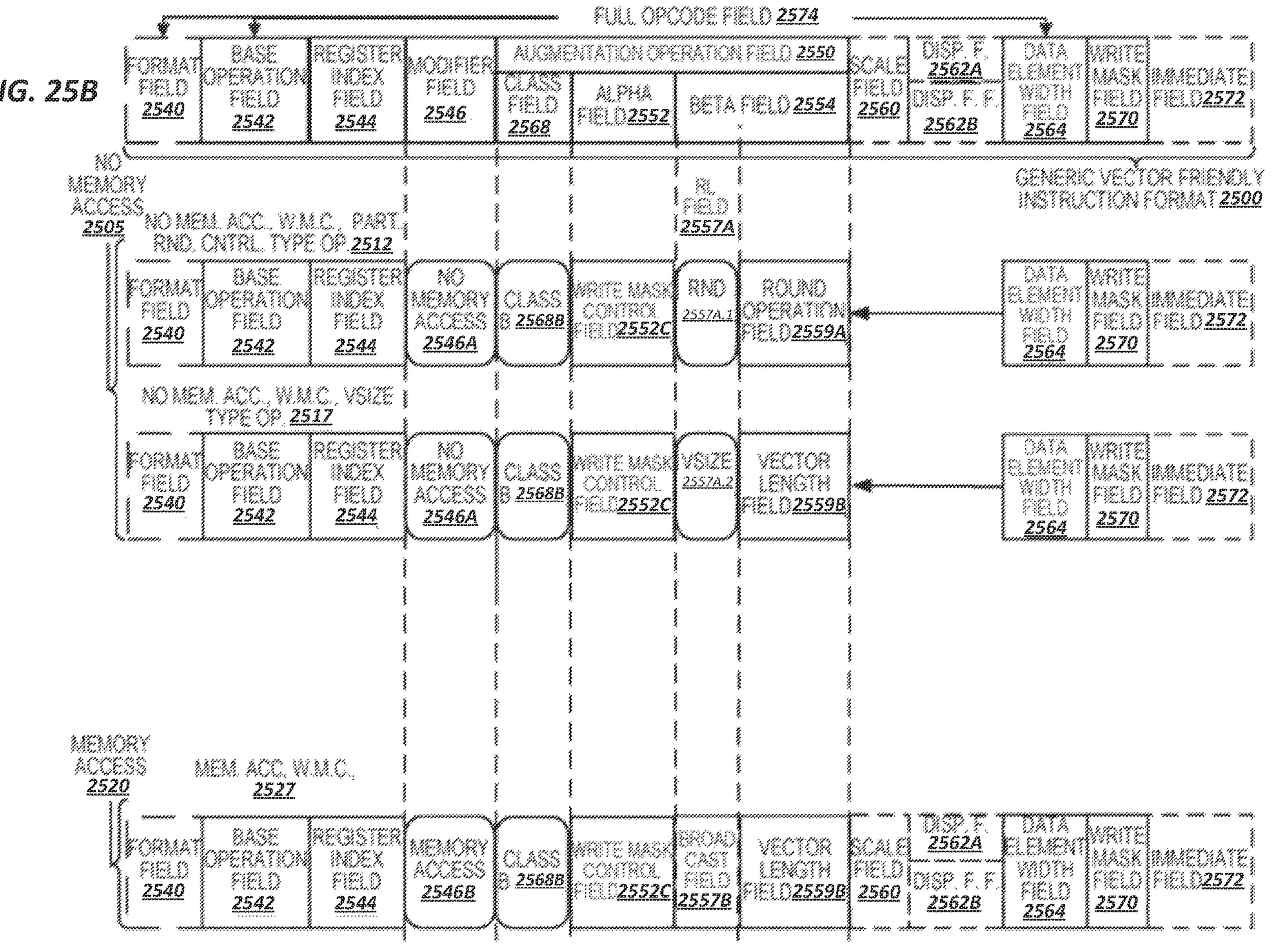
FIG. 25B
FULL OPCODE FIELD 2574
FORMAT FIELD 2540
BASE OPERATION FIELD 2542
REGISTER INDEX FIELD 2544
MODIFIER FIELD 2546
AUGMENTATION OPERATION FIELD 2550
CLASS FIELD 2568
ALPHA FIELD 2552
BETA FIELD 2554
SCALE FIELD 2560
DISP. F. 2562A
DISP. F. F. 2562B
DATA ELEMENT WIDTH FIELD 2564
WRITE MASK FIELD 2570
IMMEDIATE FIELD 2572
GENERIC VECTOR FRIENDLY INSTRUCTION FORMAT 2500
NO MEMORY ACCESS 2505
NO MEM. ACC., W.M.C., PART. RND. CNTRL. TYPE OP 2512
RL FIELD 2557A
NO MEMORY ACCESS 2546A
CLASS B 2568B
WRITE MASK CONTROL FIELD 2552C
RND 2557A.1
ROUND OPERATION FIELD 2559A
NO MEM. ACC., W.M.C., VSIZE TYPE OP. 2517
VSIZE 2557A.2
VECTOR LENGTH FIELD 2559B
MEMORY ACCESS 2520
MEM. ACC. W.M.C. 2527
MEMORY ACCESS 2546B
BROAD CAST FIELD 2557B

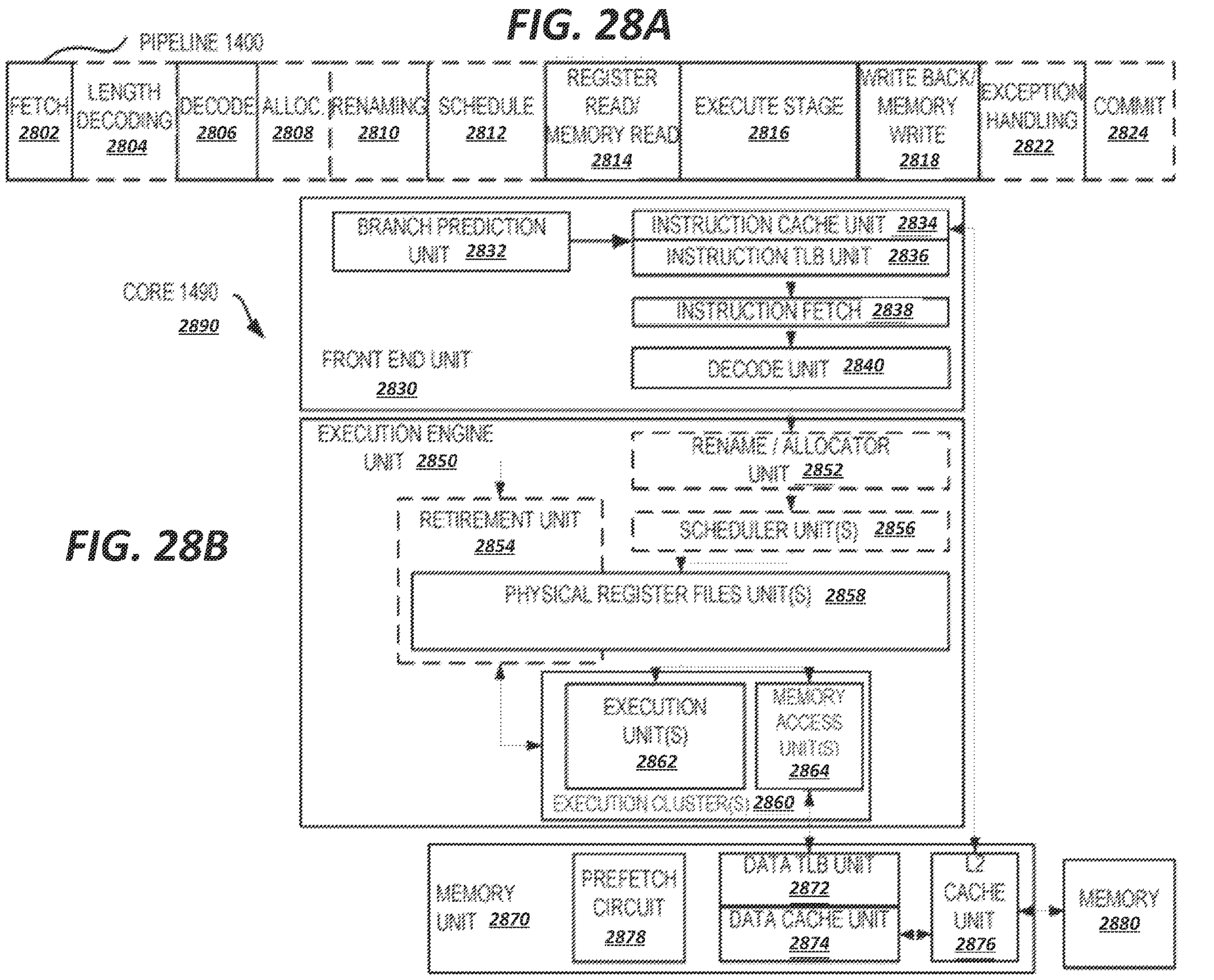
FIG. 28A
PIPELINE 1400
FETCH 2802
LENGTH DECODING 2804
DECODE 2806
ALLOC. 2808
RENAMING 2810
SCHEDULE 2812
REGISTER READ/ MEMORY READ 2814
EXECUTE STAGE 2816
WRITE BACK/ MEMORY WRITE 2818
EXCEPTION HANDLING 2822
COMMIT 2824
CORE 1490
2890
FIG. 28B
BRANCH PREDICTION UNIT 2832
INSTRUCTION CACHE UNIT 2834
INSTRUCTION TLB UNIT 2836
INSTRUCTION FETCH 2838
DECODE UNIT 2840
FRONT END UNIT 2830
EXECUTION ENGINE UNIT 2850
RENAME / ALLOCATOR UNIT 2852
RETIREMENT UNIT 2854
SCHEDULER UNIT(S) 2856
PHYSICAL REGISTER FILES UNIT(S) 2858
EXECUTION UNIT(S) 2862
MEMORY ACCESS UNIT(S) 2864
EXECUTION CLUSTER(S) 2860
MEMORY UNIT 2870
PREFETCH CIRCUIT 2878
DATA TLB UNIT 2872
DATA CACHE UNIT 2874
L2 CACHE UNIT 2876
MEMORY 2880

COMPUTING ARCHITECTURE

RELATED APPLICATIONS

This application is a national phase filing under 35 U.S.C. § 371 of PCT International Patent Application Serial No. PCT/US2022/022886, filed on Mar. 31, 2022, and entitled, "COMPUTING ARCHITECTURE," which application claims benefit to U.S. Provisional Patent Application Ser. No. 63/293,590, filed Dec. 23, 2021, and incorporated by reference herein in its entirety.

STATEMENT REGARDING FEDERALLY SPONSORED RESEARCH AND DEVELOPMENT

This invention was made with Government support under Agreement No. HR0011-17-3-0004, awarded by DARPA. The Government has certain rights in the invention.

FIELD

The present disclosure relates in general to the field of computer architecture, and more specifically, to specialized multi-threaded computer architectures

BACKGROUND

A datacenter may include one or more platforms each including at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications.

BRIEF DESCRIPTION OF THE DRAWINGS

FIGS. 15A-15B illustrate example signal timing diagrams for memory systems that provide 8-byte memory access at half bandwidth.

FIG. 20 is a flow diagram of an example process of using a common delay line value for accessing any rank in memory.

FIG. 25A is a block diagram illustrating a generic vector friendly instruction format and class A instruction templates thereof.

FIG. 25B is a block diagram illustrating the generic vector friendly instruction format and class B instruction templates thereof.

FIG. 28A is a block diagram illustrating both an exemplary in-order pipeline and an exemplary register renaming, out-of-order issue/execution pipeline.

FIG. 28B is a block diagram illustrating both an exemplary embodiment of an in-order architecture core and an exemplary register renaming, out-of-order issue/execution architecture core to be included in a processor.

Like reference numbers and designations in the various drawings indicate like elements.

DETAILED DESCRIPTION

Figure 1:
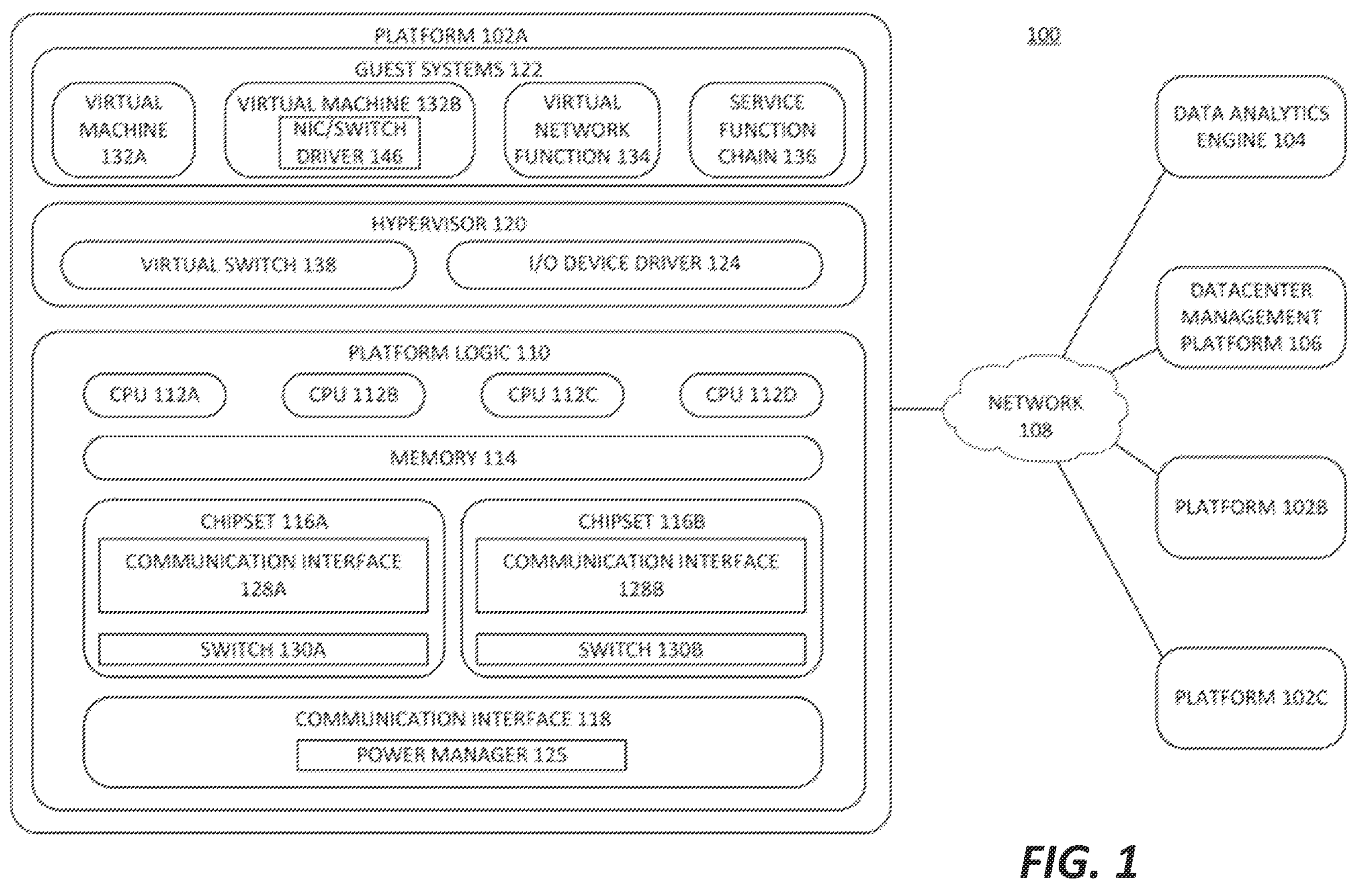
FIG. 1 illustrates a block diagram of components of an example datacenter.

FIG. 1 illustrates a block diagram of components of a datacenter 100 in accordance with certain embodiments. In the embodiment depicted, datacenter 100 includes a plurality of platforms 102 (e.g., 102A, 102B, 102C, etc.), data analytics engine 104, and datacenter management platform 106 coupled together through network 108. A platform 102 may include platform logic 110 with one or more central processing units (CPUs) 112 (e.g., 112A, 112B, 112C, 112D), memories 114 (which may include any number of different modules), chipsets 116 (e.g., 116A, 116B), communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

Each platform 102 may include platform logic 110. Platform logic 110 includes, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that includes multiple platforms coupled together through network 108 (which may include, e.g., a rack or backplane switch).

CPUs 112 may each include any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removably coupled to platform 102. CPU 112 is described in further detail below in connection with FIG. 4. Although four CPUs are shown, a platform 102 may include any suitable number of CPUs.

Memory 114 may include any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also include storage for instructions that may be executed by the cores of CPUs 112 or other processing elements (e.g., logic resident on chipsets 116) to provide functionality associated with components of platform logic 110. Additionally or alternatively, chipsets 116 may each include memory that may have any of the characteristics described herein with respect to memory 114. Memory 114 may also store the results and/or intermediate results of the various calculations and determinations performed by CPUs 112 or processing elements on chipsets 116. In various embodiments, memory 114 may include one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 including any suitable logic to support the operation of the CPUs 112. In some cases, chipsets 116 may be implementations of graph processing devices, such as discussed herein. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via one or more integrated I/O controllers resident on each CPU.

Chipsets 116 may each include one or more communication interfaces 128 (e.g., 128A, 128B). Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130 (e.g., 130A, 130B)) and another device coupled to network 108. In some embodiments, network 108 may include a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (i.e., software) switch.

Platform logic 110 may include an additional communication interface 118. Similar to communication interface 128, this additional communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 includes one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may include a processor core interrupt; a request to instantiate a software component, such as an I/O device driver 124 or virtual machine 132 (e.g., 132A, 132B); a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may include a single virtual machine (e.g., virtual machine 132A or 132B) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132B may be paravirtualized. For example, the virtual machine 132B may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may include a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining 136 may provide the ability to define an ordered list of network services (e.g. firewalls, load balancers) that are stitched together in the network to create a service chain.

A hypervisor 120 (also known as a virtual machine monitor) may include logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may include a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may include a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may include any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can include any number of hardware or software elements coupled to (and in communication with) each other through a communications medium. In various embodiments, guest systems 122 may communicate with nodes that are external to the datacenter 100 through network 108.

Current practices in data analytics and artificial intelligence perform tasks such as object classification on unending streams of data. Computing infrastructure for classification is predominantly oriented toward "dense" compute, such as matrix computations. The continuing exponential growth in generated data has shifted some compute to be offloaded to GPUs and other application-focused accelerators across multiple domains that are dense-compute dominated. However, the next step in the evolution in both artificial intelligence (AI), machine learning, and data analytics is reasoning about the relationships between these classified objects. In some implementations, a graph structure (or data structure) may be defined and utilized to define relationships between classified objects. For instance, determining the relationships between entities in a graph is the basis of graph analytics. Graph analytics poses important challenges on existing processor architectures due to its sparse structure.

High-performance large scale graph analytics is essential to timely analyze relationships in big data sets. The combination of low performance and very large graph sizes has traditionally limited the usability of graph analytics. Indeed, conventional processor architectures suffer from inefficient resource usage and bad scaling on graph workloads. Recognizing both the increasing importance of graph analytics and the need for vastly improved sparse computation performance compared to traditional approaches, an improved system architecture is presented herein that is adapted to performing high-performance graph processing by addressing constraints across the network, memory, and compute architectures that typically limit performance on graph workloads.

Figure 2A:
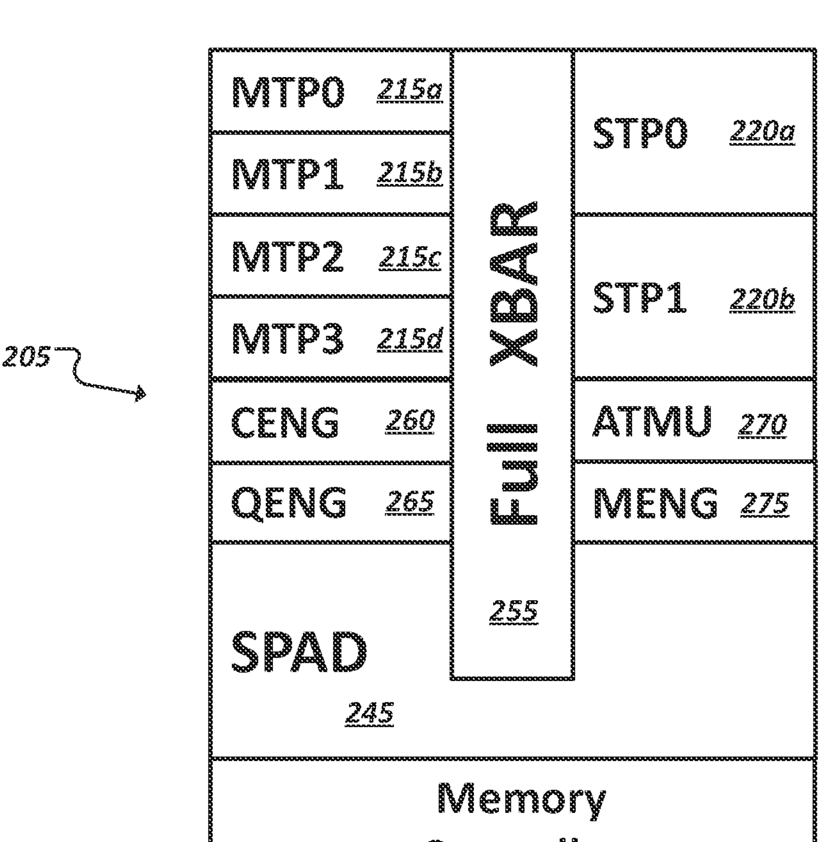
FIG. 2A is a simplified block diagram illustrating an example graph processing core.

FIG. 2A is a simplified block diagram 200*a* representing the general architecture of an example graph processing core 205. While a graph processing core 205, as discussed herein, may be particularly adept, at an architectural level, at handling workloads to implement graph-based algorithms, it should be appreciated that the architecture of a graph processing core 205 may handle any program developed to utilize its architecture and instruction set, including programs entirely unrelated to graph processing. Indeed, a graph processing core (e.g., 205) may adopt an architecture configured to provide massive multithreading and enhanced memory efficiency to minimize latency to memory and hide remaining latency to memory. Indeed, the high input/output (I/O) and memory bandwidth of the architecture enable the graph processing core 205 to be deployed in a variety of applications where memory efficiency is at a premium and memory bandwidth requirements made by the application are prohibitively demanding to traditional processor architectures. Further, the architecture of the graph processing core 205 may realize this enhanced memory efficiency by granularizing its memory accesses in relatively small, fixed chunks (e.g., 8B random access memory), equipping the cores with networking capabilities optimized for corresponding small transactions, and providing extensive multithreading.

In the example of FIG. 2A, an example graph processing core 205 may include a number of multi-threaded pipelines or cores (MTCs) (e.g., 215*a-d*) and a number single-threaded pipelines or cores (e.g., 220*a-b*). In some implementations, the MTCs and STCs may architecturally the same, but for the ability of the MTCs to support multiple concurrent thread and switching between these threads. For instance, respective MTC and STC may have 32 registers per thread, all state address map, and utilize a common instruction set architecture (ISA). In one example, the pipeline/core ISAs may be Reduced Instruction Set Computer (RISC)-based, fixed length instructions.

In one example, respective MTC (e.g., 215*a-d*) may support sixteen threads with only minimal interrupt handling. For instance, each thread in an MTC may execute a portion of a respective instruction, with the MTC switching between the active threads automatically or opportunistically (e.g., switch from executing one thread to the next in response to a load operation by the first thread so as to effectively hide the latency of the load operation (allowing the other thread or threads to operate during the cycles needed for the load operation to complete), among other examples). An MTC thread may be required to finishing executing its respective instruction before taking on another. In some implementations, the MTCs may adopt a barrel model, among other features or designs. STC's may execute a single thread at a time and may support full interrupt handling. Portions of a workload handled by a graph processing core 205 may be divided not only between the MTCs (e.g., with sixteen threads per MTC), but also between the MTCs 215*a-d* and STCs 220*a-b*. For instance, STCs 220*a-b* may be optimized for various types of operations (e.g., load-store forwarding, branch predictions, etc.) and programs may make use of STCs for some operations and the multithreading capabilities of the MTCs for other instructions.

An example graph processing core 205 may include additional circuitry to implement components such as a scratchpad 245, uncore, and memory controller (e.g., 250). Components of the graph processing core 205 may be interconnected via a crossbar interconnect (e.g., a full crossbar 255) that ties all components in the graph processing core 205 together in a low latency, high bandwidth network. The memory controller 250 may be implemented as a narrow channel memory controller, for instance, supporting a narrow, fixed 8-byte memory channel. Data pulled using the memory controller from memory in the system may be loaded into a scratchpad memory region 245 for use by other components of the graph processing core 205. In one example, the scratchpad may provide 2 MB of scratchpad memory per core (e.g., MTC and STC) and provide dual network ports (e.g., via 1 MB regions).

In some implementations, an uncore region of a graph processing core 205 may be equipped with enhanced functionality to allow the MTCs 215*a-d* and STCs 220*a-b* to handle exclusively substantive, algorithmic workloads, with supporting work handled by the enhanced uncore, including synchronization, communication, and data movement/migration. The uncore may perform a variety of tasks including copy and merge operations, reductions, gathers/scatters, packs/unpacks, in-flight matrix transposes, advanced atomics, hardware collectives, reductions in parallel prefixes, hardware queuing engines, and so on. The ISA of the uncore can come from the pipelines' (MTCs and STCs) synchronous execution. In one example, the uncore may include components such as a collective engine 260, a queue engine 265, an atomic engine 270, and memory engine 275, among other example components and corresponding logic. An example memory engine 275 may provide an internal DMA engine for the architecture. The queue engine 265 can orchestrate and queue messaging within the architecture, with messages optimized in terms of (reduced) size to enable very fast messaging within the architecture. An example collective engine 260 may handle various collective operations for the architecture, including reductions, barriers, scatters, gathers, broadcasts, etc. The atomic engine 270 may handle any memory controller lock scenarios impacting the memory controller 250, among other example functionality.

Figure 2B:
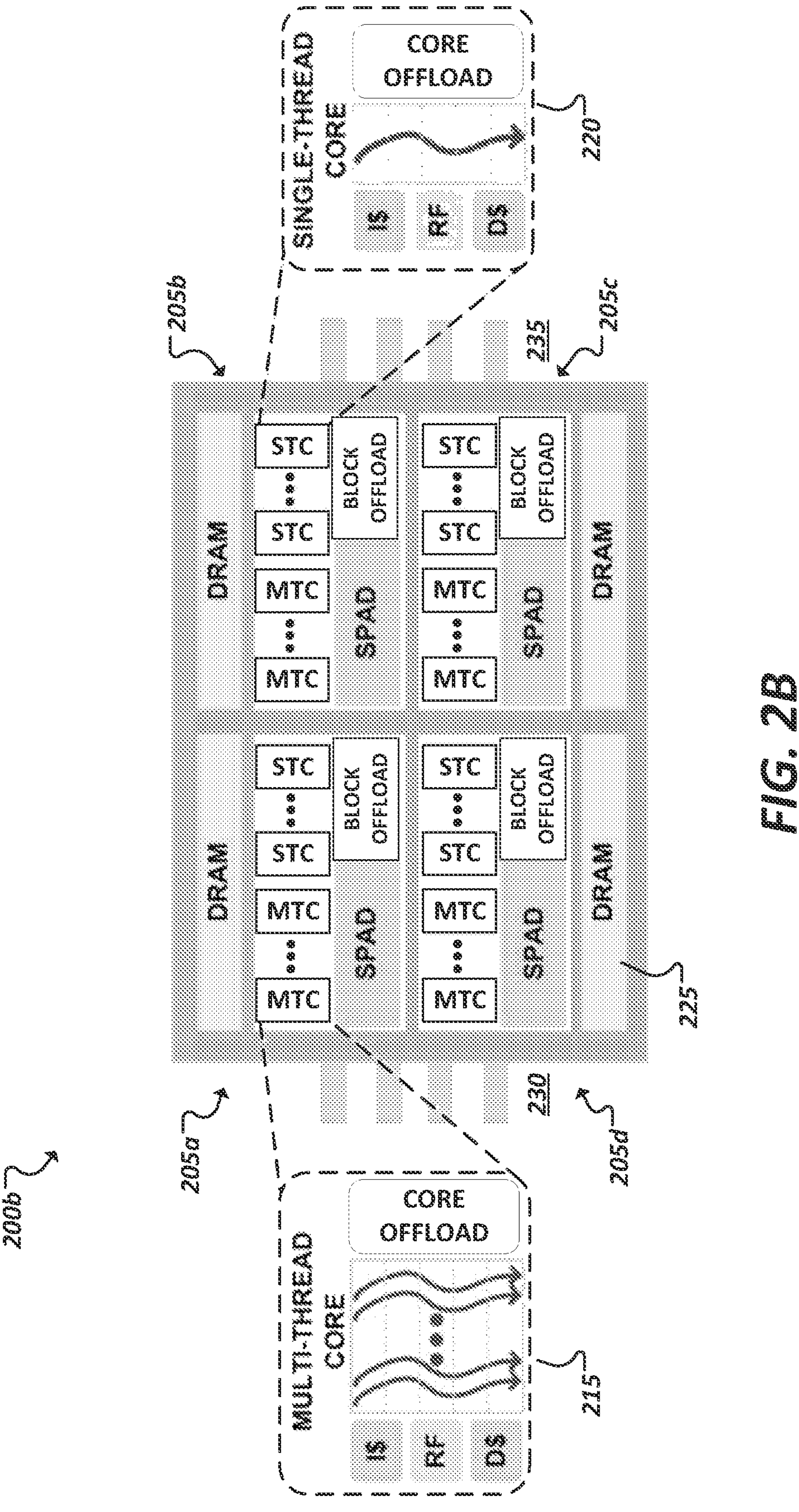
FIG. 2B is a simplified block diagram illustrating an example graph processing device.

FIG. 2B is a simplified block diagram illustrating an example system 200*b* with a set of graph processing cores 205*a-d*. A graph processing node may include a respective graph processing core (e.g., 205*a-d*) and a corresponding memory (e.g., dynamic random access memory (DRAM) (e.g., 225)). Each node may include a respective graph processing core (e.g., 205), which includes a set of MTCs (e.g., 215) as well as a set of single-thread cores (STCs) (e.g., 220), such as in the example graph processing core 205 illustrated and described above in the example of FIG. 2A. In one example, multiple graph processing nodes may be incorporated in or mounted on the same package or board and interconnected via a high-radix (e.g., multiple (e.g., >3) ports per connection), low-diameter (e.g., of 3 or less) network. The example system 200 may further include interconnect ports (e.g., 230, 235) to enable the system 200 to be coupled to other computing elements including other types of processing units (e.g., central processing units (CPUs), graphical processing units (GPUs), tensor processing units (TPUs), etc. In some cases, a graph processing chip, chiplet, board, or device (e.g., system 200) may be coupled to other graph processing devices (e.g., additional instances of the same type of graph processing system (e.g., 200). In some implementations, interconnects 230, 235 may be utilized to couple to other memory devices, allowing this external memory and local DRAM (e.g., 225) to function as shared system memory of the graph processing nodes for use by graph processing cores and other logic of the graph processing nodes, among other examples.

Figure 3A:
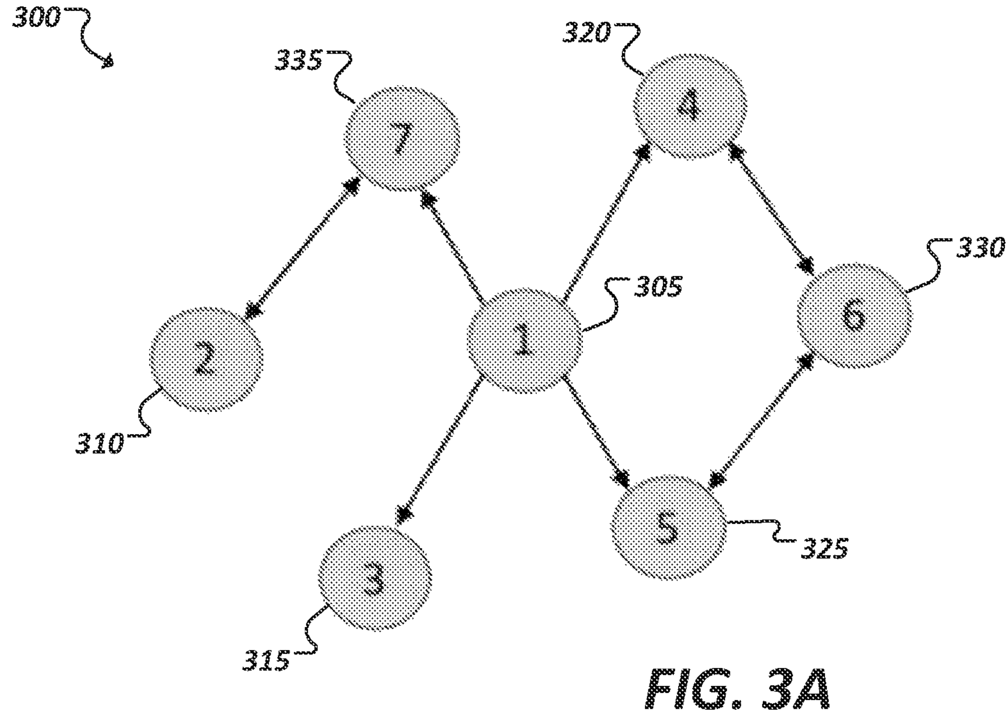
FIG. 3A is a simplified block diagram illustrating a simplified example of a graph structure.
Figure 3B:
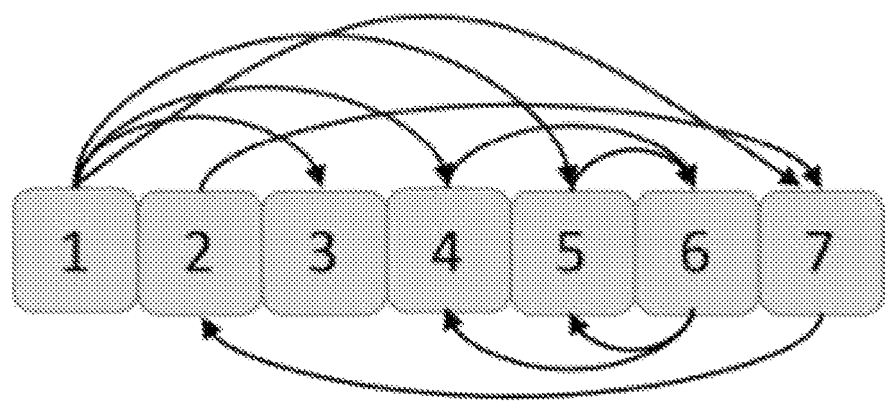
FIG. 3B is a simplified block diagram illustrating a representation of an example access stream using an example graph structure.

FIG. 3A is a simplified representation of an example graph structure 300. The graph structure may be composed of multiple interconnected nodes (e.g., 305, 310, 315, 320, 325, 330, 335). An edge is defined by the interface between one graph node and respective neighboring graph node. Each node may be connected to one or more other nodes in the graph. The sparseness of graph data structures leads to scattered and irregular memory accesses and communication, challenging the decades-long optimizations made in traditional dense compute solutions. As an example, consider the common case of pushing data along the graph edges (e.g., with reference to the simplified graph 300 example of FIG. 3A). All vertices initially store a value locally and then proceed to add their value to all neighbors along outgoing edges. This basic computation is ubiquitous in graph algorithms. FIG. 3B illustrates a representation 350 of an example access stream (e.g., from node 1 (305)), which illustrates the irregularity and lack of locality in such operations, making conventional prefetching and caching effectively useless.

More generally, graph algorithms face several major scalability challenges on traditional CPU and GPU architectures, because of the irregularity and sparsity of graph structures. For instance, in traditional cache-based processor architectures, which utilize prefetching, the execution of graph applications may suffer from inefficient cache and bandwidth utilization. Due to the sparsity of graph structures, caches used in such applications are thrashed with single-use sparse accesses and useless prefetches where most (e.g., 64 byte) memory fetches contain only a small amount (e.g., 8-bytes out of 64) of useful data. Further, overprovisioning memory bandwidth and/or cache space to cope with sparsity is inefficient in terms of power consumption, chip area and I/O pin count.

Further analysis of graph algorithms shows additional problems in optimizing performance. For instance, in the execution of graph algorithms, the computations may be irregular in character-they exhibit skewed compute time distributions, encounter frequent control flow instructions, and perform many memory accesses. For instance, for an example graph-based link analysis algorithm for a search engine, the compute time for a vertex in the algorithm is proportional to the number of outgoing edges (degree) of that vertex. Graphs such as the one illustrated in FIG. 3A may have skewed degree distributions, and thus the work per vertex has a high variance, leading to significant load imbalance. Graph applications may be heavy on branches and memory operations. Furthermore, conditional branches are often data dependent, e.g., checking the degree or certain properties of vertices, leading to irregular and therefore hard to predict branch outcomes. Together with the high cache miss rates caused by the sparse accesses, conventional performance oriented out-of-order processors are largely underutilized: most of the time they are stalled on cache misses, while a large part of the speculative resources is wasted due to branch mispredictions.

As additional example shortcomings of conventional computing architectures' availability to handle graph processing, graph algorithms require frequent fine- and coarse-grained synchronization. For example, fine-grained synchronizations (e.g., atomics) may be required in a graph algorithm to prevent race conditions when pushing values along edges. Synchronization instructions that resolve in the cache hierarchy place a large stress on the cache coherency mechanisms for multi-socket systems, and all synchronizations incur long round-trip latencies on multi-node systems. Additionally, the sparse memory accesses result in even more memory traffic for synchronizations due to false sharing in the cache coherency system. Coarse-grained synchronizations (e.g., system-wide barriers and prefix scans) fence the already-challenging computations in graph algorithms. These synchronizations have diverse uses including resource coordination, dynamic load balancing, and the aggregation of partial results. These synchronizations can dominate execution time on large-scale systems due to high network latencies and imbalanced computation.

Additionally, current commercial graph databases may be quite large (e.g., exceed 20 TB as an in-memory representation). Such large problems may exceed the capabilities of even a rack of computational nodes of any type, which requires a large-scale multi-node platform to even house the graph's working set. When combined with the prior observations—poor memory hierarchy utilization, high control flow changes, frequent memory references, and abundant synchronizations—reducing the latency to access remote data is a challenge, combined with latency hiding techniques in the processing elements, among other example considerations. Traditional architectures and their limitations in being able to effectively handle graph algorithms extends beyond CPUs to include traditional GPU-sparse accesses prevent memory coalescing, branches cause thread divergence and synchronization limits thread progress. While GPUs may have more threads and much higher memory bandwidth, GPUs have limited memory capacity and limited scale-out capabilities, which means that they are unable to process large, multi-TB graphs. Furthermore, where graphs are extremely sparse (<<1% non-zeros), typical GPU memory usage is orders of magnitude less efficient, making GPUs all but unusable outside of the smallest graphs, among other example issues.

An improved computing system architecture may be implemented in computing systems to enable more efficient (e.g., per watt performance) graph analytics. In one example, specialized graph processing cores may be networked together in a low diameter, high radix manner to more efficiently handle graph analytics workloads. The design of such graph processing cores builds on the observations that most graph workloads have abundant parallelism, are memory bound and are not compute intensive. These observations call for many simple pipelines, with multi-threading to hide memory latency. Returning to the discussion of FIG. 2, such graph processing cores may be implemented as multi-threaded cores (MTC), which are round-robin multi-threaded in-order pipeline. In one implementation, at any moment, each thread in an MTC can only have one in-flight instruction, which considerably simplifies the core design for better energy efficiency. Single-threaded cores (STC) are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-or-order pipelines. In some implementations, both MTCs and STCs may implement the same custom RISC instruction set.

Figure 4:
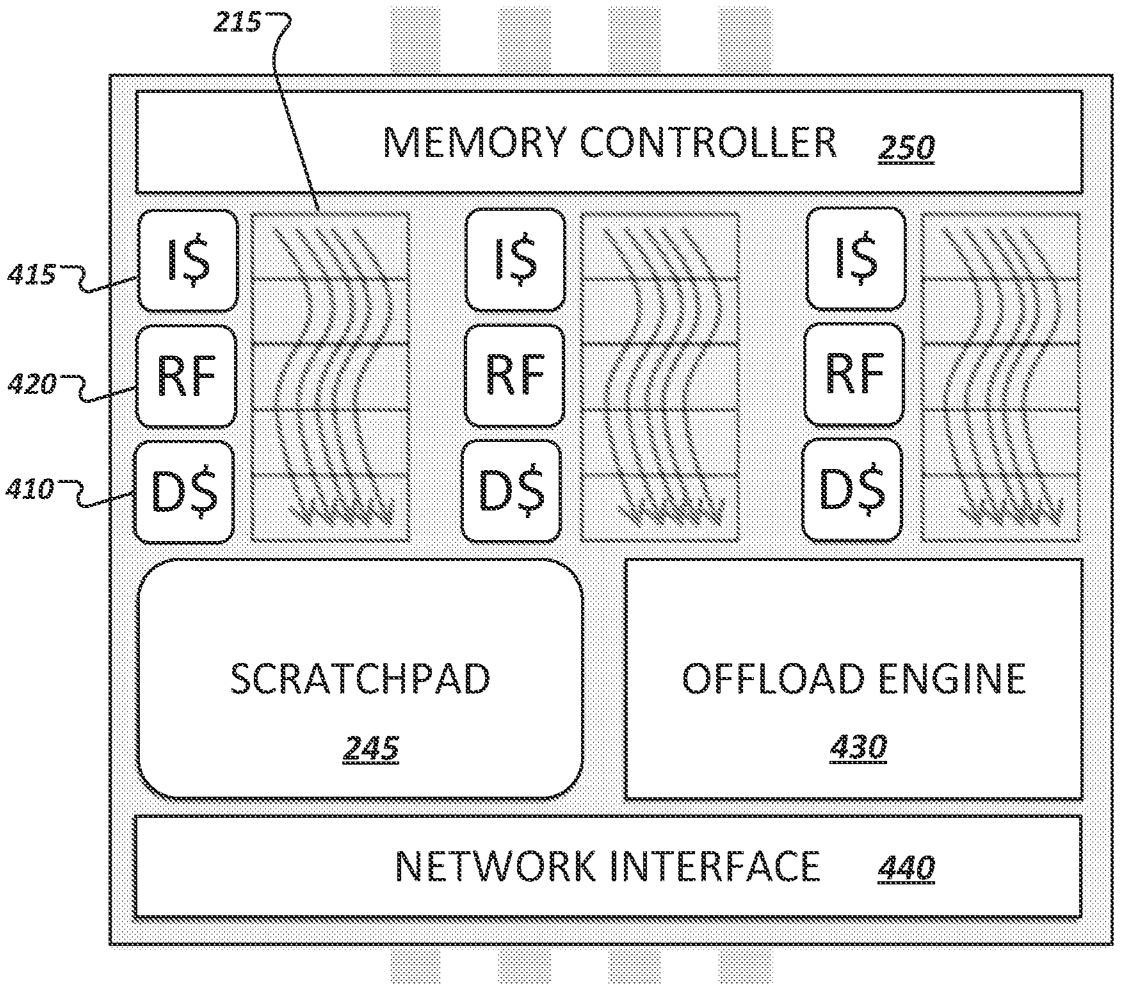
FIG. 4 is a simplified block diagram illustrating example components of an example graph processing core.

Turning to FIG. 4, a simplified block diagram 400 is shown illustrating example components of an example graph processing core device (e.g., 205). A graph processing core device may include a set of multi-threaded cores (MTCs) (e.g., 215). In some instances, both multi-threaded cores and single threaded cores (STCs) may be provided within a graph processing block. Further, each core may have a small data cache (D$) (e.g., 410) and an instruction cache (I$) (e.g., 415), and a register file (RF) (e.g., 420) to support its thread count. Because of the low locality in graph workloads, no higher cache levels need be included, avoiding useless chip area and power consumption of large caches. For scalability, in some implementations, caches are not coherent. In such implementations, programs that are to be executed using the system may be adapted to avoid modifying shared data that is cached, or to flush caches if required for correctness. As noted above, in some implementations, MTCs and STCs are grouped into blocks, each of which may be provided with a large local scratchpad (SPAD) memory 245 for low latency storage. Programs run on such platforms may selecting which memory accesses to cache (e.g., local stack), which to put on SPAD (e.g., often reused data structures or the result of a direct memory access (DMA) gather operation), and which not to store locally. Further, prefetchers may be omitted from such architectures to avoid useless data fetches and to limit power consumption. Instead, some implementations may utilize offload engines or other circuitry to efficiently fetch large chunks of useful data.

Figure 5:
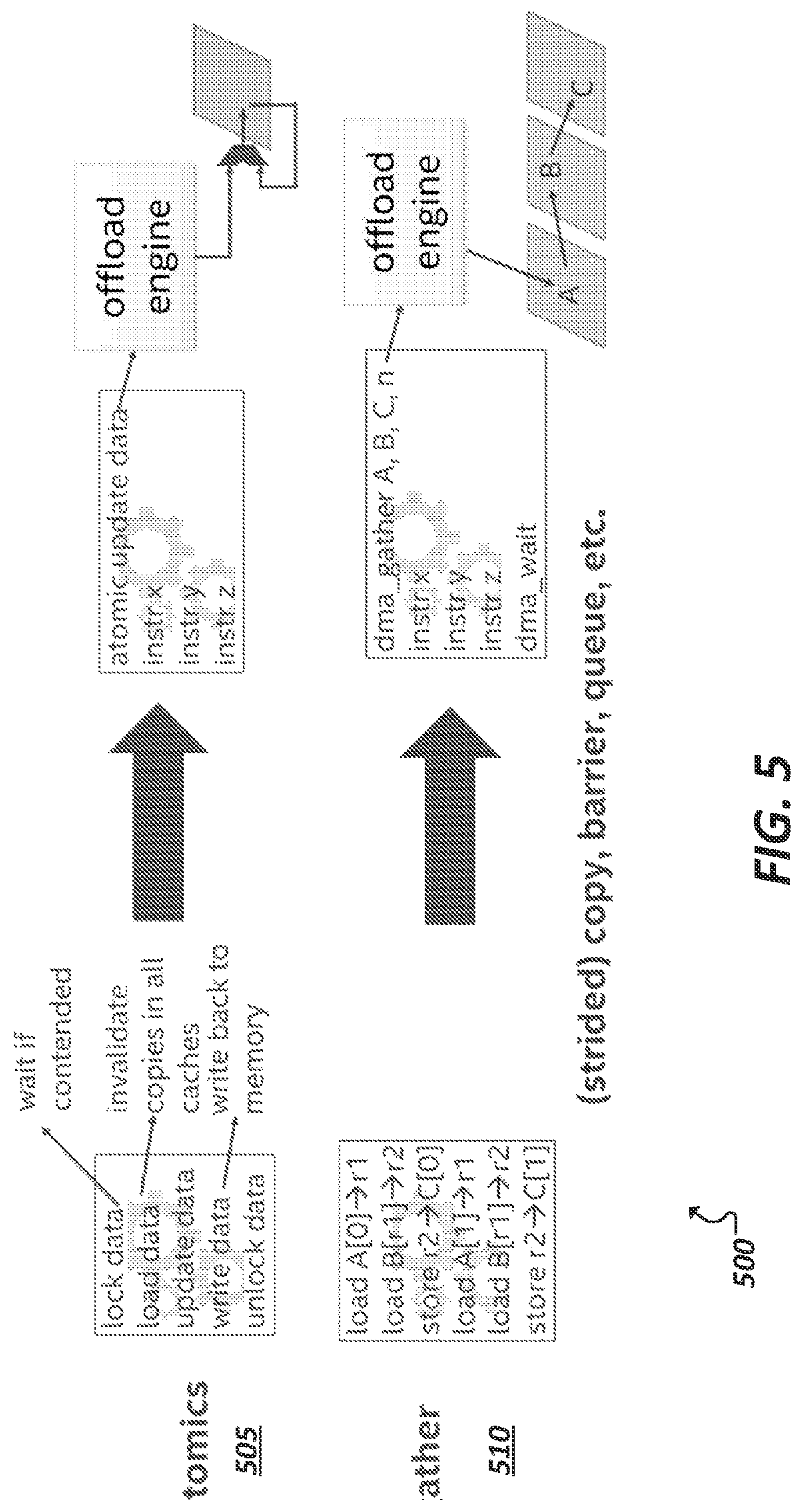
FIG. 5 is a diagram illustrating example operations of an example graphic processing core offload engine.

Continuing with this example, although the MTCs of an example graph processing core hide some of the memory latency by supporting multiple concurrent threads, an MTC may adopt an in-order design, which limits the number of outstanding memory accesses to one per thread. To increase memory-level parallelism and to free more compute cycles to the graph processing core, a memory offload engine (e.g., 430) may be provided for each block. The offload engine performs memory operations typically found in many graph applications in the background, while the cores continue with their computations. Turning to FIG. 5, a simplified block diagram 500 is shown illustrating example operations of an example graphic processing core offload engine (e.g., 430) including atomics 505 and gather operations 510, among other examples. Further, a direct memory access (DMA) engine may perform operations such as (strided) copy, scatter and gather. Queue engines may also be provided, which are responsible for maintaining queues allocated in shared memory, alleviating the core from atomic inserts and removals, among other example benefits. The logic of an offload engine can be used for work stealing algorithms and dynamically partitioning the workload. Further, the offload engines can implement efficient systemwide reductions and barriers. Remote atomics perform atomic operations at the memory controller where the data is located, instead of burdening the pipeline with first locking the data, moving the data to the core, updating it, writing back, and unlocking. They enable efficient and scalable synchronization, which is indispensable for the high thread count in this improved graph-optimized system architecture. The collective logic (or engines) of the offload engines may directed by the graph processing cores using specific instructions defined in an instruction set. These instructions may be non-blocking, enabling the graph processing cores to perform other work while these memory management operations are performed in the background. Custom polling and waiting instructions may also be included within the instruction set architecture (ISA) for use in synchronizing the threads and offloaded computations, among other example features. In some implementations, example graph processing cores and chipsets may not rely on any locality. Instead, the graph processing cores may collectively use their offload engines to perform complex systemwide memory operations in parallel, and only move the data that is eventually needed to the core that requests it. For example, a DMA gather will not move the memory stored indices or addresses of the data elements to gather to the requesting core, but only the requested elements from the data array.

Returning to FIG. 4, an example graph processing device may additionally include a memory controller 250 to access and manage requests of local DRAM. Further, sparse and irregular accesses to a large data structure are typical for graph analysis applications. Therefore, accesses to remote memory should be done with minimal overhead. An improved system architecture, such as introduced above, utilizing specialized graph processing cores adapted for processing graph-centric workload may, in some implementations, implement a hardware distributed global address space (DGAS), which enables respective cores (e.g., graph processing core or support dense core) to uniformly access memory across the full system, which may include multiple nodes (e.g., a multiple graph processing core, corresponding memory, and memory management hardware) with one address space. Accordingly, a network interface (e.g., 440) may be provided to facilitate network connections between processing cores (e.g., on the same or different die, package, board, rack, etc.).

Besides avoiding the overhead of setting up communication for remote accesses, a DGAS also greatly simplifies programming, because there is no implementation difference between accessing local and remote memory. Further, in some implementations, address translation tables (ATT) may be provided, which contain programmable rules to translate application memory addresses to physical locations, to arrange the address space to the need of the application (e.g., address interleaved, block partitioned, etc.). Memory controllers may be provided within the system (e.g., one per block) to natively support relatively small cache lines (e.g., 8 byte accesses, rather than 64 byte accesses), while supporting standard cache line accesses as well. Such components may enable only the data that is actually needed to be fetched, thereby reducing memory bandwidth pressure and utilizing the available bandwidth more efficiently.

Figure 6:
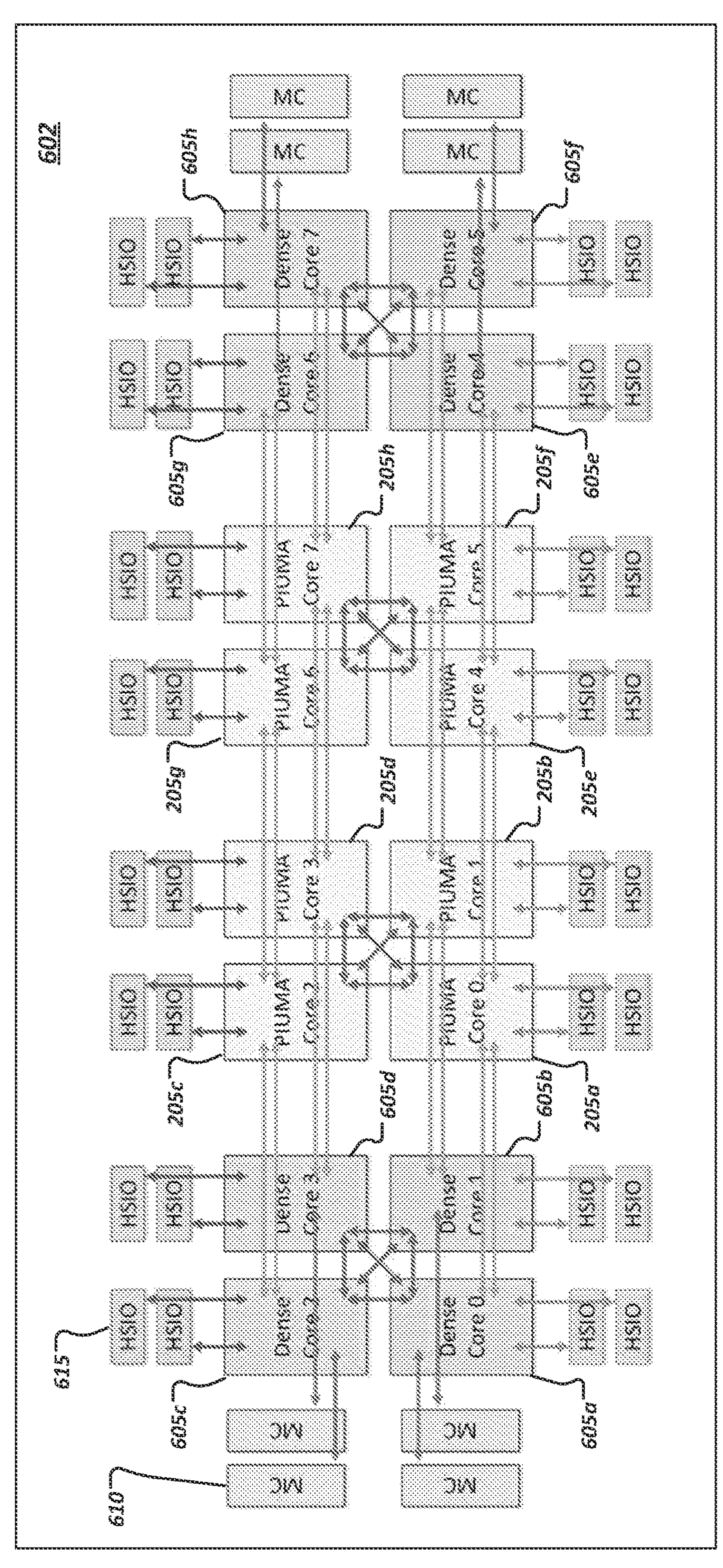
FIG. 6 is a simplified block diagram illustrating an example implementation of a graph processing system including both graph processing cores and dense compute cores.

As noted above, a system, implemented as a chiplet, board, rack, or other platform, may include multiple interconnected graph processing cores, among other hardware elements. FIG. 6 is a simplified block diagram 600 showing an example implementation of a graph processing system 602 including a number of graph processing cores (e.g., 205*a-h*) each coupled to a high-radix, low-diameter network to interconnect all of the graph processing cores in the system. In this example implementations, the system may further include dense compute cores (e.g., 605*a-h*) likewise interconnected. In some instances, kernel functions, which would more efficiently be executed using dense compute logic may be offloaded from the graph processing cores to one or more of the dense compute cores. The graph processing cores may include associated memory blocks, which may be exposed to programmers via their own memory maps. Memory controllers (MC) (e.g., 610) may be provided in the system to other memory, including memory external to the system (e.g., on a different die, board, or rack). High speed input/output (HSIO) circuitry (e.g., 615) may also be provided on the system to enable core blocks and devices to couple to other computing devices, such as compute, accelerator, networking, and/or memory devices external to the system, among other examples.

A network may be provided in a system to interconnect the component within the system (e.g., on the same SoC or chiplet die, etc.) and the attributes of the network may be specially configured to support and enhance the graph processing efficiencies of the system. Indeed, the network connecting the blocks is responsible for sending memory requests to remote memory controllers. Similar to the memory controller, it is optimized for small messages (e.g., 8 byte messages). Furthermore, due to the high fraction of remote accesses, network bandwidth may exceed local DRAM bandwidth, which is different from conventional architectures that assume higher local traffic than remote traffic. To obtain high bandwidth and low latency to remote blocks, the network needs a high radix and a low diameter. Various topologies may be utilized to implement such network dimensions and characteristics. In one example, a HyperX topology may be utilized, with all-to-all connections on each level. In some implementations, links on the highest levels are implemented as optical links to ensure power-efficient, high-bandwidth communication. The hierarchical topology and optical links enable the system to efficiently scale out to many nodes, maintaining easy and fast remote access.

Figure 7:
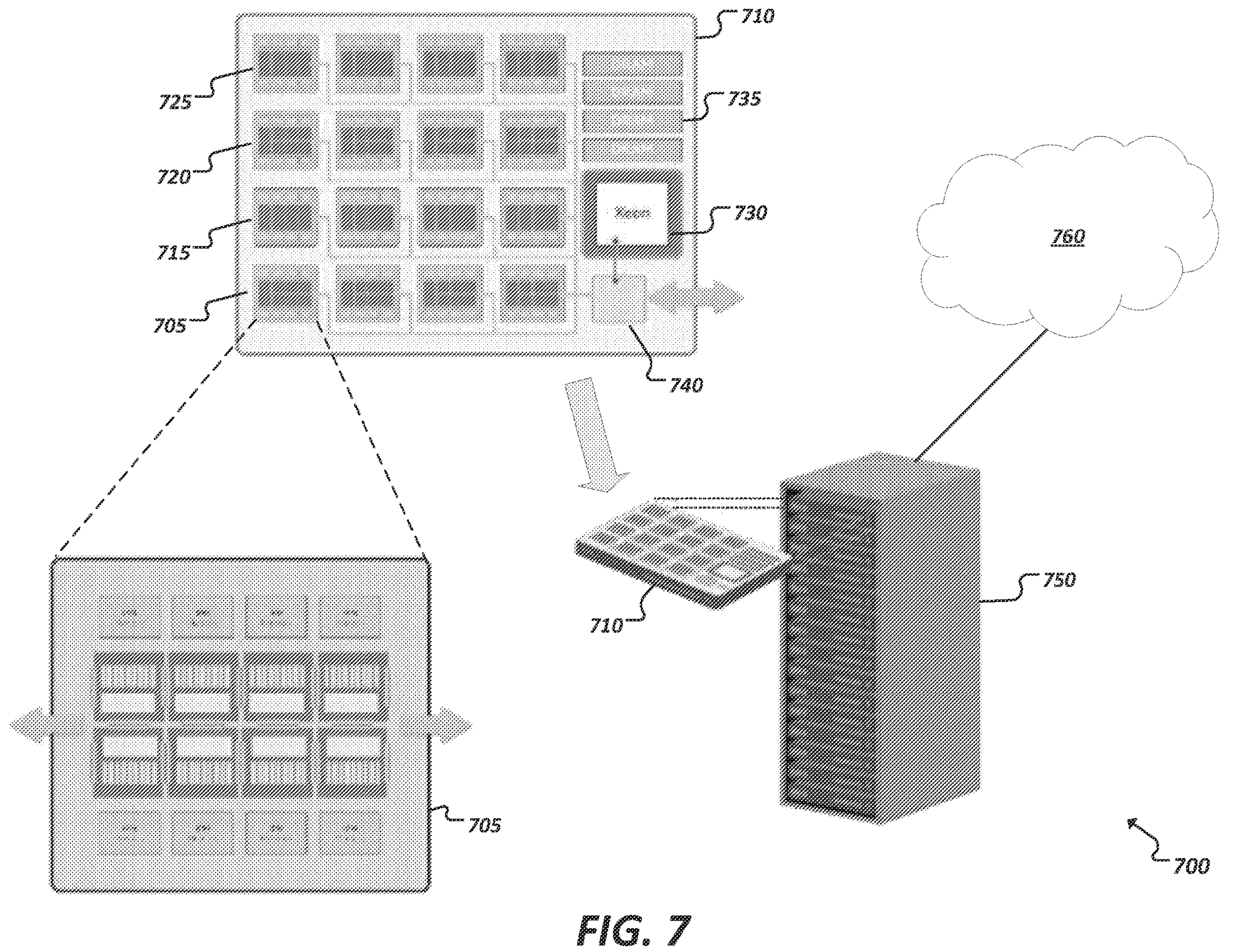
FIG. 7 is a simplified block diagram illustrating an example system including graph processing capabilities.

FIG. 7 is a simplified block diagram showing the use of an example graph processing system (incorporating graph processing cores, such as discussed above) in a server system. A graph processing device (e.g., 705) may be provided with a set of graph processing cores (and in some cases, supplemental dense compute cores). A graph processing device 705 may enable specialized processing support to handle graph workloads with small and irregular memory accesses through near-memory atomics, among other features, such as discussed above. Multiple such graph processing devices (e.g., 705, 715, 720, 725, etc.) may be provided on a board, rack, blade, or other platform (e.g., 710). In some implementations, the platform system 710 may include not only an interconnected network of graph processing devices (and their constituent graph processing cores), but the system 710 may further include general purpose processors (e.g., 730), SoC devices, accelerators, memory elements (e.g., 735), as well additional switches, fabrics, or other circuitry (e.g., 740) to interconnect and facilitate the communication of data between devices (e.g., 705-740) on the platform. The system 710 may adopt a global memory model and be interconnected consistent with the networking and packaging principles described herein to enable high I/O and memory bandwidth.

In some implementations, the system 710 may itself be capable of being further connected to other systems, such as other blade systems in a server rack system (e.g., 750). Multiple systems within the server system 750 may also be equipped with graph processing cores to further scale the graph processing power of a system. Indeed, multiple servers full of such graph processing cores may be connected via a wider area network (e.g., 760) to further scale such systems. The networking of such devices using the proposed graph processing architecture offers networking as a first-class citizen, supports point-to-point messaging, and relies upon a flattened latency hierarchy, among other example features and advantages.

In one example system, a C/C++ compiler (e.g., based on LLVM) may be utilized in the development of software for use with the graph processing systems described herein. For instance, the compiler may support a Reduced Instruction Set Computer (RISC) instruction set architecture (ISA) of the graph processing system, including basic library functions. In some implementations, graph-processing-specific operations, such as the offload engines and remote atomics, are accessible using intrinsics. Additionally, the runtime environment of the system may implement basic memory and thread management, supporting common programming models, such as gather-apply-scatter, task-based and single program, multiple data (SPMD)-style parallelism. Among other tools, an architectural simulator for the graph processing architecture may be provided to simulate the timing of all instructions in the pipelines, engines, memory, and network, based on the hardware specifications. Additional software development tools may be provided to assist developers is developing software for such graph processing systems, such as tools to simulate execution of the software, generate performance estimations of running a workload on the system, performance analysis reports (e.g., CPI stacks and detailed performance information on each memory structure and each instruction), among other example features. Such tools may enable workload owners to quickly detect bottleneck causes, and to use these insights to optimize the workload for graph processing systems.

In some implementations, software developed to perform graph analytics using the improved graph processing architecture discussed herein may be implemented as basic kernels, library overhead may be limited. In networked systems of multiple graph processing cores, the application code does not need to change for multinode execution, thanks to the system-wide shared memory. As an example, a software application may be written to cause the graph processing system to perform a sparse matrix dense vector multiplication (SpMV) algorithm. The basic operation of SpMV may include a multiply-accumulate of sparse matrix elements and a dense vector. A matrix input may be provided (e.g., an RMAT-30 synthetic matrix) stored in compressed sparse row (CSR) format. In one example, a straightforward implementation of SpMV may be programmed, with each thread of the graph processing cores calculating one or more elements of the result vector. The rows are partitioned across the threads based on the number of non-zeros for a balanced execution. It does not make use of DMA operations, and all accesses are non-cached at a default length (e.g., 8-byte), with thread local stack accesses cached by default. Such an implementation may outperform high performance CPU architectures (e.g., Intel Xeon™ through the use of a higher thread count and 8-byte memory accesses, avoiding memory bandwidth saturation. In other implementations of an SpMV algorithm may be programmed to execute on the graph processing architecture utilizing selective caching. For instance, accesses to the matrix values are cached, while the sparse accesses to the vector bypass caches. In the compressed sparse row (CSR) representation of a sparse matrix, all non-zero elements on a row are stored consecutively and accessed sequentially, resulting in spatial locality. The dense vector, on the other hand, is accessed sparsely, because only a few of its elements are needed for the multiply-accumulate (the indices of the non-zeros in the row of the matrix). Accordingly, the accesses to the matrix are cached, while the vector accesses remain uncached 8-byte accesses, leading to a further potential performance improvement relative to CPU architectures. Further, an implementation of the SpMV algorithm may be further enhanced using a graph processing architecture, for instance, by a DMA gather operation to fetch the elements of the dense vector that are needed for the current row from memory. These elements may then be stored on local scratchpad. The multiply-accumulate reduction is then done by the core, fetching the matrix elements from cache and the vector elements from scratchpad. Not only does this significantly reduce the number of load instructions, it also reduces data movement: the index list does not need to be transferred to the requesting core, only the final gathered vector elements. While data is gathered, the thread is stalled, allowing other threads that have already fetched their data to compute a result vector element.

Programs, such as the examples above, may be designed to effectively use the graph processing architecture (e.g., using more than 95% of the available memory bandwidth, while not wasting bandwidth on useless and sparse accesses) and realize potentially exponential efficiency improvement over traditional architectures. Further, the improved graph processing architecture provide much higher thread count support (e.g., 144 threads for Xeon, verses thousands of threads (e.g., 16,000+) in the graph processing core implementation), enabling threads to progress while others are stalled on memory operations, efficient small size local and remote memory operations, and powerful offload engines that allow for more memory/compute overlap. Scaling graph processing systems (e.g., with multiple nodes) may yield compounding benefits (even if not perfectly linear, for instance, due to larger latencies and bandwidth restrictions or other example issues) to significantly outperform other multi-node conventional multinode processor configurations. While the examples focus on an SpMV algorithm, it should be appreciated that this example was offered as but one of many example graph algorithms. Similar programs may be developed to leverage the features of a graph processing architecture to more efficiently perform other graph-based algorithms including application classification, random walks, graph search, Louvain community, TIES sampler, Graph2Vec, Graph Sage, Graph Wave, parallel decoding FST, geolocation, breadth-first search, sparse matrix-sparse vector multiplication (SpMSpV), among other examples.

As noted above, sparse workloads exhibit a large number of random remote memory accesses and have been shown to be heavily network and memory bandwidth-intensive and less dependent on compute capability. While the graph processing architecture discussed herein provides efficient support for workloads that are truly sparse (and may be alternatively referred to as "sparse compute" devices), such a graph processing architecture lacks sufficient compute performance to execute dense kernels (e.g., matrix multiply, convolution, etc.) at needed performance in some applications. Dense kernels are a critical component of many critical compute applications such as image processing. Even with matrix computation units included, a challenge remains of effective integration of dense compute and offloading operations with regards to memory movement, matrix operation definition, and controllability across multiple threads.

Traditional offloading techniques (e.g., for offloading to an on-chip accelerator in an SoC) include memory mapped registers. For instance, the pipeline/core can perform the offload of the computation by writing to memory mapped registers present inside the accelerator. These registers may specify configurations as well as data needed to be used for the computation. This may also require the pipeline to monitor/poll registers if it is not sure that the offload engine is idle. In one example of a graph processing, an enhanced offload mechanism may be used to offload dense compute work from the graph processing cores to dense compute cores. There is a hardware managed queue that stores incoming offload instructions and monitors the current status of the pipeline and launches the instructions sequentially, enabling an easy offload mechanism for the software. Multiple graph processing core threads can each use the dense compute bandwidth of the dense compute cores by calling a new ISA function (e.g., by calling the dense.func) without worrying about the status of the dense core and whether other cores are using the dense core at the same time. The offload instruction can also allow efficient and simple passing of the program counter and operand addresses to one of the dense compute cores as well. The queue gives metrics through software readable registers (e.g., the number of instructions waiting (in a COUNT value)) and can help in tracking average waiting requests and other statistics for any dense core.

As noted above, a graph processing architecture may be particularly suited to operate on sparse workloads exhibiting a large number of random remote memory accesses and that are heavily network and memory bandwidth-intensive and less dependent on compute capability. To efficiently address this workload space, a graph processing architecture has a highly scalable low-diameter and high-radix network and many optimized memory interfaces on each die in the system. While this architectural approach provides efficient support for workloads that are truly sparse, providing a system with graph processing cores alone lacks sufficient compute performance to execute dense kernels (e.g., matrix multiply, convolution, etc.) that may be utilized in some application. To correct this performance gap, some systems incorporating a graph processing architecture may further include dense compute cores in addition to the graph processing cores, such as illustrated in the example of FIG. 6. In this example, eight dense compute cores (e.g., 605*a-h*) are incorporated into each die of a graph processing device (e.g., 602) to be incorporated in a system. In such implementations, kernel functions are offloaded from threads in the graph processing cores (e.g., 205*a-h*) to any dense core 605*a-h* in the system 602 via directed messages.

In one example implementation, the compute capability within each dense core is implemented with a 16×16 reconfigurable spatial array of compute elements or systolic array (also referred to herein as a "dense array (DA)"). In some implementations, the reconfigurable array of compute elements of a dense compute core may be implemented as a multi-dimensional systolic array. This array is capable of a variety of floating point and integer operations of varying precisions. In this example, such an array can, in total, at a 2 GHz operating frequency a single dense core can achieve a peak performance of 1 TFLOP of double precision FMAs. Respective dense cores may have a control pipeline responsible for configuring the DA, executing DMA operations to efficiently move data into local buffers, and moving data into and out of the DA to execute the dense computation. The specific characteristics (e.g., memory locations, compute types, and data input sizes) of the operations vary based on the corresponding kernel. These kernels are programmed by software and launched on the control pipeline at a desired program counter (PC) value.

In some implementations, graph processing cores within a system that also include dense compute cores may include a dense offload queue and corresponding hardware circuitry to perform offloads from the graph processing core to the dense compute core control. This offload pipeline is managed intelligently by hardware managed through the dense offload queues (DOQ) to thereby simplify programmability for the software offloading the dense compute. With full hardware management, there is no need for software to check for the idleness of the dense compute or having to manage the contents and ordering of the queue, among other example benefits. The hardware circuitry managing the DOQs may also handle passing of the required program counter (PC) information, the operand, and the result matrix addresses to the control pipeline in a simple manner, among other example features.

In some implementations, a specialized instruction in the graph processing architecture ISA may be provided as a handle for initiating a request to a dense compute core. For instance, the software may use a dense function ISA instruction (e.g., 'dense.func') to trigger the offloading of a task from a graph processing core to a dense compute core by sending an instruction packet over the network interconnecting the cores from the graph processing core to one of the dense compute cores. The request may include the address of the target dense compute core, which may be used by the network to route the packet to the appropriate dense compute core. The request packet may be received at the dense offload queue (DOQ) corresponding to the targeted dense compute core.

Figure 8:
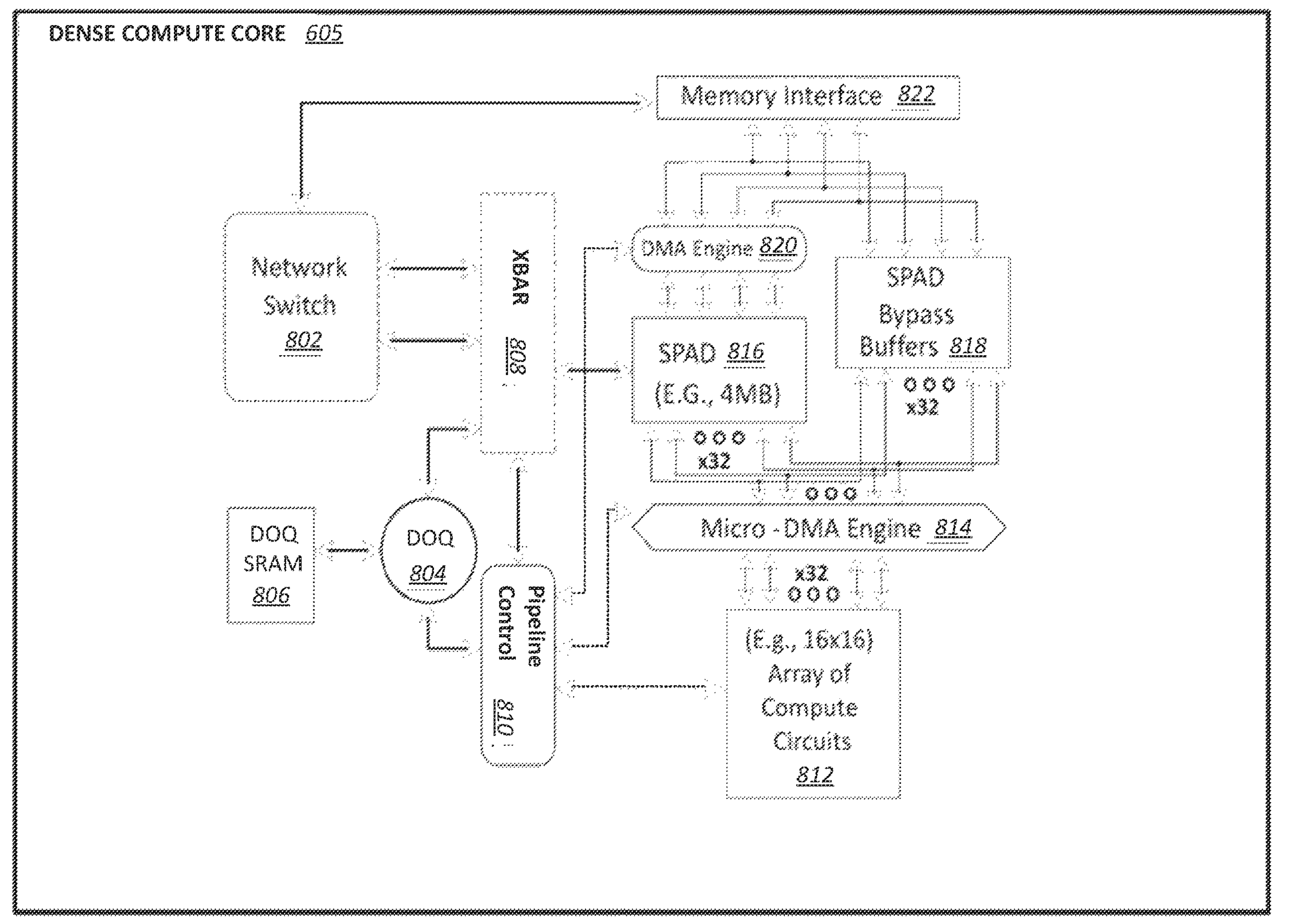
FIG. 8 is a simplified block diagram illustrating an example dense compute core.

Turning to FIG. 8, a simplified block diagram is shown illustrating an example dense compute core 605. Dense compute cores (e.g., 605) may include an array 812 of interconnected compute units, which provide the dense computing functionality of the dense compute core. In some examples, a 16×16 array of compute elements may be provided. A dense compute core 605, in one example implementation, may also include a dense offload queue 804 and control pipeline 810 and crossbar (XBAR) 808 to support the movement of data between the dense compute core and other components of the system (e.g., graph processing cores, memory controllers and associated blocks of shared memory, other dense compute cores, etc.). Logic for executing a dense offload instruction may be implemented as a decoder circuit and/or an execution circuit (e.g., execution unit) in the dense offload queue, the control pipeline, or other components of the dense compute core. Various instructions may be received for a dense computing core at its dense offload queue (e.g., 804).

In some implementations, control pipeline 810 may be implemented as a single-threaded pipeline for managing and orchestrating hardware of the dense compute core 605 for performing various functions. For instance, control pipeline 810 may configure the reconfigurable array of compute elements 812 in one of a variety of possible configurations, read data from local or remote memory (e.g., through DMA calls to shared memory), copy/write such data to local scratchpad memory 816 of the dense compute core for use by the array 812, load instructions corresponding to a set of functions, instructions, kernel, or other program (e.g., based on a program counter value) for execution by compute units in the array, move result data (e.g., data generated during execution of the dense workload offloaded to the dense core) from the dense compute core (e.g., from scratchpad (e.g., 816) to memory accessible to a graph processing core (e.g., through a remote atomic), update registers identifying progress of the workload execution by the array of compute circuits, among other example tasks and functions.

Dense offload queue 804 may be utilized to provide hardware-managed orchestration and monitoring of workloads offloaded to the corresponding dense compute core 605 (e.g., from a sparse-compute graph processing core). The dense offload queue 804 may maintain a hardware-based queue of received instructions, may identify when the control pipeline 810 (and compute array 812) are available to handle a next instruction in the queue, and monitor the status of the control pipeline and performance of functions associated with an offload request. In this manner, the dense offload queue 804 may simplify software development for platforms incorporating a mix of sparse graph processing cores and dense processing cores by implementing the orchestration and monitoring of offloaded dense compute tasks in hardware. For instance, a single instruction (e.g., a dense offload instruction (e.g., dense.func)) may be defined in the ISA of the platform to simply and elegantly allow hardware to manage offloading of tasks and the performance of these tasks by a corresponding dense compute core (e.g., 605). The dense offload queue 804 can cause or launch action by the control pipeline 810 including the performance of actions using in crossbar 808, DMA engine 820, and/or micro-DMA engine 814 to appropriately configure the dense compute core hardware to perform a set of particular tasks, kernel, or other program. In certain embodiments, memory interface 822 is coupled to a (e.g., system) memory, e.g., shared memory external from the dense compute core 605. In certain embodiments, other components (e.g., core(s)) are coupled to core 605 via network switch 802, such as other dense compute cores and graph processing cores, among other example elements.

In certain embodiments, a micro-DMA engine 814 is coupled to the array of compute circuits 812, a scratch pad memory 816 (e.g., memory address accessible), and/or a buffer 818 (e.g., not memory address accessible) that bypasses the SPAD. In one embodiment, local scratchpad (SPAD) 816 is used to hold data that is subject to high reuse and bypass SPAD buffer 818 is used for low-reuse to reduce offload latency. Thirty-two parallel input/output ports are used as an example, and it should be understood that other numbers of ports may be utilized, e.g., 64, 128, etc. In certain embodiments, micro-DMA engine 814 is not coupled to memory external to core 605 and/or is not part of a cache coherency hierarchy.

In some implementations, the array of compute circuits 812 of a dense compute core is implemented as a multi-element (e.g., 16 element×16 element) reconfigurable spatial array of compute circuits (e.g., a dense array (DA)) capable of a variety of floating point and integer operations of varying precisions (e.g., a grid of floating-point unit (FPU) and/or arithmetic-logic unit (ALU) blocks). The reconfigurability of the array of compute circuits 812 allows for multiple options for connectivity between its internal compute circuits. In certain embodiments, the connectivity is pre-configured in the array of compute circuits 212 before (e.g., kernel) execution begins. Embodiments herein utilize a reconfigurable array of compute circuits because (i) given optimal array configuration, it provides high compute efficiency for a subset of kernels under a variety of input and output matrix sizes, and the programmability of the DA (e.g., via the μDMA instructions) seamlessly integrates into an ISA (e.g., an ISA for the second core type) with minimal control pipeline modifications, among other example features and benefits.

Figure 9A:
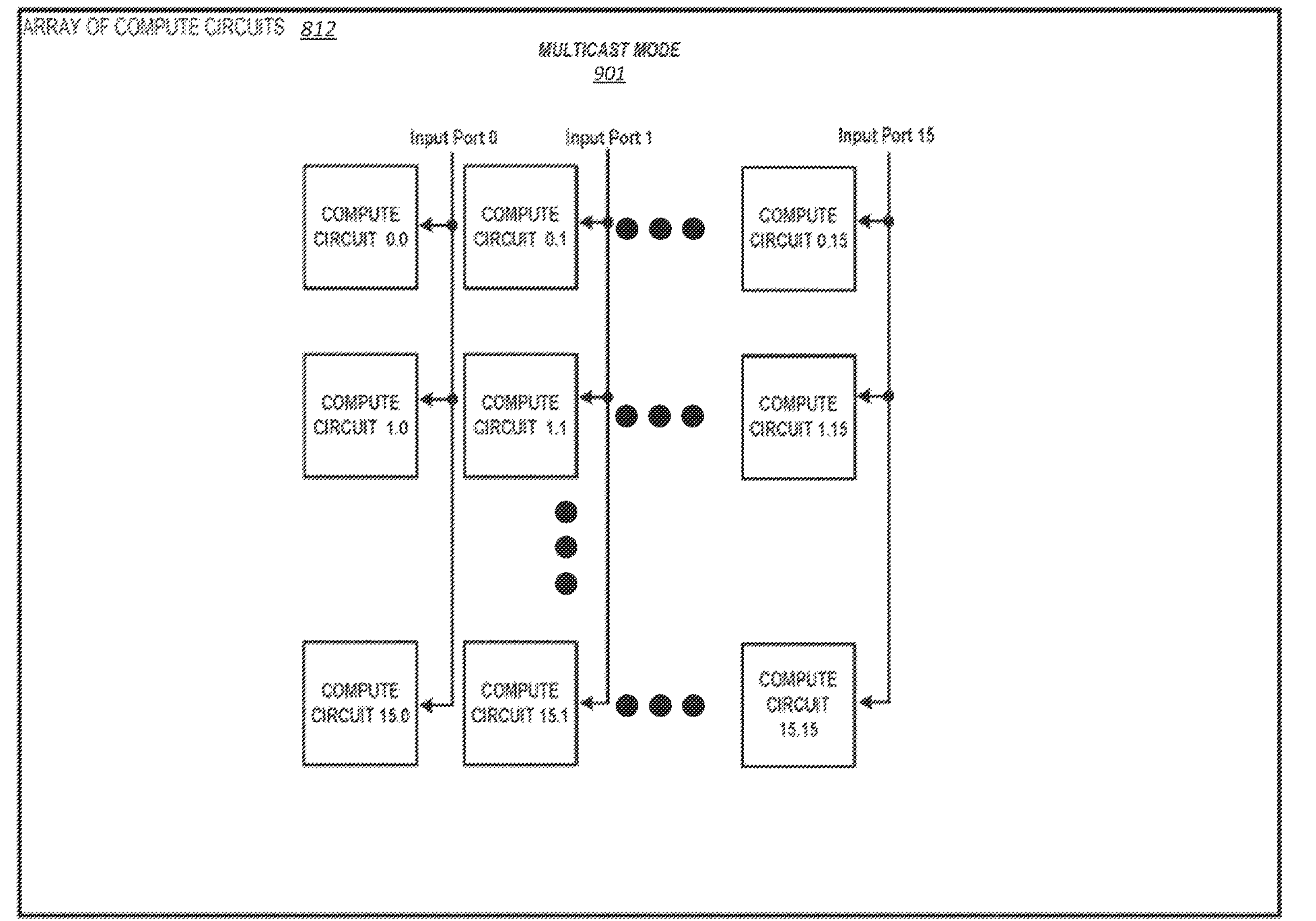
FIGS. 9A-9C are simplified block diagrams illustrates example reconfigurations of a compute array of an example dense compute core.
Figure 9B:
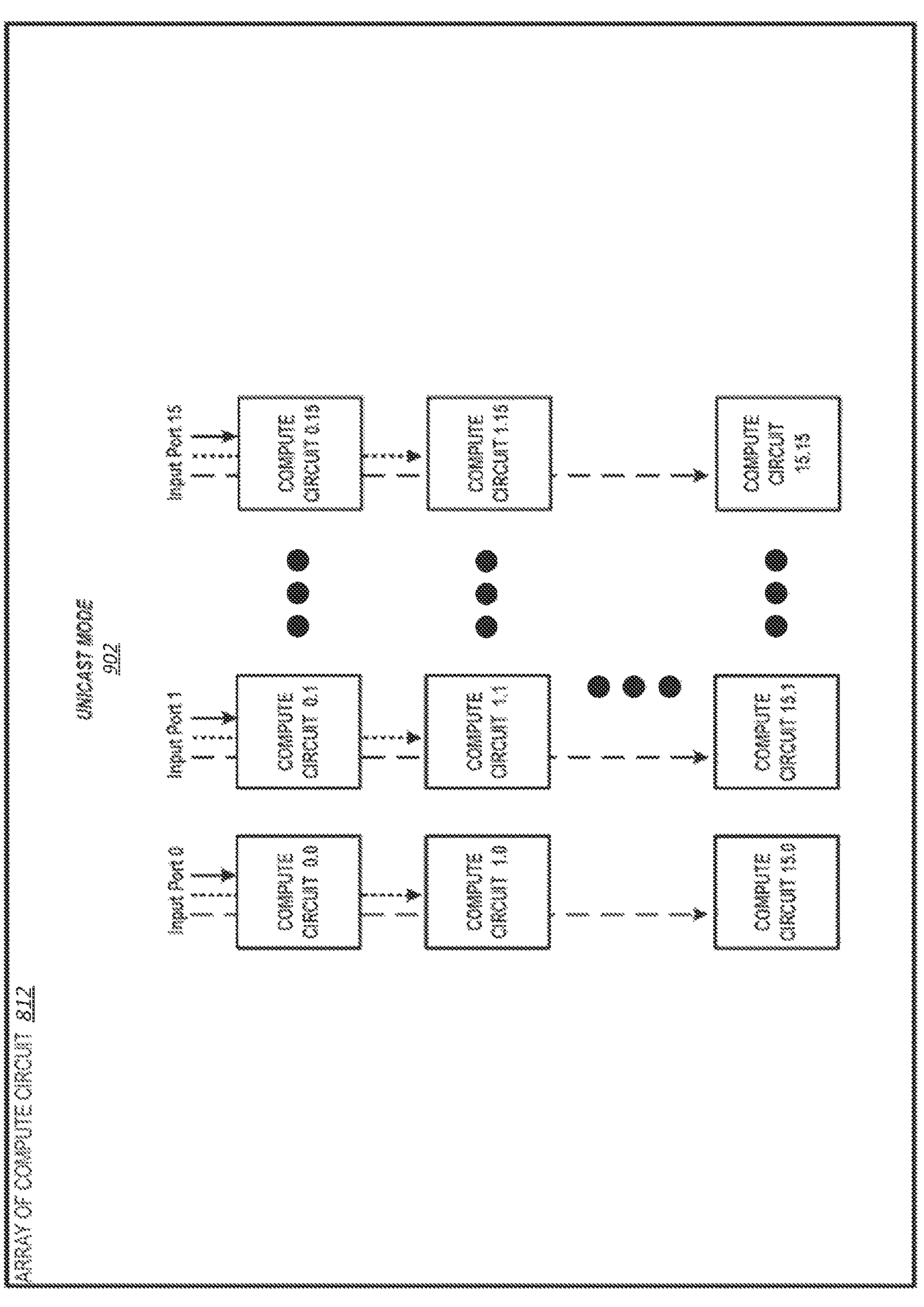
Figure 9C:
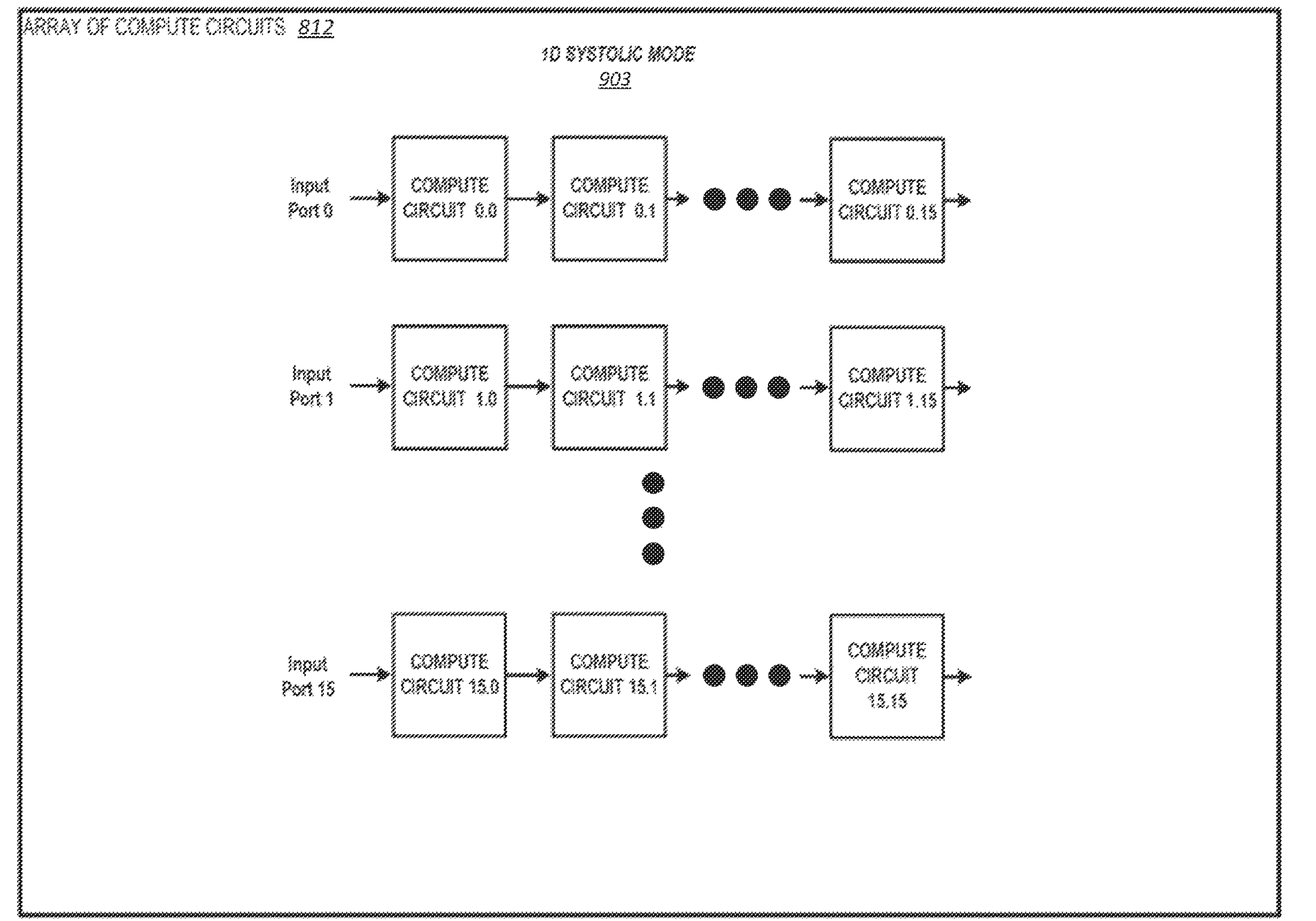

FIGS. 9A-9C illustrate example configurations of an example array of compute circuits, which may be programmed and implemented on an example dense compute core. For instance, FIG. 9A illustrates a block diagram of an array of compute circuits 812 in a multicast mode 901 according to embodiments of the disclosure. As depicted, the compute circuits are each indexed by a value (e.g., between 0 and 15 for each row and each column). In certain embodiments, an array of compute circuits 812 in a multicast mode 301 causes a same value (e.g., from a ID array of input data) to be broadcast to a proper subset of compute circuits (e.g., shown as entire columns, but entire rows, or a subset of 2D blocks are possible in other embodiments), for example, a first value input to all compute circuits in the first row via input port 0, a second value input to all compute circuits in the second row via input port 1, etc.

FIG. 9B illustrates a block diagram of an array of compute circuits 812 in a unicast mode 902 according to embodiments of the disclosure. In certain embodiments, an array of compute circuits 812 in a unicast mode 902 causes a different value (e.g., from a 2D matrix of input data) to be sent to a respective compute circuits (e.g., shown as being performed on an entire row for each successive operation (e.g., cycle), but entire columns, or a subset of 2D blocks or all compute circuits are possible in other embodiments), for example, a first value input to compute circuit 0.0 in the first row via input port 0, a second value input to compute circuit 0.1 in the second row via input port 1, etc. for a first 1D array of a 2D matrix, then a first value input to compute circuit 0.0 in the first row via input port 0, a second value input to compute circuit 0.1 in the second row via input port 1, etc. for a second 1D array of a 2D matrix, and so forth.

FIG. 9C illustrates a block diagram of an array of compute circuits 812 in a one-dimensional (1D) systolic mode 903 according to embodiments of the disclosure. In certain embodiments, an array of compute circuits 812 in one-dimensional (1D) systolic mode 903 causes a different value (e.g., from a 1D array of input data) to be sent to a respective compute circuits (e.g., shown as being performed on first compute circuits in a first column, but other columns, or rows are possible in other embodiments), for example, a first value input to compute circuit 0.0 in the first column via input port 0, a second value input to compute circuit 1.0 in the first column via input port 1, etc. for a ID array.

To achieve the optimal combination of ease of programmability and high compute performance through an array of compute circuits, embodiments herein utilize a DMA engine (e.g., micro-DMA engine) to provide the following features: (i) flexibility in the input/output matrix characteristics (e.g., configurability of row and/or column dimensions as well as the organization of the data structure in memory (e.g., row major or column major)), (ii) supporting the method of data movement and memory access patterns for multiple modes of the array (e.g., multicast, unicast, or systolic mode), and (iii) providing high parallelism at each array input/output to hit the highest performance.

The dense offload queue 804 manages incoming dense function requests passed from graph processing cores in a system. For instance, when a dense function request is received, the DOQ 804 will store it in its local memory buffer (DOQ SRAM 806). Whenever the control pipeline 810 has completed execution of the previous kernel and becomes free (or immediately if its already free), the DOQ 804 pops the function from its queue and launches the corresponding thread on the control pipeline 810. Accordingly, in some implementations, the DOQ 804 is responsible for both queue pointer management in the dense compute core, as well as serializing and launching the dense functions in the order that they were received and monitoring the status of the control pipeline 810 to determine when they need to be popped off the queue. Further, the DOG 804 can load the matrix addresses passed along with a dense functional instruction call (e.g., dense.func) into the register file of the control pipeline 810 and thus enables the control pipeline ease of access to this data, among other example functions.

Table 1 shows the structure of one example implementation of a dense function (dense.func) instruction:

TABLE 1

| Example dense.func instruction description | | |
|---|---|---|
| Instruction | ASM Form Arguments | Argument Descriptions |
| dense.func | r1, r2, r3, r4, r5 | r1 = start PC; r2 = Matrix A address; r3 = Matrix B address; r4 = Matrix C address; r5 = Target dense core address |

In the example instruction illustrated in Table 1:

r1—Starting PC of the kernel. This value is passed to the control pipeline 810 when execution begins.

r2—Base address for input matrix A. The control pipeline 810 will use this when copying data from off-die memory to the dense core's local scratchpad (e.g., 816).

r3—Base address for input matrix B. The control pipeline 810 will use this when copying data from off-die memory to the dense core's local scratchpad 816.

r4—Base address for output matrix C. The control pipeline 810 will use this when copying data from the dense core's local scratchpad 816 to off die memory or other memory outside the dense compute core.

r5—Address of the dense core that is to execute the dense function

Figure 10:
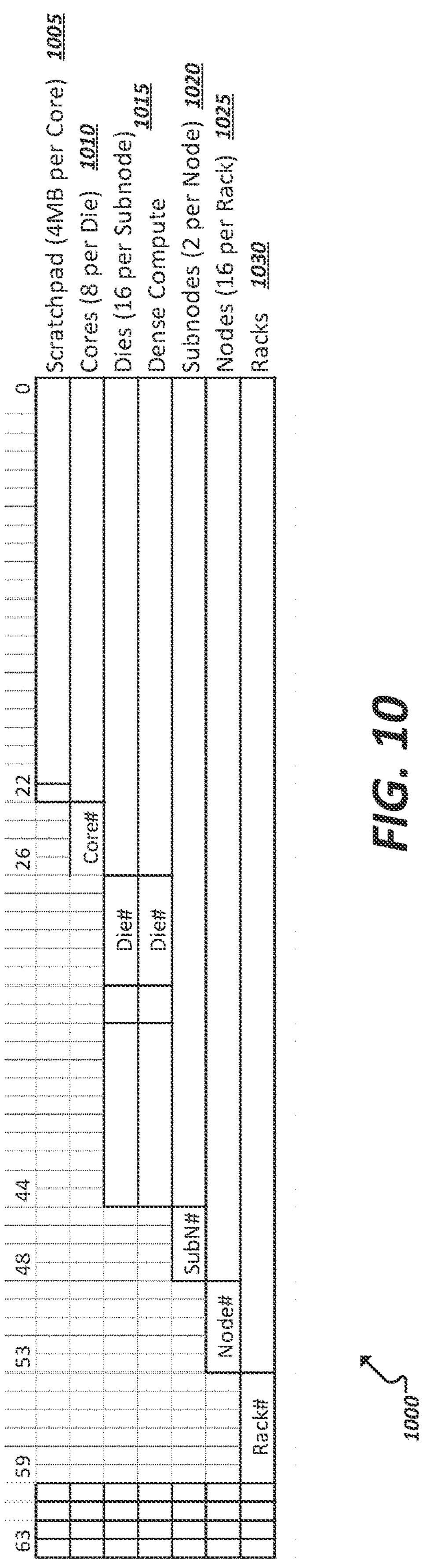
FIG. 10 is a representation of an example memory map of an example graph processing system.

FIG. 10 is a diagram representing an example memory map 1000 utilized in a system including a set of graph processing cores and dense compute cores. Such systems may be further interconnected with other devices (included other instances of similar graph processing devices) in various system topographies. For instance, a first portion 1005 of the memory address space may correspond to a core's local scratch pad, with a second portion 1010 of the memory map dedicated to identifying the specific core (e.g., graph processing core, dense compute core, or other core provided on the system). In one example, eight cores may be provided per die and sixteen dies may be provided per compute sub-node. Accordingly, a third portion 1015 of the memory map may be reserved to address dies (which may be addressed differently between graph processing dies and dense compute dies) and a fourth portion 1020 reserved for subnode addressing. In some implementations, two or more subnodes may be provided per node and nodes may be interconnected on a server rack. Still further, multiple server racks may be interconnected in a network to further expand the overall graph compute capacity of a system, and so on. As illustrated in FIG. 10, corresponding portions (e.g., 1025, 1030) may be provided for addressing at the node, rack, and even system levels, among other examples corresponding to other network topologies.

Figure 11:
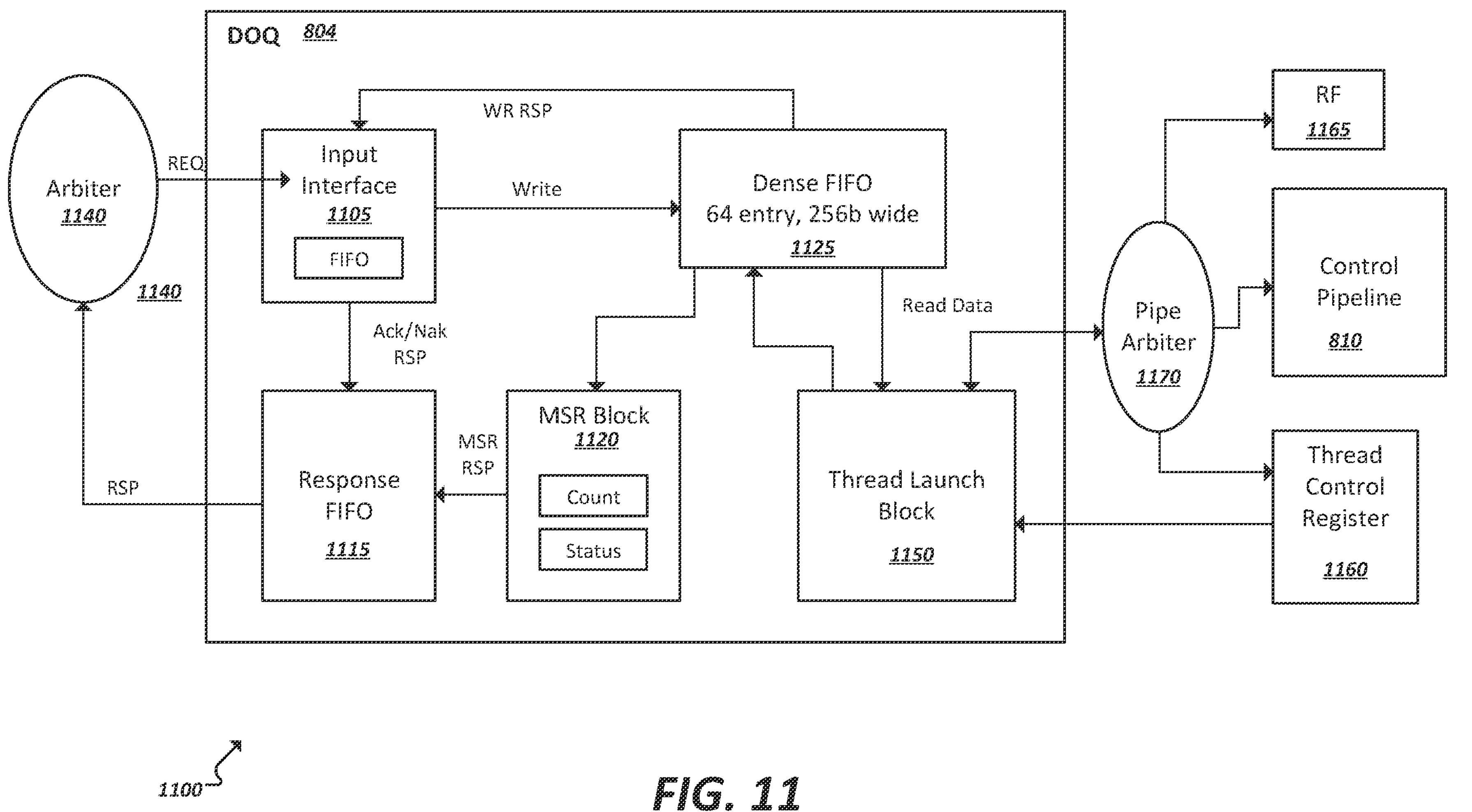
FIG. 11 is a simplified block diagram illustrating an example dense offload queue associated with a dense compute core.

FIG. 11 is a simplified block diagram 1100 illustrating the example microarchitecture of an example dense offload queue 804, as may be utilized in some implementations. An input arbiter block 1140 may be provided that receives instructions passed to a corresponding dense compute core on a network coupling the dense compute core to other dense compute cores as well as graph processing cores on the platform. The arbitrator block 1140 may pass the relevant instructions (that utilize the DOQ) to the DOQ. The DOQ 804 may include an input interface unit 1105, which include input flops and an input first-in-first-out (FIFO) queue (e.g., to absorb received requests in instances of stalling or back-pressure). In one example, the input FIFO may be four entries deep, although other implementations may utilize queues of different depths. The input interface unit 1105 may check for the correct opcode and send a negative acknowledgment (NACK) if the opcode does not match dense.func. The dense offload queue 804 may further include, in some implementations, a response FIFO queue 1115 and machine specific register (MSR) block 1120, which includes two write ports: one from MSR block and another from input interface for ACK/NACK responses. The response FIFO queue 1115 may queue and send ACK/NAK responses to the requesting graph processing core to communicate to the requesting graph processing core that its instruction has/has not been accepted. In the event the instruction is negatively acknowledged, the graph processing core may attempt a different instruction or attempt to offload a workload through the instruction to another dense compute core, among other examples.

Continuing with the example of FIG. 11, The dense offload queue 804 may additionally include a dense instruction FIFO 1125, which serves as the hardware queue for queuing offload instructions received for the dense compute core. In one implementation, if the dense instruction FIFO 1125 is not full and the input FIFO is not empty, then the input interface unit 1105 sends write requests to the dense instruction FIFO 1125. If the dense instruction FIFO 1125 is full then the input interface unit 1105 refrains from sending any more write requests to the dense instruction FIFO 1125 until the queue is at least partially cleared. The input interface unit 1105 may receive a response from the dense instruction FIFO 1125 once the data has been stored, and forwards it to response FIFO 1115 as an instruction response (e.g., for forwarding to the requesting graph processing core). An input "FIFO full" signal may be defined as a backpressure signal to the input arbiter block 1140 to not accept any more instructions. For instance, when the input FIFO is full, it may create a NACK-retry response packet to be sent through the response FIFO 1115, in some implementations.

In some examples, the dense instruction FIFO 1125 may be implemented as a static random access memory (SRAM)-based FIFO that is 64 deep and 256 bits wide. This dense instruction FIFO 1125 receives the instruction from the input interface unit 1105. It sends the data to a thread launch block 1150 when the queue is not empty and the control pipeline 810 is in a thread IDLE state. Due to its depth (in this example), the dense instruction FIFO 1125 can hold a maximum of 64 instructions in flight. Accordingly, the DOQ 804 may be equipped with functionality to allow the DOQ 804 to check the status of the control pipeline 810 to know if a thread is currently active. For instance, this can be tracked and observed by a "Thread 0 FULL" bit in a thread control register 1160. In some implementations, to optimize performance, the DOQ 804 can monitor thread activity by monitoring this thread control register value directly, for instance, as a single wire from the MSR block 1120. When it is determined that the control pipeline 810 is free, the thread launch block 1150 can pull data from the dense FIFO queue 1125 and cause a corresponding program to be launched by the control pipeline 810 by writing initial values to the register file 1165 used by the control pipeline 810 and sending additional data through a pipeline arbiter block 1170 for use by the control pipeline 810 in accessing instructions corresponding to the functions identified in the offloaded workload, configuring the dense compute core array, loading the appropriate operand data in local scratchpad of the dense compute core array, and directing the movement of data and execution of instructions in accordance with performance of the functions by the dense compute array.

In some implementations, machine specific registers (MSRs) (e.g., in MSR block 1120) may include one or more registers to identify (e.g., to software and/or other compute blocks of a platform) the status of the queue maintained by the DOQ 804, as well as the status of functions launched by the DOQ 804. In one example, the MSRs may include one or more status registers and one or more count registers. Given that the DOQ 804 manages a single queue of a set size (e.g., 64 entries), there may be no need for configuration of address and size, simplifying the registers in MSR block 1120. In one example, the MSR status register may be utilized to record and identify the status of the single queue buffer that is managed by the dense offload queue 804. Bit fields in this register may include "full", "empty", and exception information. A Count register may be utilized to identify the number of elements currently in the queue. If this value is non-zero, the thread launch block will know to send the information to the control pipeline to launch the thread, among other examples.

Once the DOQ 804 detects that the control pipeline 810 is idle and the queue has a valid instruction waiting, the DOQ 804 uses the instruction information to launch the thread on the control pipeline. Accordingly, the DOQ 804 may begin by pulling the oldest instruction off of the tail of the dense FIFO queue and update the internal FIFO/queue pointers accordingly. The DOQ 804 may then issue a store operation of the Matrix A Address into the control pipeline register file (e.g., an 8 Byte store into R1), as well as issue a store operation of the Matrix B Address into the control pipeline register file (e.g., an 8 Byte store into R2) and a store operation of the Matrix C Address into the control pipeline register file (e.g., an 8 Byte store into R3). The DOQ 804 may additionally issue a store operation of the Start Program Counter (PC) value to the control pipeline thread 0 program counter MSR (e.g., an 8B store) to identify the first instruction to be executed in a set of instructions or functions embodying the workload to be performed by the dense compute core. The DOQ 804 may then issue a store operation to set the FULL and ENABLE MSR bits in the control pipeline MSR space to kick start the thread. Once these stores are all successful, the thread has been launched and the DOQ's role has concluded for that specific instruction. The DOQ 804 should now return to monitoring the idle status of the control pipeline for launching the next dense-.func (if an instruction is waiting on the queue) on the control pipeline. Once an offload instruction is received and queued (or launched) by the DOQ, the DOQ may send an acknowledgement response, such as discussed above.

Figure 12:
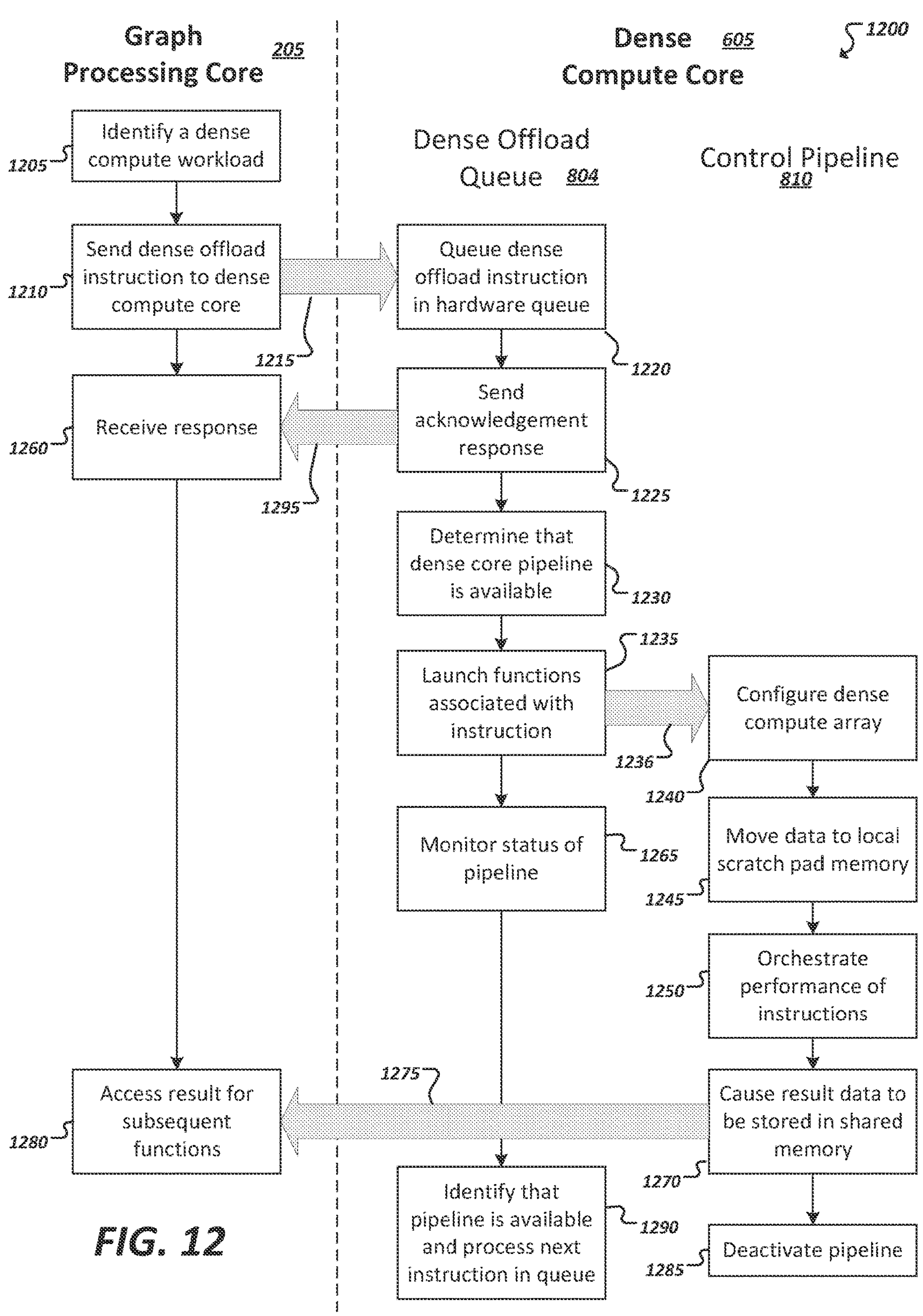
FIG. 12 is a simplified flow diagram illustrating a simplified flow diagram illustrating example flows involved in the offloading of functions from a graph processing core.

A dense offload queue (DOQ) may implement a hardware-based state machine and queue to enable offloading of tasks from graph processing cores to dense compute cores simply and efficiently and with minimal status monitoring my software. The DOQ may manage the queue of offload instructions received at a given dense compute core and launch corresponding threads at the hardware level, allowing software to simply utilize a dense offload function call (e.g., dense.func) and information provided through DOQ MSRs, rather than more granular management of dense compute core usage. FIG. 12 is a simplified flow diagram 1200 illustrating example flows involved in the offloading of functions from a graph processing core (e.g., 205) to a particular dense compute core 605 communicatively coupled within a network (e.g., a high-radix, low diameter network implemented on or between dies).

A graph processing core 205 may identify 1205 one or more functions in an algorithm (being executed by the graph processing core) that involve dense compute functions. Given the sparse compute architecture of the graph processing core 205 to simplify the software model through the provision of a specialized ISA instruction (e.g., dense.func), which the software may call to trigger the use of this hardware-implemented queue (e.g., the DOQ). In response to identifying the dense workload, the graph processing core 205 may send 1210 a dense offload instruction (e.g., 1215) over the network to a particular dense processing core (e.g., 605). As multiple dense compute cores may be accessible to the graph processing core over the network, the graph processing core (e.g., utilizing one or more of its single-threaded pipelines) may determine (e.g., from a register or table maintained in software), which dense compute core(s) are available and have bandwidth to assist in handling this dense compute workload. Accordingly, the graph processing core may identify the particular dense compute core as a candidate and address the instruction 1215 accordingly.

A dense offload queue (DOQ) 804 may queue 1220 offload instructions (and potentially other instructions) received on the network. As discussed above, the DOG 804 may monitor the status of the dense core control pipeline to determine the availability of dense compute resources. In some implementations, upon queuing a received instruction (e.g., 1220), the DOQ 804 may send 1225 a response (e.g., 1295) back to the requesting graph processing core 205 to acknowledge (e.g., 1255) the instruction. In other implementations, an additional or alternative response may be sent based on the launch of functions corresponding to the instructions, among other example implementations. The queue maintained by the DOQ may be FIFO in that, as the dense compute core finished performing a workload corresponding to the earliest received offload instruction, the DOQ may cause the next received offload instruction to be launched (e.g., 1235) upon determining 1230 that the control pipeline is available (e.g., finished with the preceding instruction's workload). Accordingly, the DOQ 804 may message 1236 the control pipeline 810 to reactivate the control pipeline and provide the control pipeline with the information included in the next received instruction (e.g., 1215). The control pipeline 810 may use this information and launch performance of the corresponding functions by configuring 1240 the dense compute array, moving data 1245 to the local scratchpad of the dense compute core (e.g., from shared memory via DMA calls), and identify the set of functions corresponding to the workload and orchestrate the performance of these functions using the dense compute core's resources (e.g., compute array, scratchpad, local memory, etc.).

After launching 1235 the functions, the DOQ 804 may additionally monitor 1265 the status of the control pipeline 810 to the determine whether the performance of the corresponding functions is complete. This may be identified through a register associated with the control pipeline. In some implementations, the pipeline may deactivate following completion of the functions to indicate its availability and status of the functions, among other example implementations. The control pipeline 810 may also orchestrate the delivery of results or outputs (e.g., 1275) generated from performance of the function(s) by causing 1270 result data to be written to shared memory or other memory accessible to the requesting graph processing core. The graph processing core may access 1280 the result data and utilize these results (in some implementations) in the performance of subsequent sparse compute functions associated with a graph analytic algorithm performed using the graph processing core(s). In some implementations, software may cause a program or algorithm to be parallelized by splitting the workload across multiple graph processing cores and/or dense processing cores. For instance, in one example, a result generated by a dense compute core may be accessed and utilized by another graph processing core, other than the graph processing core that requested the corresponding workload offload, among other examples. In some cases, offloaded functions may be blocking functions, while in other instances, the offloaded functions may be performed in parallel with other functions performed by the requesting graph processing core. Indeed, the platform utilizing both graph processing cores and dense compute cores may be highly flexible in its applications and the programs that may be crafted to perform various graph-based algorithms in efficient and optimized ways.

As noted above, a DOQ may monitor 1265 the status of the control pipeline and determine 1290 when the control pipeline has completed directing the performance of a given workload and is available to be reactivated again to launch a next workload associated with a next offload instruction in the DOQ queue. Indeed, upon identifying the availability of the control pipeline 810, the DOQ 804 may pop the next instruction off the queue and repeat the flow by again launching functions associated with this next instruction and so on in accordance with the programs being run on the platform.

In some implementations, the memory and memory controllers accessible to and used by graph processing cores and/or dense compute cores in a graph processing system may be enhanced to more efficiently handle memory transactions in graph analytics applications. Traditional cache hierarchies can tend to provide low utilization in graph application scenarios, as they provide a high data granularity, e.g., 64B or larger for each cache line access, while typical graph applications may tend to only need 8B or less at a time. As a result, the execution of graph applications may suffer from inefficient cache or bandwidth utilization as caches are thrashed with single-use sparse accesses and potentially useless prefetches, with most 64B memory fetches containing only one 8B useful data element. Accordingly, graph processing systems, such as described herein, may be specifically adapted to provide limited caching and/or small granularity memory accesses to better handle the sparse memory access behavior of graph applications, such as set forth in the examples below. For instance, memory controllers (e.g., 1310, 1410, 1710) and/or memory modules (e.g., 2100) may be included within a graph processing system and be accessible to graph processing cores and/or dense compute cores as described above that support native 8B granular accesses, allowing for more efficient fetching of sparse data such as that found in graph applications. For example, one or more of the memory controllers or memory access techniques described below may be implemented in the memory controller circuitry (e.g., 250, 610) of the example graph processing devices and systems introduced above (e.g., in FIG. 4 and FIG. 6), among other examples.

Coarse-grained memory access, such as 64-byte (64B) access, is used in most modern computing systems. However, fine-grained memory access, such as 8-byte (8B) access, is crucial for performing certain workloads efficiently, such as random sparse workloads. For example, for spare graph analytics processing, memory transactions accessing at 8B data granularity is optimal for power and performance efficiency.

Certain types of commodity memory, such as Double Data Rate 4 (DDR4) and earlier technology, have native 8B access granularity. However, modern memory technology, such as DDR5, graphics DDR (GDDR), Low-Power DDR (LPDDR), and other future technologies, are increasing the native memory access granularity to 16B and beyond. While these technologies offer increased power and performance efficiency, the increased access granularity results in a reduced effective bandwidth for 8B memory accesses. For example, a single DDR5 transaction to access 8B of data is 50% less efficient since only half of the 16B transfer is ultimately used, which is a significant performance hit for data-intensive workloads that primarily involve 8B memory access.

As a result, current solutions are forced to either continue using older commodity technology with native 8B access granularity (e.g., DDR4), or alternatively, develop custom/non-commodity memory solutions. Older technology provides no scalability in terms of performance and capacity, however, and non-commodity/custom memory solutions are prohibitively expensive and will not scale at volume.

Accordingly, this disclosure presents various embodiments for enabling 8-byte (8B) memory access—with no or minimal bandwidth loss—using dual-rank commodity memory with native access granularity above 8B, such as dual-rank DDR5 with 16B access granularity. In particular, by enabling multiple ranks of memory technology on a shared command bus with an oscillating chip select—using either shared or separate data lines depending on the embodiment—memory technology with a wider access granularity can be used to provide an 8B "pseudo-channel" with maximum, or near maximum, bandwidth efficiency.

For example, in embodiments with shared data lines, this can be achieved by configuring a "burst chop" that allows each device (e.g., memory rank) to only use the channel for the 8B transaction needed before handing it off to the next device for the following 8B burst. If accesses are alternated between devices, and the separation time between bursts is minimized, near full-rate access at 8B granularity can be achieved.

In other embodiments, by dedicating certain data lines to each device (e.g., each memory rank), and alternating read commands between devices using an oscillating chip select, full-rate access at 8B granularity can be achieved.

These embodiments provide various advantages. For example, the described embodiments enable the use of commodity next-generation memory—with 16B access granularity or higher—while still maintaining optimal 8B access performance. In this manner, the latest, most advanced memory technologies can be used without the prohibitive costs associated with non-commodity memory solutions. In addition, by building off of existing Joint Electron Device Engineering Council (JEDEC) memory standards, the development and implementation of these memory solutions are simplified.

Figures 13A, 13B:
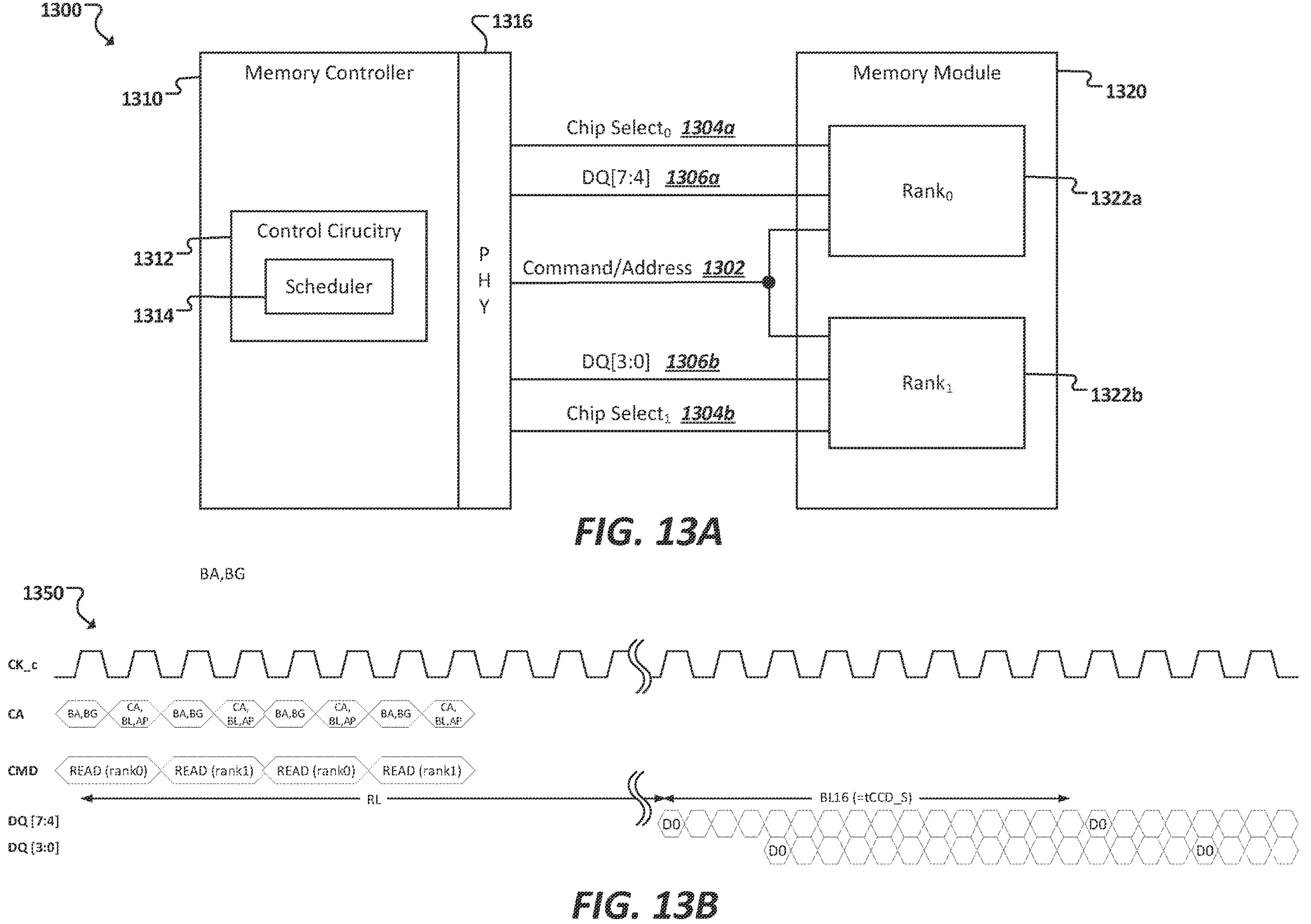
FIGS. 13A-13B illustrate an example embodiment of a memory system with a pseudo-channel for 8-byte memory access at full bandwidth using dual rank memory.

FIGS. 13A-13B illustrate an example embodiment of a memory system 1300 with a pseudo-channel for 8-byte (8B) memory access at full bandwidth using dual rank memory. In particular, FIG. 13A illustrates the memory system 1300, and FIG. 13B illustrates a corresponding timing diagram 1350 showing the behavior of the memory system 1300.

In the illustrated embodiment, memory system 1300 includes a memory controller 1310, a dual-rank memory module 1320, a shared command/address bus 1302, multiple chip select interfaces 1304*a,b*, and multiple data buses 1306*a,b*. The memory controller 1310 includes control circuitry 1312 (with a scheduler 1314) for processing memory requests and physical layer (PHY) circuitry 1316 for communication with the memory module 1320. The dual-rank memory module 1320 includes two memory ranks 1322*a,b*, a first memory rank $rank_0$ (1322*a*) and a second memory rank $rank_1$ (1322*b*). In some embodiments, for example, the memory module 1320 may be commodity memory with native access granularity above 8 bytes (8B), such as a dual-rank DDR5 with a 4-bit width (×4) and 16B native access granularity.

The command/address bus 1302 is shared by $ranks_{0-1}$ 1322*a,b* of the dual-rank memory module 1320, but each rank 1322*a,b* has a dedicated 4-bit wide data bus 1306*a,b*. For example, the notation DQ[7:0] refers to eight data lanes between the memory controller 1310 and the memory module 1320, and DQ[7:4] is assigned to $rank_0$ while DQ[3:0] is assigned to $rank_1$.

This "pseudo-channel" configuration is used to eliminate bandwidth loss for 8B access, which is essentially a dual rank configuration comprised of two x4 DDR5 ranks with a shared command/address bus and separate data buses. For example, unlike traditional dual rank configurations where command/address and data buses are shared by two ranks, only the command/address bus 1302 is shared in memory system 1300, but each rank 1322*a,b* has its own data bus 1306*a,b*.

Since command/address buses are less busy than data buses in DDR5 (e.g., from 2 cycles of command/address, 4 or 8 cycles of data are transferred), a command/address bus can be shared across two data buses without negatively impacting performance. In addition, since each rank has its own data bus, there is no additional rank switching delay (compared to the embodiment shown and described below in FIGS. 14A-B). As a result, in memory system 1300, the full bandwidth of the data bus DQ[7:0] can be utilized for 8B access even though the native access granularity of DDR5 is 16B.

For example, as shown in the signal timing diagram 1350 of FIG. 13B, read commands for $rank_0$ and $rank_1$ are alternated over the command bus, such as READ($rank_0$), READ($rank_1$), READ($rank_0$), READ($rank_1$), etc. This is achieved by oscillating the signals on the chip select interfaces 1304*a,b* of the respective memory ranks. Moreover, the data payloads for each rank are transmitted via separate lanes of the data bus, DQ[7:4] for $rank_0$ and DQ[3:0] for $rank_1$. In this manner, there are no rank switching delays, and the full bandwidth of the data bus is used for 8B access. For example, each read command causes one of the memory ranks ($rank_0$/$rank_1$) to read 8 bytes of data, which is transmitted on the corresponding 4-bit data bus for that memory rank (DQ[7:4] or DQ[3:0]) over 16 cycles (4 bits/cycle).

Figures 14A, 14B:
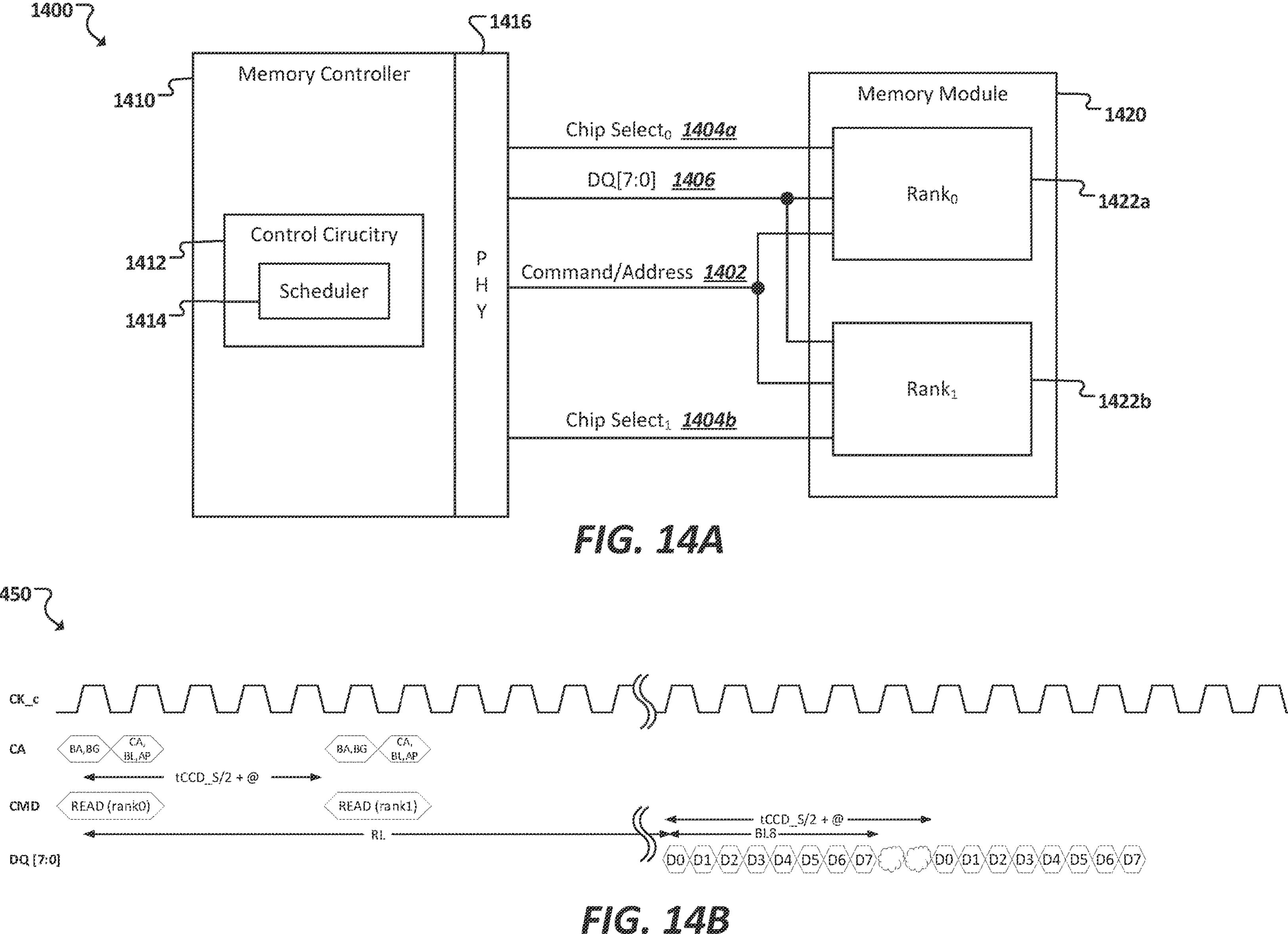
FIGS. 14A-14B illustrate an example embodiment of a memory system that provides 8-byte memory access with minimal bandwidth loss using dual rank memory.

FIGS. 14A-14B illustrate an example embodiment of a memory system 1400 that provides 8-byte (8B) memory access with minimal bandwidth loss using dual rank memory. In particular, FIG. 14A illustrates the memory system 1400, and FIG. 14B illustrates a corresponding timing diagram 1450 showing the behavior of the memory system 1400.

In the illustrated embodiment, the memory system 1400 includes a memory controller 1410, a dual-rank memory module 1420, a shared command/address bus 1402, multiple chip select interfaces 1404*a,b*, and a shared 8-bit data bus DQ[7:0] 1406. The memory controller 1410 includes control circuitry 1412 (with a scheduler 1414) and physical layer (PHY) circuitry 1416. The dual rank memory module 1420 includes two memory ranks 1422*a,b*, $rank_0$ and $rank_1$.

In the illustrated embodiment, the memory system 1400 is similar to the memory system 1300 of FIG. 13A with a few exceptions. In particular, the memory system 1400 is implemented with an 8-bit data bus 1406 shared across both ranks 1422*a,b* instead of a separate 4-bit data bus for each rank 1422*a,b*. In some embodiments, for example, the memory system 1400 may be implemented using dual rank 8-bit wide (x8) memory, such as x8 DDR5 memory.

In the illustrated embodiment, the memory system 1400 is configured in "burst chop" mode, which allows each memory rank 1422*a,b* to only use the channel 1306 for the 8B transaction needed before handing it off to the next rank for the following 8B burst. For example, if two x8 DDR5 ranks 1422*a,b* with "burst chop" enabled are interleaved, the bandwidth loss for 8B access can be reduced.

For example, as shown in the timing diagram 1450 of FIG. 14B, each read command causes one of the memory ranks to read 8 bytes of data (D0-D7), which is transmitted on the shared 8-bit channel DQ[7:0] over 8 cycles (8 bits/cycle). By alternating the access between ranks (e.g., via oscillating the chip selects 1404*a,b*), and minimizing the separation time between bursts, near full-rate access at 8B granularity is achieved. For example, because switching between ranks introduces a slight delay, the 8B access does not achieve 100% utilization of the data bus.

By comparison, FIGS. 15A-15B illustrate example signal timing diagrams 1510, 1520 for memory systems that provide 8-byte (8B) memory access at half bandwidth. In particular, timing diagram 1510 shows the behavior of a memory system with 8B access using an 8-bit wide (x8) DDR5 module in "burst chop" mode. Although burst chop mode, where the burst length becomes 8, can enable 8B access on a DDR5-based memory channel, only half of the bandwidth is utilized because the minimum inter-command delay (tCCD_S) is constant regardless of the burst length, as shown in timing diagram 1510. For example, even with a shorter burst length of 8, commands can only be sent every 16 cycles, resulting in an 8 cycle delay after transmission of the shortened burst. Thus, only half of the bandwidth of the data bus is utilized for 8B access.

Timing diagram 1520 shows the behavior of a memory system with 8B access using a 4-bit wide (x4) DDR5 module. If x4 DDR5 is used, the 8B access can be enabled without changing the burst length (e.g., burst length=16). However, the peak bandwidth is half of the x8-based memory channel due to the narrower data bus (4-bit vs. 8-bit), as shown in FIG. 15B. Thus, only half of the bandwidth of the data bus is utilized for 8B access.

Figure 16:
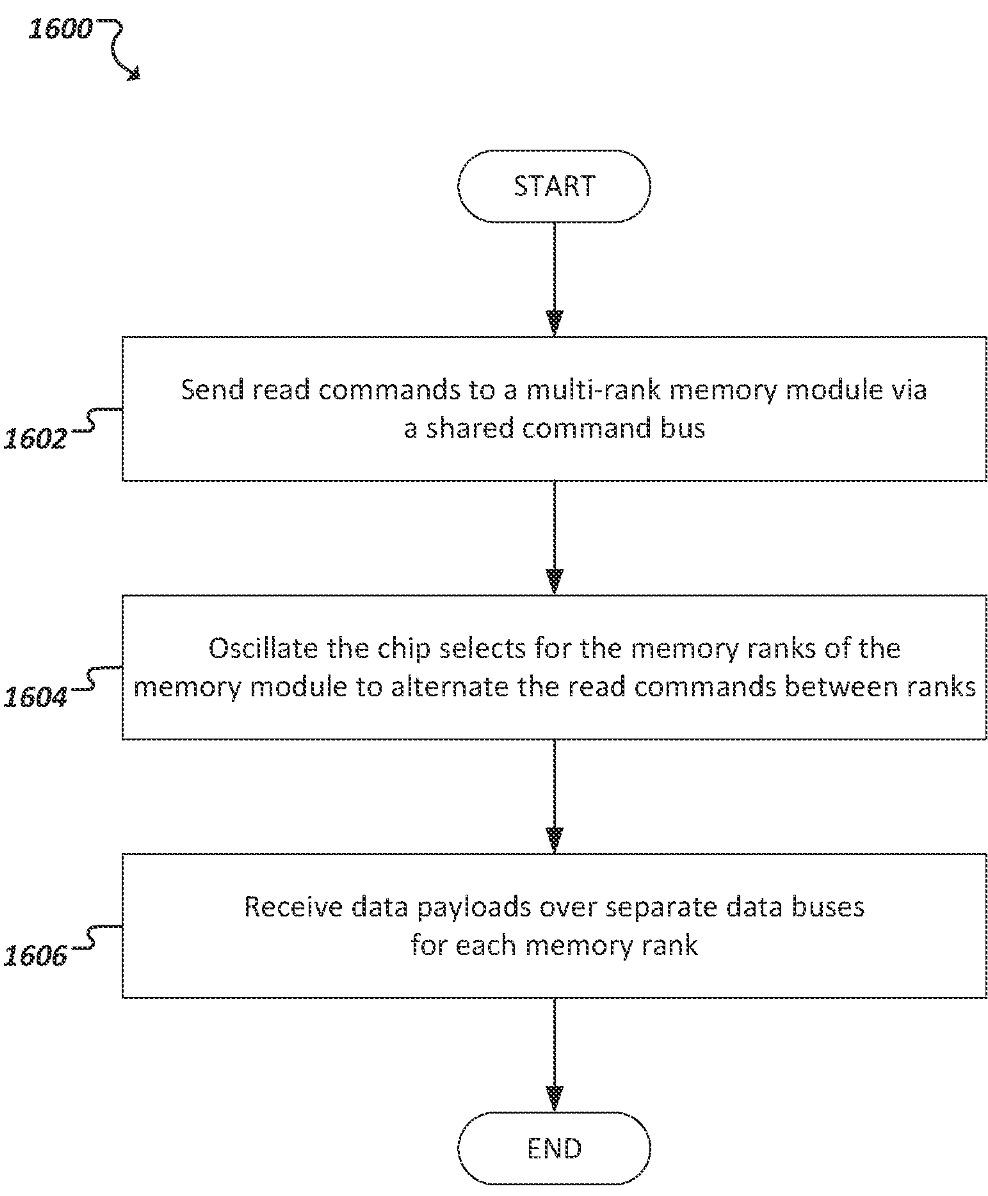
FIG. 16 illustrates a flow diagram for performing 8-byte memory access at full bandwidth using multi-rank memory.

FIG. 16 illustrates a flow diagram 1600 for performing 8-byte (8B) memory access at full bandwidth using multi-rank memory in accordance with certain embodiments. In some embodiments, operations of the example process 1600 may be encoded as instructions in a machine-readable storage medium (e.g., as software or firmware), such that execution of the instructions by hardware logic or circuitry may implement the operations shown in FIG. 16 and described below. For example, one or more operations of the example process 1600 may be performed by circuitry of a memory controller (e.g., control circuitry 1312 and/or physical layer (PHY) circuitry 1316 of memory controller 1310 of FIG. 13A) executing or implementing firmware instructions in certain embodiments. Although described below with respect to a dual rank memory configuration, the operations of the process 1600 can also be used to perform 8-byte (8B) memory access at full bandwidth using quad or octal rank memory configurations as well.

In some embodiments, for example, process 1600 may be performed by a memory controller connected to a multi-rank memory module via a memory bus. For example, the multi-rank memory module may be a dual-rank memory module with two memory ranks, $rank_0$ and $rank_1$. In other embodiments, the memory module may have any number of memory ranks, such as a quad-rank memory module (e.g., four ranks) or an octal-rank memory module (e.g., eight ranks). Moreover, in some embodiments, the memory module may have a native data access granularity greater than 8 bytes (8B), such as a Double Data Rate 5 (DDR5) memory module with a 16-byte (16B) access granularity.

The memory bus may include a shared command/address bus, which is used by the memory controller to send commands to the memory module and is shared across the respective memory ranks. In addition, the memory bus may include separate data buses for the respective memory ranks, along with separate chip select interfaces. In some embodiments, each data bus may have a 4-bit width and may be used to transmit data payloads for a corresponding memory rank.

The memory controller may include physical layer (PHY) circuitry and control circuitry. The PHY circuitry is used to communicate with the memory module via the memory bus (e.g., the shared channel bus, data buses, chip select interfaces, etc.). The control circuitry is used to send commands to the memory module (e.g., read and write commands) and to receive/return data payloads in response to the commands.

In the illustrated example, the process flow begins at 1602, where the memory controller schedules/sends read commands to the multi-rank memory module via the shared command bus. In some embodiments, for example, each read command causes 8 bytes of data to be read (e.g., over 16 cycles with 4 bits/cycle) from one of the memory ranks (e.g., depending on which rank is activated via its corresponding chip select interface).

At 1604, the memory controller simultaneously oscillates the chip select interfaces for the respective memory ranks to alternate the read commands between ranks. For example, the memory controller may schedule the read commands for transmission over the command bus, and for each read command, the memory controller may selectively activate the chip select interface for a particular memory rank, thus directing the read command to the appropriate memory rank.

In this manner, the read commands can be alternated between the respective memory ranks by activating the appropriate chip select interfaces at the appropriate times. For example, the memory controller may oscillate a chip select signal on each chip select interface to cause the read commands to alternate between the respective memory ranks, such as alternating between $rank_0$ and $rank_1$ for a dual-rank memory module, where each read command is sent to a different memory rank than the immediately preceding and following read commands. In this manner, the read commands for each rank are interleaved on the command bus.

At 1606, the memory controller receives data payloads from the respective memory ranks over separate data buses. With respect to a dual-rank memory module, for example, the memory controller may receive data payloads from $rank_0$ over one data bus (e.g., a 4-bit bus/four data lines) and data payloads from $rank_1$ over another data bus (e.g., another 4-bit bus/four data lines). In this manner, data can be accessed at 8-byte (8B) granularity at the full bandwidth of the memory module even though its native access granularity is 16 bytes (16B).

The example process 1600 may include additional or different operations, and the operations may be performed in the order shown or in another order. In some cases, one or more of the operations shown in FIG. 16 are implemented as processes that include multiple operations, sub-processes, or other types of routines. In some cases, operations can be combined, performed in another order, performed in parallel, iterated, or otherwise repeated or performed another manner.

Traditional dual rank memory channel configurations can have significant delays caused by rank switching, e.g., to account for variations in rank timing. For example, in a traditional dual rank memory channel configuration, the two ranks are initially read/write trained (e.g., leveled) to determine delay line values for each rank and these results are stored and used separately, i.e., each value is used when performing memory accesses on the corresponding memory rank. Since two ranks share the same data bus in a traditional configuration and only one rank can be accessed at a time, data bus input/output (I/O) transceivers in the memory controller physical layer (PHY) are shared by the two ranks. When accessing the different ranks, the respective delay line values obtained from the training are applied, i.e., the delay line value for rank0 may be used for memory accesses to rank0 and the delay line value for rank1 may be used for accesses to rank1. To do this, the memory controller must switch between the different delay line values, which is not an immediate operation due to analog transients or other factors. In general, switching and applying different delay line values in the memory controller PHY can take multiple cycles. This additional switching time can negatively affect memory scheduling and performance when accessing different ranks.

Accordingly, in embodiments of the present disclosure, both ranks of a dual rank memory channel configuration may be trained separately as before; however, in contrast to current techniques, the separate training results may be used to obtain a single delay line value that is used for accessing each rank rather than applying the different delay line values for each rank. For example, the separate delay line values may be used to determine a single delay line value/Vref configuration to be applied to both ranks. For instance, in some embodiments, the different delay line values may be averaged, and the average value may be used for memory accesses to each rank.

With the same delay settings set for each rank, there will accordingly be no additional delay caused by the switching of the delay line values as in current techniques, e.g., from termination or voltage level changes, and thus, rank switching can be done with little or no delay. While this may cause some delay due to the slight variations in rank trace routing for the different ranks, such delays may be mitigated with the dual rank DIMM design described further below. Moreover, embodiments herein may allow for full channel bandwidth capability at 8-byte (8B) granularity using advanced commodity memory with >8B access granularity.

Figure 17:
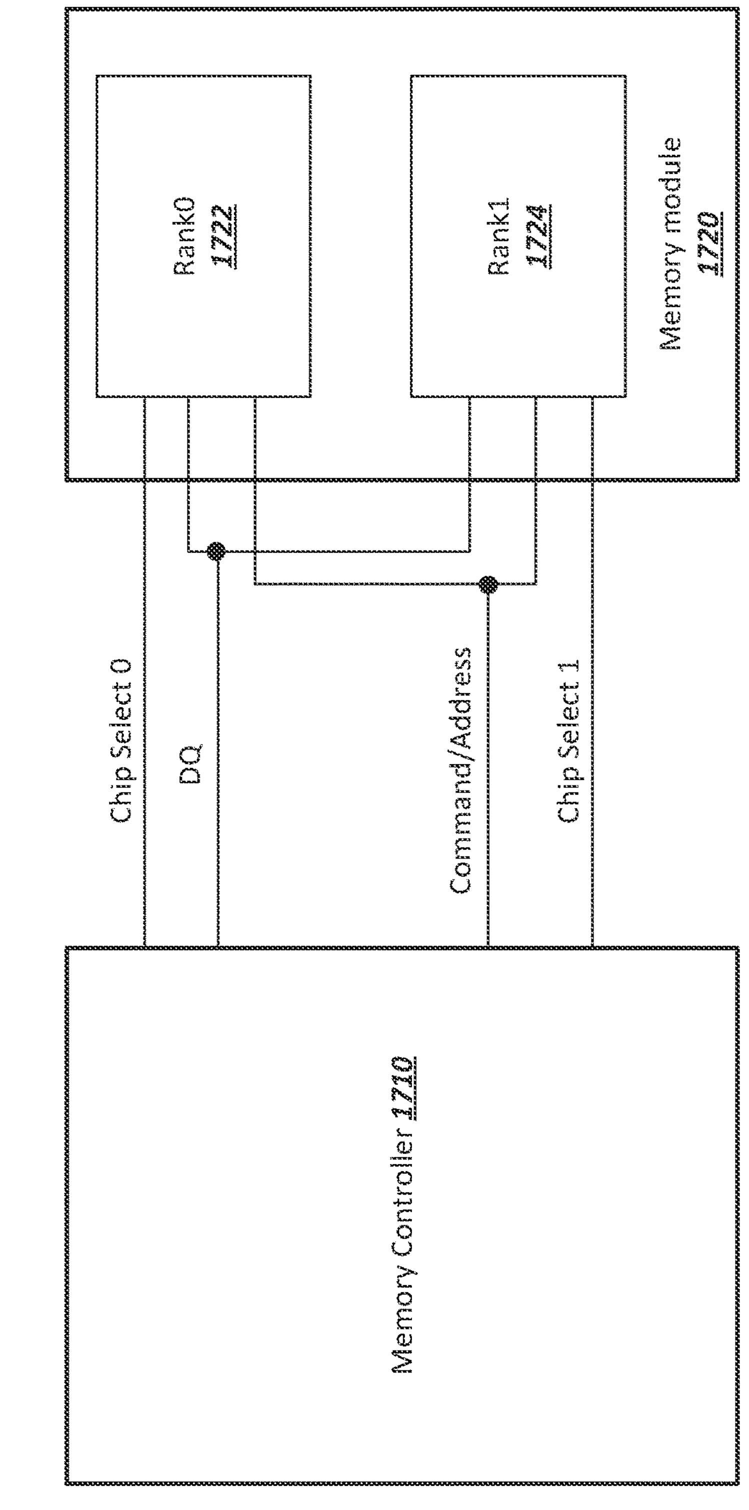
FIG. 17 illustrates a simplified block diagram of an example memory system.

FIG. 17 illustrates a simplified block diagram of an example memory system 1700 in accordance with embodiments of the present disclosure. In the example shown, the system 1700 includes a memory controller 1710 connected to a memory module 1720. The memory module 1710 may send a number of signals to the memory module 1720 to perform memory access requests, e.g., reads or writes to the memory of the memory module 1720, and the signals may be transmitted over a number of buses including a command/address (CA) bus on which a command type (e.g., read vs. write) may be indicated, a chip select (CS) bus (Chip Select 0 and Chip Select 1 in the example shown) on which a rank within the memory module 1720 (e.g., 1722 or 1724) to be accessed may be indicated, and a data bus (DQ) on which data read or written is transmitted between the memory controller 1710 and the memory module 1720. In embodiments here, the memory controller 1710 may utilize the techniques described herein to reduce the amount of delay caused by rank switching in memory accesses.

Figure 18:
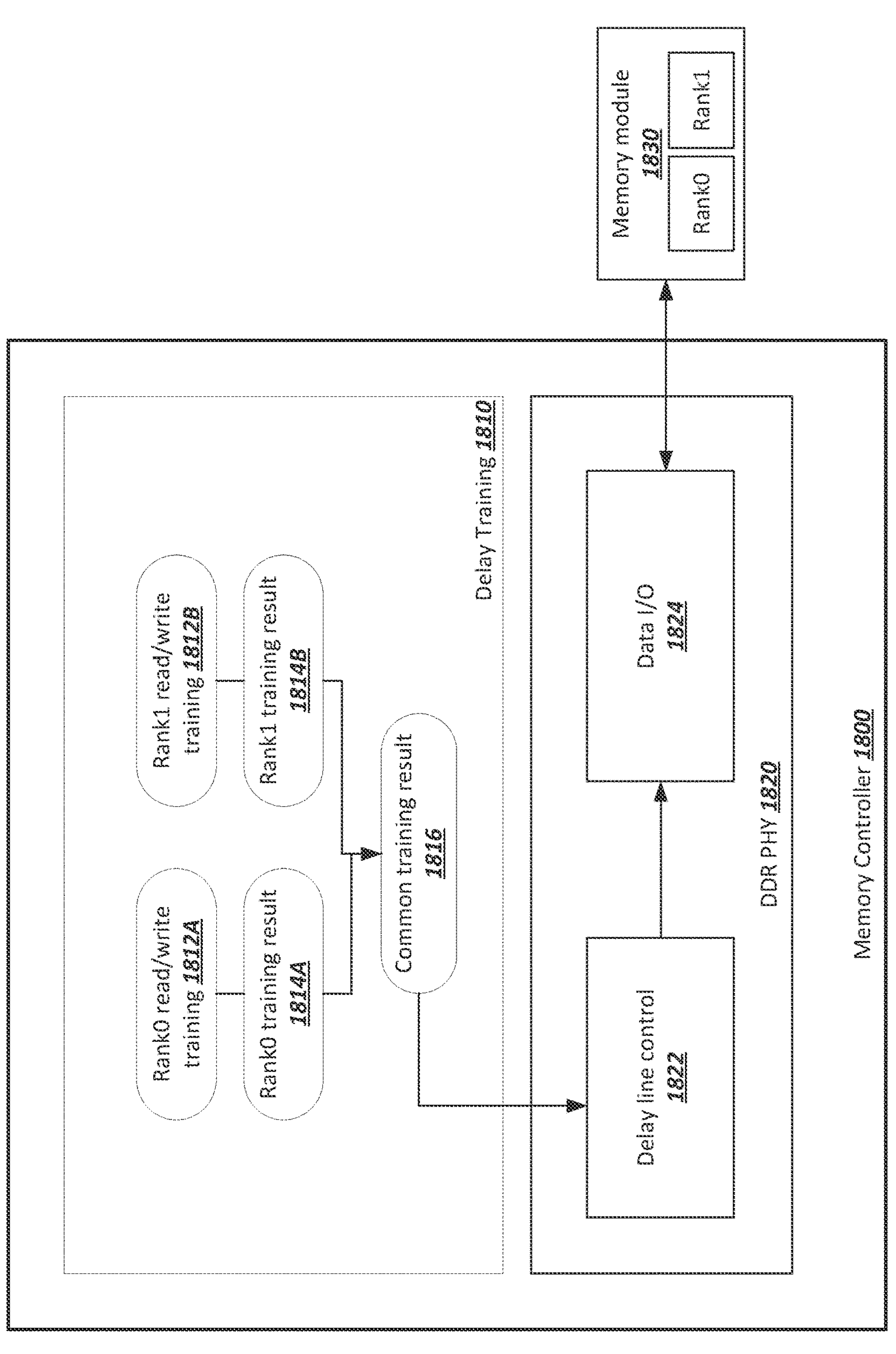
FIG. 18 is a simplified block diagram of an example memory controller.

FIG. 18 illustrates a simplified block diagram of an example memory controller 1800 in accordance with embodiments of the present disclosure. The example memory controller 1800 of FIG. 18 may be implemented within the system 1700 in particular embodiments. The example memory controller 1800 includes a delay training module 1810 and DDR PHY circuitry 1820. The delay training module 1810 includes circuitry to perform read/write training for memory modules (e.g., 1830) that are connected to the memory controller 1800 through the DDR PHY circuitry 1820. For example, the delay training module 1810 may perform training to obtain delay line values for one or more signal skews, and the delay line value may be used as an extra offset to compensate or cancel out the skews. For instance, there are multiple physical pins that connect the memory controller 1800 to DRAM of the memory module 1830 and to clock (CK), channel select (CS), data strobe (DQS), and data signals for each of the DRAM devices of the memory module 1830, and the training may determine delay line values to be applied to each of these pins to ensure proper signal alignment between the memory controller 1800 and the memory module 1830.

For instance, some embodiments may determine delay line values for a CK to CS skew from CS training, a CK to CA skew (from CA training), a write CK to DQS skew (both CK and DQS signals from the memory controller) from write leveling, a read CK to DQS skew (CK signal from the memory controller, DQS signal from DRAM) from read leveling, a write DQ to DQS skew for each DRAM device of a memory module from write training, and/or a read DQ to DQS skew for each DRAM device of a memory module from read training. Although illustrated in FIG. 18 as being implemented separate from the DDR PHY circuitry 1820 within the memory controller 1800, in some embodiments, the delay training module 1810 may be implemented within the DDR PHY circuitry 1820.

In the example shown, the memory module 1830 implements two memory ranks, Rank0 and Rank1 as a dual rank memory module. The delay training module 1810 may perform a read/write training for each rank of the memory module 1830 and obtain a delay line value to be applied to adjust and properly align a skew such as the CK to DQS skew. The training may involve the memory controller 1800 sending test clock (CK) and data (DQ)/data strobe (DQS) signals to the memory module 1830 and adjusting (e.g., based on confirmation messages received back from the memory module 1830) a delay applied to the timing between such signals so that they are properly received at the memory module 1830. This training may be performed for each rank of the memory module 1830.

For instance, referring to the example shown in FIG. 18, the delay training module 1810 may perform a read/write training algorithm 1812A, 1812B for each of Rank0, Rank1 of the memory module 1830 connected to the memory controller 1800. The read/write training algorithms may yield separate training results 1814A, 1814B, i.e., separate delay line values to be applied between the clock and data signals and/or between the clock and data strobe signals for performing read/write operations in Rank0, Rank1, respectively. The delay training module 1810 may then determine a common training result 1816 (i.e., a common delay line value) that is based on the separate results 1814A, 1814B. In some embodiments, for example, the delay training module 1810 may obtain the common training result 1816 by averaging the delay line values obtained by the results 1814A, 1814B.

The memory controller 1800 may then program the common delay line value (1816) into the delay line control circuitry 1822 of the DDR PHY circuitry 1820. For example, the value may be programmed as a register value within the delay line control circuitry 1822, which may use the programmed value to cause the data I/O circuitry 1824 of the DDR PHY circuitry 1820 to apply a particular timing delay adjustment between clock (CK) and data signals (DQ) and/or the clock (CK) and data strobe (DQS) signals that are sent to the memory module 1830 (among other signals). When the same delay is applied to each memory rank in this way, the additional delay line switching latency discussed above can be eliminated. Since there is no more additional latency cause by the rank switching, the data bus can be fully utilized. This benefit is shown in the timing diagrams of FIGS. 19A-19B.

Figures 19A, 19B:
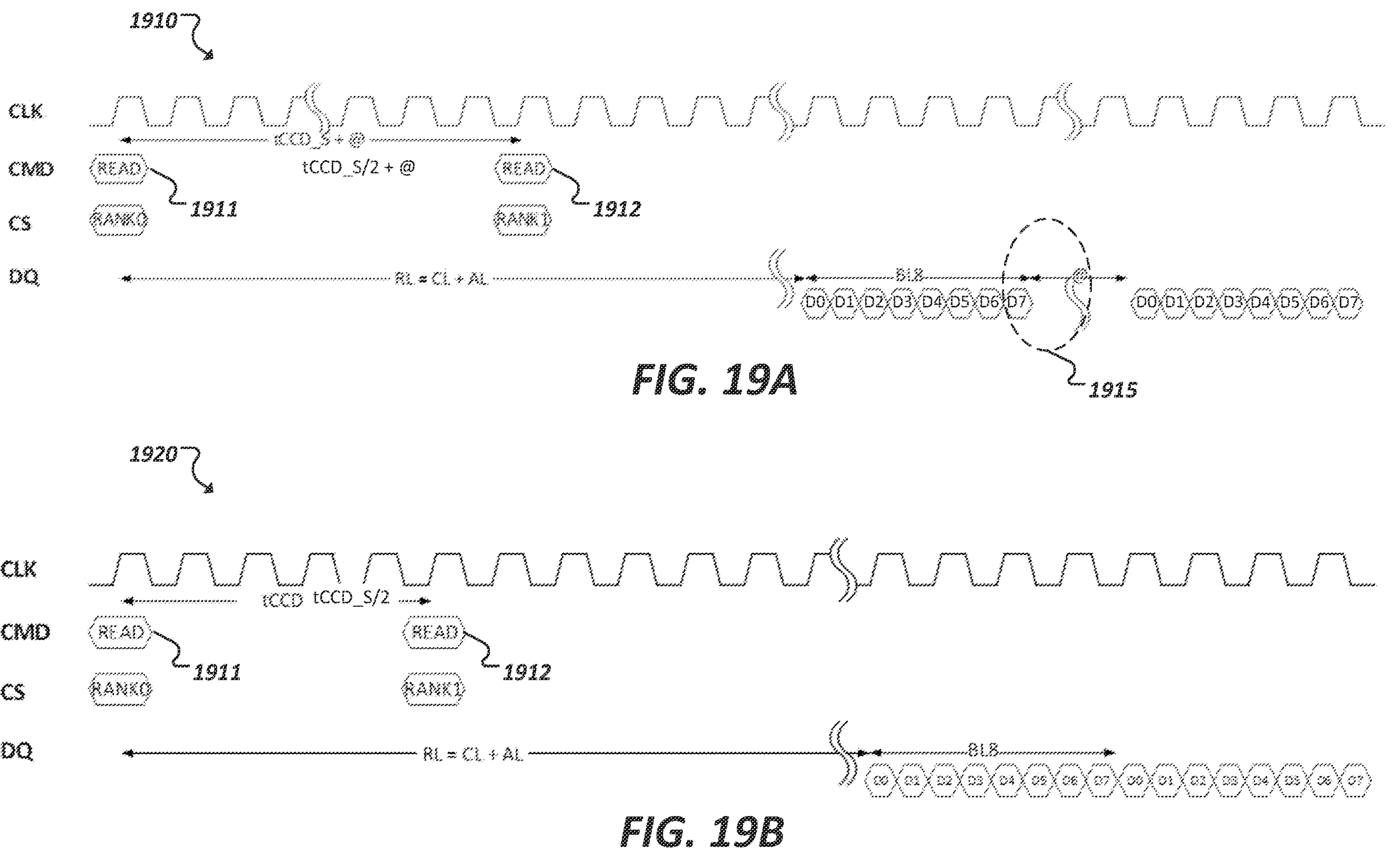
FIG. 19A is an example signal timing diagram that includes a delay caused by rank switching in traditional dual rank configurations.
FIG. 19B is a representation of an example signal timing diagram.

In particular, FIG. 19A illustrates an example signal timing diagram 1910 that includes a delay caused by rank switching in traditional dual rank configurations, while FIG. 19B illustrates an example signal timing diagram 1920 in accordance with embodiments of the present disclosure. In the examples shown, the CLK signal represents a clock signal, the CMD signal represents a command signal, the CS signal represents a channel select signal (i.e., indicating which rank of a memory module to read from/write to), and the DQ signal represents a signal on a data bus between the memory controller and the memory module.

Referring first to the timing diagram 1910, two reads 1911, 1912 to different ranks (Rank0, Rank1) are shown. The reads 1911, 1912 are scheduled with a tCCD_S/2 timing, but an additional rank switching delay (indicated by the @ symbol in FIG. 19A) caused by the analog settling etc. in the delay line control circuitry of a memory controller (e.g., 1822) is added. Thus, as shown in FIG. 19A, the data bus (DQ) is not fully utilized in this rank interleaving scenario, as indicated by the gap 1915 in data being transferred on the bus.

Referring now to the timing diagram 1920 of FIG. 19B, two reads 1921, 1922 to different ranks (Rank0, Rank1) are shown again. However, in contrast to the timing diagram 1910 of FIG. 19A, the reads 1911, 1912 are scheduled with just the standard tCCD_S delay, and because there is no delay line value switching being performed by the delay line control circuitry of a memory controller (e.g., 1822) as in the example shown in FIG. 19A, there is accordingly no gap in the data transferred on the data bus (DQ) when rank interleaving is performed.

Furthermore, since some DDR timing restrictions such as tCCD, tRRD and tRTP are not valid for different rank accesses, the rank interleaving as shown in FIGS. 19A-19B may allow for higher flexibility in scheduling memory commands and may lead to additional performance improvements. Thus, unlike traditional dual rank configurations, where rank interleaving always brings a negative impact on the performance, rank interleaving used in conjunction with the techniques described herein can improve the performance of a computing system. Table 2 below illustrates minimum timing intervals between two various commands (e.g., read (RD) and write (WR) commands), as compared between a single rank access and interleaving ranks with the common delay line value techniques described herein. Each of the timing values in Table 2 below (e.g., tCCD_L, tCCD_S, etc.) reference timing values of the JEDEC standard.

TABLE 2

Minimum timing interval when single rank access and rank interleaving

| | Single rank access | Rank interleaving w/common delay line value |
|---|---|---|
| RD-RD, WR-WR for same bank group | tCCD_L | tCCD_S |
| RD-RD, WR-WR for different bank group | tCCD_S | tCCD_S |
| RD-WR | CL-CWL + BL/2 + 2 + (tRPST-0.5) + tWPRE | CL-CWL + BL/2 + 2 + (tRPST-0.5) + tWPRE |
| WR-RD for same bank group | CWL + BL/2 + tWTR_L | CWL + BL/2-CL |
| WR-RD for different bank group | CWL + BL/2 + tWTR_A | CWL + BL/2-CL |

FIG. 20 illustrates a flow diagram of an example process 2000 of using a common delay line value for accessing any rank in memory in accordance with embodiments of the present disclosure. In some embodiments, operations of the example process 2000 may be encoded as instructions in a machine-readable storage medium (e.g., as software or firmware), such that execution of the instructions by hardware logic or circuitry may implement the operations shown in FIG. 20 and described below. For example, one or more operations of the example process 2000 may be performed by circuitry of a memory controller (e.g., delay training circuitry 1810 or DDY PHY circuitry 1820 of FIG. 18) executing or implementing firmware instructions in certain embodiments. Although described below with respect to a dual rank memory configuration, the operations of the process 2000 can also be used to determine common delay line values for use with quad or octal rank memory configurations as well.

At 2002, a read/write training is performed for each rank of a dual rank memory module to obtain delay line values for each of the respective ranks. A number of delay line values may be determined at 2002. That is, for each rank, a delay line value for each pin/skew as described above may be determined (e.g., CK to DQS and/or DQS to DQn (where n represents a $n^{th}$ DRAM device of the memory module (for reads and writes, respectively), etc.). For example, a first delay line value for a CK to DQS skew may be obtained for a first rank of the dual rank memory module and a second delay line value for a for a CK to DQS skew may be obtained for a second rank of the dual rank memory module, a first delay line value for a read DQS to DQ0 skew may be obtained for a first rank of the dual rank memory module and a second delay line value for a for a read DQS to DQ0 skew may be obtained for a second rank of the dual rank memory module, a first delay line value for a write DQS to DQ0 skew may be obtained for a first rank of the dual rank memory module and a second delay line value for a for a write DQS to DQ0 skew may be obtained for a second rank of the dual rank memory module, etc. In many instances, the respective delay line values for each rank may be different from one another; however, in some instances, they may be the same.

At 2004, a common delay line value is determined for each skew based on the respective delay line values obtained from training for each rank at 2002. In some embodiments, this may include averaging the delay line values obtained for each of the ranks. For example, the common delay line value for the CK to DQS skew may be the average of the first and second delay line values obtained for the CK to DQS skew, the common delay line value for the read DQS to DQ0 skew may be the average of the first and second delay line values obtained for the read DQS to DQ0 skew, the common delay line value for the write DQS to DQ0 skew may be the average of the first and second delay line values obtained for the write DQS to DQ0 skew, etc.

At 2006, the common delay line values are programmed into delay line control circuitry of a memory controller, and 2008, the common delay line value is used by the memory controller (e.g., by the PHY circuitry of the memory controller) for accessing any rank in the memory module. That is, there is no delay line value switching performed for accesses to different ranks, as there is in traditional dual or multi-rank memory configurations, allowing for lower latencies and potential benefits when used with a rank interleaving scheme for read/write operations.

The example process 2000 may include additional or different operations, and the operations may be performed in the order shown or in another order. In some cases, one or more of the operations shown in FIG. 20 are implemented as processes that include multiple operations, sub-processes, or other types of routines. In some cases, operations can be combined, performed in another order, performed in parallel, iterated, or otherwise repeated or performed another manner.

Typical DDR5 memory modules consist of two channels, and if the DRAMs of the DDR5 memory module are x8 devices (i.e., they each have an 8-bit wide data bus), each channel has 32-bit width data bus. Further, all DRAM devices are typically placed on a single side of a memory module, with certain DRAMs being placed further away from the input/output pins at the bottom of the module. This can cause differences in the characteristics of the electrical channels between a memory controller and the various DRAMs of a memory module. In contrast, embodiments of the present disclosure may utilize a memory module (e.g., a DDR5 memory module) that matches a form factor of typical DDR5 memory modules but utilizes a novel same pinout and configuration of the DRAM devices on the module to allow for optimal rank matching and minimized rank switching latencies.

Figure 21:
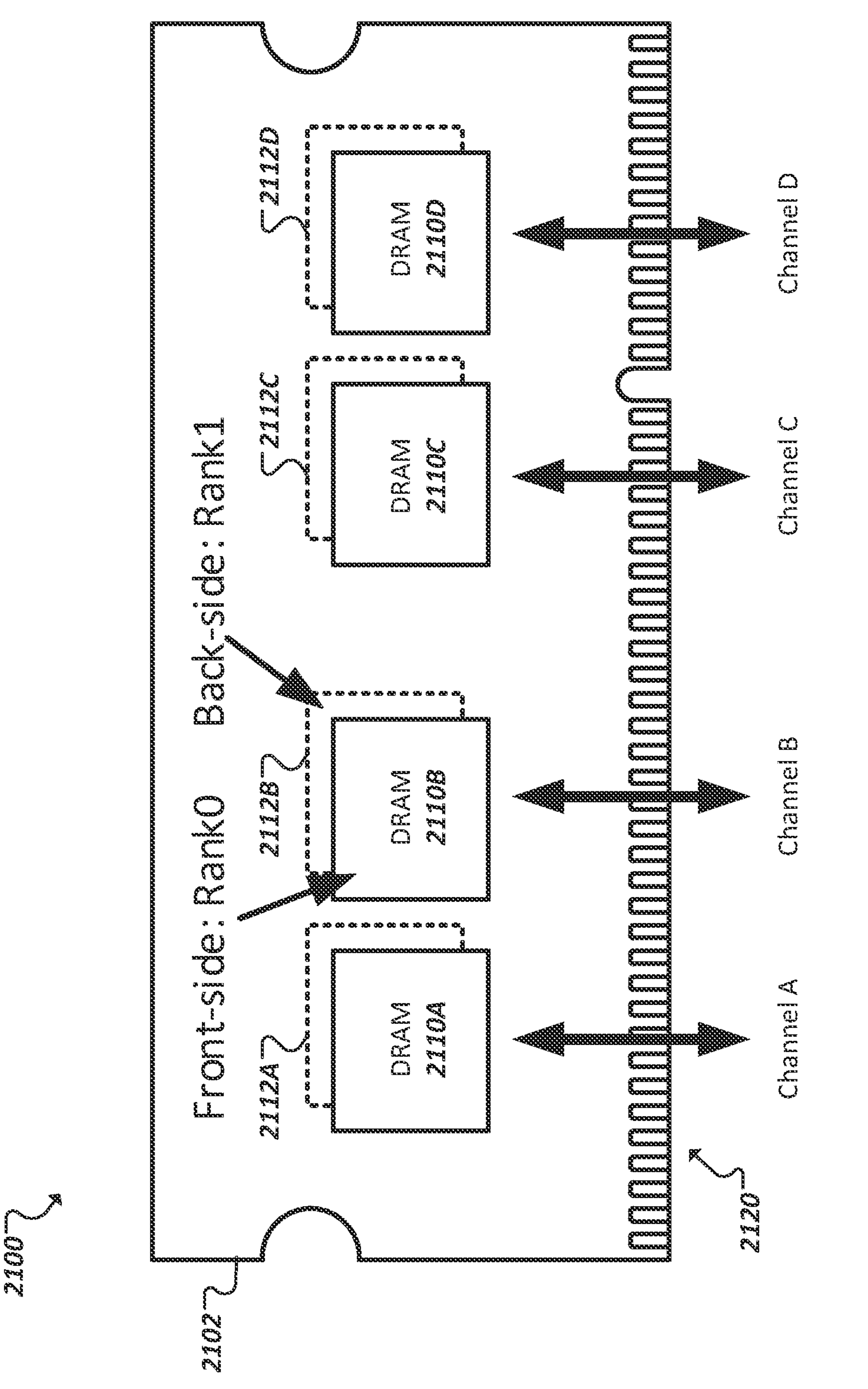
FIG. 21 is a representation of an example memory module.

FIG. 21 illustrates an example memory module 2100 in accordance with embodiments of the present disclosure. In certain embodiments, the DRAM 225 of FIG. 2 may implement or include the memory module 2100. In certain embodiments, the example memory module 2100 may be a dual inline memory module (DIMM) having a form factor that is of a typical DDR5 memory module. As shown, the memory module 2100 includes a set of DRAM chips 2110 on a first side of the memory module 2100 (i.e., on a first side of the circuit board 2102 of the memory module) and a set of DRAM chips 2112 on a second side of the memory module 2100 (i.e., on a second side of the circuit board 2102 of the memory module) opposite the first side. Each of the DRAM chips 2110, 2112 may be implemented as an integrated circuit that includes a number of volatile memory cells in addition to other circuitry to connect the memory cells to traces on the circuit board of the memory module.

The memory module 2100 includes four channels (Channel A, Channel B, Channel C, Channel D) instead of the typical two channels of DDR5 memory modules. Each channel has a DRAM chip 110 and DRAM chip 112 associated therewith, i.e., DRAM chips 110A, 112A are associated with Channel A, DRAM chips 110B, 112B are associated with Channel B, DRAM chips 110C, 112C are associated with Channel C, and DRAM chips 110D, 112D are associated with Channel D. Although not shown, it will be understood that each set of DRAM chips 2110, 2112 associated with a particular channel is to connect to a respective memory controller for the memory channel. Thus, the DRAM chips 2110A, 2112A are to connect to a memory controller for memory channel A, the DRAM chips 2110B, 2112B are to connect to a memory controller for memory channel B, DRAM chips 2110C, 2112C are to connect to a memory controller for memory channel C, and DRAM chips 2110D, 2112D are to connect to a memory controller for memory channel D.

Further, in the example shown, the DRAM chips 2110 correspond to a first rank (Rank0) of a particular channel while the DRAM chips 2112 correspond to a second rank (Rank1) of the channel. Thus, the DRAM chip 2110A is associated with a first rank of the memory channel A and the DRAM chip 2112A is associated with a second rank of the memory channel A, the DRAM chip 2110B is associated with a first rank of the memory channel B and the DRAM chip 2112B is associated with a second rank of the memory channel B, the DRAM chip 2110C is associated with a first rank of the memory channel C and the DRAM chip 2112C is associated with a second rank of the memory channel C, and the DRAM chip 2110D is associated with a first rank of the memory channel D and the DRAM chip 2112D is associated with a second rank of the memory channel D. In the example shown, each of the DRAM chips 2110, 2112 is a x8 device with an 8-bit wide data bus. Thus, in the example shown, each channel may have a 16-bit wide data bus as opposed to a 32-bit wide data bus in typical DDR5 memory modules.

Although shown in FIG. 21 as being somewhat offset from one another (which is for illustrative purposes only), the DRAM chips 2110, 2112 for each channel are positioned such they are generally opposite one another with respect to the circuit board, i.e., they are positioned in same area of the circuit board as one another but on opposite sides of the circuit board. In other words, the DRAM chips for each channel may be positioned such that they are approximately equidistant from each edge of the memory module 2100, but on opposite sides of the circuit board 2102. For example, the DRAM chips 2110A may be considered to be directly above the DRAM chips 2112A with respect to the circuit board of the memory module 2100, e.g., from a top view of the memory module 2100.

Because of this positioning, the DRAM chips 2110, 2112 for each channel are approximately equidistant from the input/output pins 2120 at the bottom of the memory module 2100 so that certain characteristics of the electrical channel between the input/output pins 2120 and the different DRAM chips (e.g., latencies) is approximately the same. For instance, the trace lengths of two ranks in a channel between DRAM chip input/output pins can have minimal difference and thus, good electrical matching can be expected. The well-matched channel characteristics can help to minimize (or eliminate) delays caused by rank switching, as described above. Moreover, the well-matched channel characteristics may help to minimize the difference between the different rank training delay line values described above, and accordingly, keep the average of those values used in the embodiments described above close to the actual delay line values for each rank.

When using a dual rank memory configuration as described above to support 8B maximum bandwidth, a traditional memory request scheduling scheme might not provide the best performance. For instance, in traditional memory request scheduling schemes, to reduce rank switching and its associated latencies with current memory technologies, the following memory request scheduling priorities may be implemented. The first priority may be to schedule requests of the same type (e.g., all reads before any writes) together first, then to schedule requests to the same rank together next (e.g., all reads to rank0 before any reads to rank1), then to schedule requests to different banks/bank groups (e.g., alternate or round robin reads between the various banks within a particular rank), then to schedule requests to the same page address within a bank, then to schedule by arrival time. In addition, in current memory configurations, a rank selection address (e.g., bit) may be placed near the most significant bit (MSB) in an address (e.g., at or near the MSB of the address bits) to avoid frequent rank switching in the traditional memory channel, e.g., to avoid the additional latency issues described above.

However, in a dual rank memory configuration (e.g., those described herein), where additional latencies caused by rank switching are not present or greatly reduced, rank switching may be desired. For instance, since there is no additional delay when switching ranks, maximizing rank switching may be beneficial for performance because the timing restrictions (tFAW, tRTP, etc.) which limit the scheduling are only valid within a rank. That is, more scheduling flexibility and potential performance improvements may be expected by interleaving ranks from transaction to transaction. In addition, there may be no need to consider internal data collision between two ranks because they are physically different devices. Thus, data bus switching (e.g., write to read) might not yield long delays.

Accordingly, embodiments herein may implement a memory request scheduling scheme that prioritizes rank switching, allowing for increased channel utilization in the dual rank memory configurations described herein. In addition, embodiments herein may also utilize a different addressing scheme that moves the rank selection address/bit in the address away from the MSB (which can act to minimize rank switching) to a lower address bit closer to the least significant bit (LSB) of the address, which can act to increase the rank switching from address to address. In general, there is more data variation in LSB-side than in MSB-side in memory addresses; thus, more frequent rank switching can be expected by placing rank selection address/bit closer to LSB side of the address. By implementing one or both of these concepts, increased rank switching from transaction to transaction can be expected, which can increase the opportunity to maximize channel utilization using the dual rank memory configurations described herein.

Figure 22:
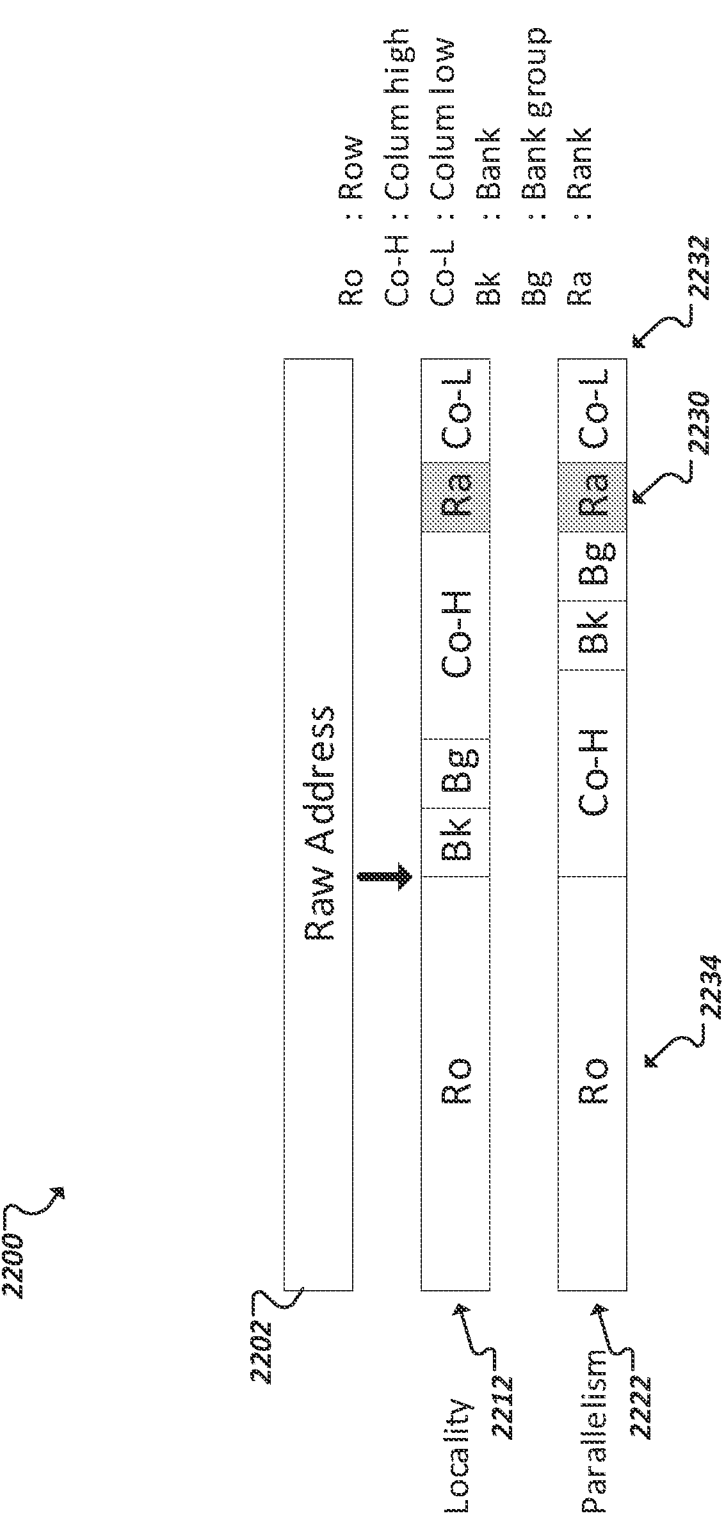
FIG. 22 is a representation of an example memory addressing scheme.

FIG. 22 illustrates an example memory addressing scheme 2200 in accordance with embodiments of the present disclosure. For instance, the example addressing scheme 2200 illustrates a raw memory address (e.g., a physical memory address) in two example configurations: a first configuration 2212 for locality, and a second configuration QR 122 for parallelism. The locality configuration 2212 attempts to maximize page hits, while the parallelism configuration 2222 attempts to maximize bank level parallelism. In general, DRAM may include ranks, banks (bank groups), rows, and columns, with each rank being mapped to a different DRAM device. In one DRAM device, a bank includes rows and columns. Moreover, in general, the LSB side of the address may be toggled more frequently than the MSB side. The locality configuration may allow for many accesses to fall to the same row accesses (page hit), while the parallelism configuration may assign them to different bank accesses (high bank level parallelism).

In each example, the rank selection address/bit is placed closer to the LSB of the address (in contrast to current addressing schemes where the rank selection address/bit is placed at or near the MSB of the address). For instance, in each of the example configurations 2212, 2222 shown, the rank selection address/bit (e.g., 2230) is located adjacent the column-low selection bits (e.g., 2222) which occupy the LSBs of the raw address 2202 in either configuration 2212, 2222. Other embodiments may place the rank selection address/bit in other locations within the address 2202, such as anywhere closer to the LSB than the row selection bits (e.g., 2234) of the address.

In addition to a different addressing scheme, to further increase rank switching, embodiments herein may implement a memory request scheduling policy that favors rank switching as well. For instance, in some embodiments, a memory request scheduling policy of the present disclosure may prioritize rank scheduling ahead of other potential priorities, including command type. As one example, the first priority of a memory request scheduling policy may be to schedule requests with different rank selections (e.g., alternate rank accesses between instructions), then to schedule requests according to the same command type (e.g., read vs. write, where reads may be prioritized over writes). Further priorities thereafter may be to then schedule requests to different banks/bank groups (e.g., alternate or round robin between the various banks within a particular rank), then to schedule requests to the same page address (row) within a bank, then to schedule by arrival time.

Figure 23:
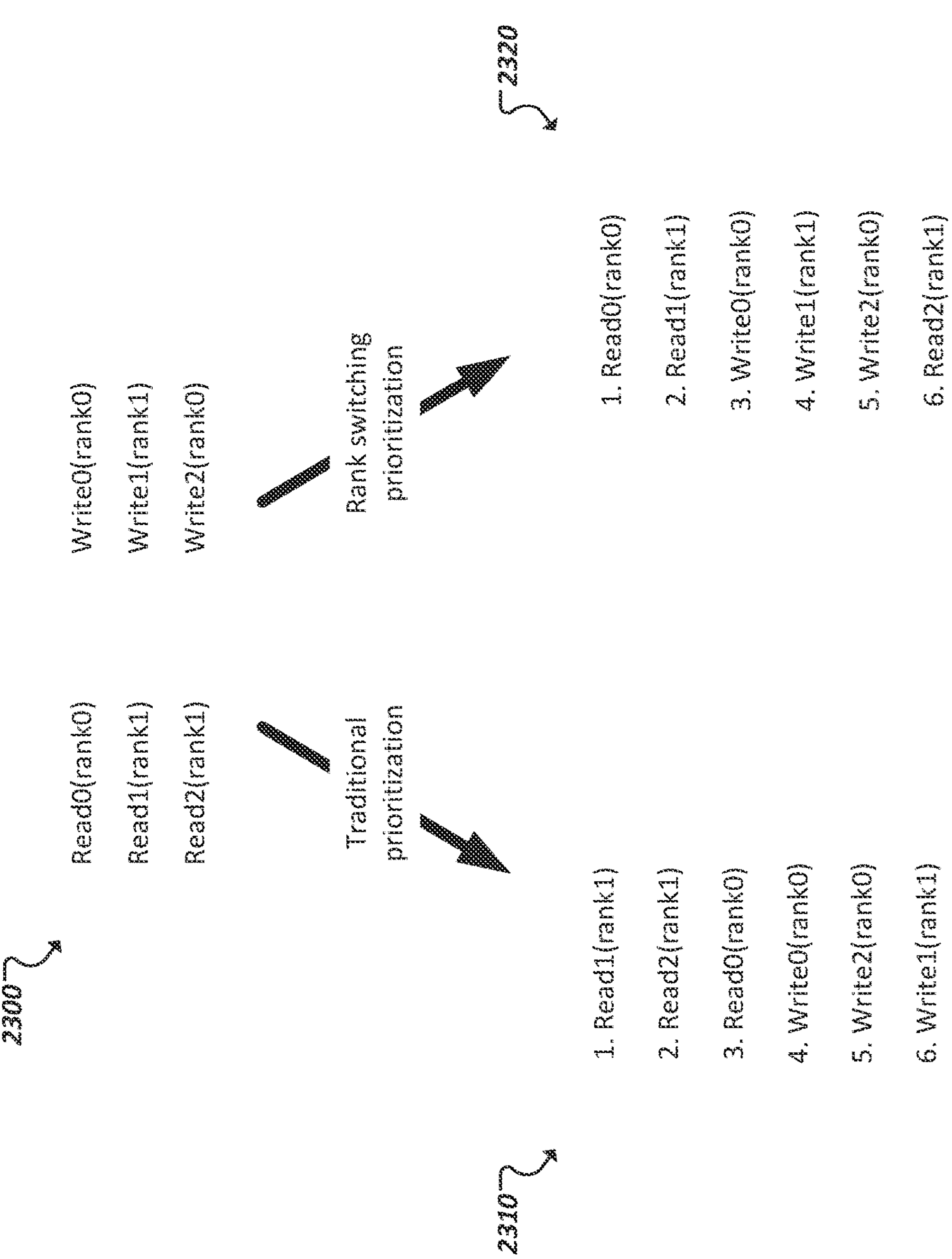
FIG. 23 is a representation of an example memory request scheduling scenario using the techniques described herein to promote rank switching.

FIG. 23 illustrates an example memory request scheduling scenario 2300 using the techniques described herein to promote rank switching. In the example shown, there is a set 2300 of six memory requests for scheduling, including a first read to rank0 (Read), a second read to rank1 (Read1), a third read to rank1 (Read2), a first write to rank0 (Write0), a second write to rank1 (Write1), and a third write to rank0 (Write2). Under current traditional scheduling prioritizations, the set 2300 may be scheduled according to the scheduling 2310, whereas under rank switching prioritization schemes according to the present disclosure, the set 2300 may be scheduled according to the scheduling 2320.

For instance, in the example shown, the scheduling 2310 prioritizes scheduling the same type of command together first before other priorities, and thereafter, continuing accesses to the same rank are prioritized. Thus, in the scheduling 2310, the reads are scheduled together first, with the two reads to rank1 (i.e., Read1, Read2) being scheduled together first to avoid rank switching (i.e., staying in rank1) then the read to rank0 being scheduled thereafter. Then, the writes are scheduled together with the two writes to rank0 (i.e., Write0, Write2) being scheduled first to avoid rank switching from Read0 (i.e., staying in rank0). The write to rank1 (Write1) is then scheduled after the other two writes.

In contrast, the scheduling 2320 prioritizes scheduling rank switching first before scheduling commands of the same type. Thus, Read0 to rank0 is scheduled first, followed by Read1 to rank1 to prioritize rank switching (within the same command). Next, Write0 to rank0 is scheduled since the scheduling scheme prioritizes rank switching over the same command type. Thereafter, rank switching is prioritized within the write commands, with Write1 to rank1 scheduled next, and Write2 to rank0 scheduled thereafter. Finally, Read2 to rank1 is scheduled.

Figure 24:
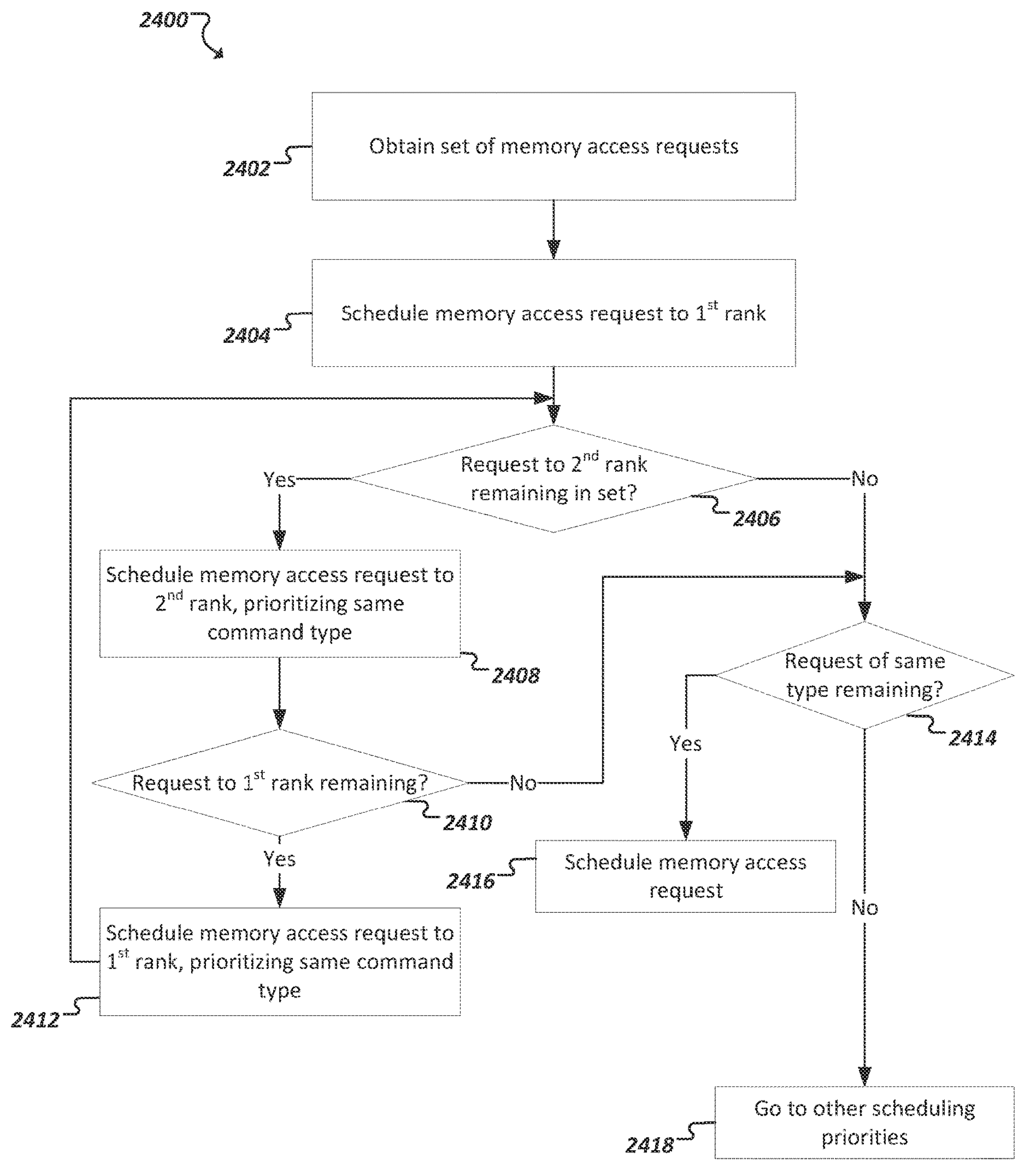
FIG. 24 is a flow diagram of an example process of scheduling memory access requests to prioritize rank switching.

FIG. 24 illustrates a flow diagram of an example process 2400 of scheduling memory access requests to prioritize rank switching in accordance with embodiments of the present disclosure. In some embodiments, operations of the example process 2400 may be encoded as instructions in a machine-readable storage medium (e.g., as software or firmware), such that execution of the instructions by hardware logic or circuitry may implement the operations shown in FIG. 24 and described below. For example, one or more operations of the example process 2400 may be performed by circuitry of a memory controller (e.g., the memory controllers described herein) executing or implementing firmware instructions in certain embodiments. Although described below with respect to a dual rank memory configuration, the operations of the process 2400 can also be used to determine common delay line values for use with quad or octal rank memory configurations as well.

At 2402, a set of memory access requests is obtained (e.g., the set 2300). At 2404, a memory access request to a first rank (e.g., rank0) is scheduled. In some embodiments, the choice of which memory access request to schedule first may be based on a list of scheduling priorities. For instance, in some embodiments, rank switching may be prioritized first, then same command type (with reads prioritized over writes), then different bank groups, then same rows, then arrival time. Thus, where there are read and write commands available for each rank (e.g., as shown in FIG. 23), the first memory access request chosen may be a read command accessing a first rank (e.g., rank0).

At 2406, it is determined whether there is a memory access request remaining in the set of requests that is to a second rank (e.g., rank1). If so, a remaining memory access request to the second rank is scheduled at 2408, prioritizing the selection of a request of the same command type. For instance, if the memory access request scheduled at 2404 is a read command to rank0, then the memory access request scheduled at 2408 should be a read command to rank1, if available for scheduling. However, if the only memory access requests remaining are writes to rank1, then one of those memory access requests is selected for scheduling at 2408. If it is determined at 2406 that there is no memory access request remaining in the set of requests that is to the second rank, then it is determined at 2414 whether there is a request of the same type remaining in the in the set of requests. If so, a request of the same type to the first rank is scheduled at 2416. Otherwise, other scheduling priorities (e.g., bank group, bank, page/row, etc.) are considered at 2418.

At 2410, it is determined whether there is a memory access request remaining in the set of requests that is to the first rank (e.g., rank0). If so, a remaining memory access request to the first rank is scheduled at 2412, prioritizing the selection of a request of the same command type. For instance, if the memory access request scheduled at 2408 is a read command to rank1, then the memory access request scheduled at 2412 should be a read command to rank0, if available for scheduling. However, if the only memory access requests remaining are writes to rank0, then one of those memory access requests is selected for scheduling at 2412. If it is determined at 2410 that there is no memory access request remaining in the set of requests that is to the first rank, then it is determined at 2414 whether there is a request of the same type remaining in the in the set of requests. If so, a request of the same type to the second rank is scheduled at 2416. Otherwise, other scheduling priorities (e.g., bank group, bank, page/row, etc.) are considered at 2418.

The example process 2400 may include additional or different operations, and the operations may be performed in the order shown or in another order. In some cases, one or more of the operations shown in FIG. 24 are implemented as processes that include multiple operations, sub-processes, or other types of routines. In some cases, operations can be combined, performed in another order, performed in parallel, iterated, or otherwise repeated or performed another manner.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 25A-25B are block diagrams illustrating a generic vector friendly instruction format and instruction templates thereof according to embodiments of the disclosure. FIG. 25A is a block diagram illustrating a generic vector friendly instruction format and class A instruction templates thereof according to embodiments of the disclosure; while FIG. 25B is a block diagram illustrating the generic vector friendly instruction format and class B instruction templates thereof according to embodiments of the disclosure. Specifically, a generic vector friendly instruction format 2500 for which are defined class A and class B instruction templates, both of which include no memory access 2505 instruction templates and memory access 2520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 25A include: 1) within the no memory access 2505 instruction templates there is shown a no memory access, full round control type operation 2510 instruction template and a no memory access, data transform type operation 2515 instruction template; and 2) within the memory access 2520 instruction templates there is shown a memory access, temporal 2525 instruction template and a memory access, non-temporal 2530 instruction template. The class B instruction templates in FIG. 25B include: 1) within the no memory access 2505 instruction templates there is shown a no memory access, write mask control, partial round control type operation 2512 instruction template and a no memory access, write mask control, vsize type operation 2517 instruction template; and 2) within the memory access 2520 instruction templates there is shown a memory access, write mask control 2527 instruction template.

The generic vector friendly instruction format 2500 includes the following fields listed below in the order illustrated in FIGS. 25A-25B.

Format field 2540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2542—its content distinguishes different base operations.

Register index field 2544—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2546—its content distinguishes occurrences of instructions in the generic vector instruction format that specify memory access from those that do not; that is, between no memory access 2505 instruction templates and memory access 2520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2550—its content distinguishes which one of a variety of different operations to be performed in addition to the base operation. This field is context specific. In one embodiment of the disclosure, this field is divided into a class field 2568, an alpha field 2552, and a beta field 2554. The augmentation operation field 2550 allows common groups of operations to be performed in a single instruction rather than 2, 3, or 4 instructions.

Scale field 2560—its content allows for the scaling of the index field's content for memory address generation (e.g., for address generation that uses 2scale*index+base).

Displacement Field 2562A—its content is used as part of memory address generation (e.g., for address generation that uses 2scale*index+base+displacement).

Displacement Factor Field 2562B (note that the juxtaposition of displacement field 2562A directly over displacement factor field 2562B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2574 (described later herein) and the data manipulation field 2554C. The displacement field 2562A and the displacement factor field 2562B are optional in the sense that they are not used for the no memory access 2505 instruction templates and/or different embodiments may implement only one or none of the two.

Data element width field 2564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2570 allows for partial vector operations, including loads, stores, arithmetic, logical, etc. While embodiments of the disclosure are described in which the write mask field's 2570 content selects one of a number of write mask registers that contains the write mask to be used (and thus the write mask field's 2570 content indirectly identifies that masking to be performed), alternative embodiments instead or additional allow the mask write field's 2570 content to directly specify the masking to be performed.

Immediate field 2572—its content allows for the specification of an immediate. This field is optional in the sense that is it not present in an implementation of the generic vector friendly format that does not support immediate and it is not present in instructions that do not use an immediate.

Class field 25681—its content distinguishes between different classes of instructions. With reference to FIGS. 25A-B, the contents of this field select between class A and class B instructions. In FIGS. 25A-B, rounded corner squares are used to indicate a specific value is present in a field (e.g., class A 2568A and class B 2568B for the class field 2568 respectively in FIGS. 25A-B).

Instruction Templates of Class A

In the case of the non-memory access 2505 instruction templates of class A, the alpha field 2552 is interpreted as an RS field 2552A, whose content distinguishes which one of the different augmentation operation types are to be performed (e.g., round 2552A.1 and data transform 2552A.2 are respectively specified for the no memory access, round type operation 2510 and the no memory access, data transform type operation 2515 instruction templates), while the beta field 2554 distinguishes which of the operations of the specified type is to be performed. In the no memory access 2505 instruction templates, the scale field 2560, the displacement field 2562A, and the displacement scale filed 2562B are not present.

No-Memory Access Instruction Templates—Full Round Control Type Operation

In the no memory access full round control type operation 2510 instruction template, the beta field 2554 is interpreted as a round control field 2554A, whose content(s) provide static rounding. While in the described embodiments of the disclosure the round control field 2554A includes a suppress all floating-point exceptions (SAE) field 2556 and a round operation control field 2558, alternative embodiments may support may encode both these concepts into the same field or only have one or the other of these concepts/fields (e.g., may have only the round operation control field 2558).

SAE field 2556—its content distinguishes whether or not to disable the exception event reporting; when the SAE field's 2556 content indicates suppression is enabled, a given instruction does not report any kind of floating-point exception flag and does not raise any floating-point exception handler.

Round operation control field 2558—its content distinguishes which one of a group of rounding operations to perform (e.g., Round-up, Round-down, Round-towards-zero and Round-to-nearest). Thus, the round operation control field 2558 allows for the changing of the rounding mode on a per instruction basis. In one embodiment of the disclosure where a processor includes a control register for specifying rounding modes, the round operation control field's 2550 content overrides that register value.

No Memory Access Instruction Templates—Data Transform Type Operation

In the no memory access data transform type operation 2515 instruction template, the beta field 2554 is interpreted as a data transform field 2554B, whose content distinguishes which one of a number of data transforms is to be performed (e.g., no data transform, swizzle, broadcast).

In the case of a memory access 2520 instruction template of class A, the alpha field 2552 is interpreted as an eviction hint field 2552B, whose content distinguishes which one of the eviction hints is to be used (in FIG. 25A, temporal 2552B.1 and non-temporal 2552B.2 are respectively specified for the memory access, temporal 2525 instruction template and the memory access, non-temporal 2530 instruction template), while the beta field 2554 is interpreted as a data manipulation field 2554C, whose content distinguishes which one of a number of data manipulation operations (also known as primitives) is to be performed (e.g., no manipulation; broadcast; up conversion of a source; and down conversion of a destination). The memory access 2520 instruction templates include the scale field 2560, and optionally the displacement field 2562A or the displacement scale field 2562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2552 is interpreted as a write mask control (Z) field 2552C, whose content distinguishes whether the write masking controlled by the write mask field 2570 should be a merging or a zeroing.

In the case of the non-memory access 2505 instruction templates of class B, part of the beta field 2554 is interpreted as an RL field 2557A, whose content distinguishes which one of the different augmentation operation types are to be performed (e.g., round 2557A.1 and vector length (VSIZE) 2557A.2 are respectively specified for the no memory access, write mask control, partial round control type operation 2512 instruction template and the no memory access, write mask control, VSIZE type operation 2517 instruction template), while the rest of the beta field 2554 distinguishes which of the operations of the specified type is to be performed. In the no memory access 2505 instruction templates, the scale field 2560, the displacement field 2562A, and the displacement scale filed 2562B are not present.

In the no memory access, write mask control, partial round control type operation 2510 instruction template, the rest of the beta field 2554 is interpreted as a round operation field 2559A and exception event reporting is disabled (a given instruction does not report any kind of floating-point exception flag and does not raise any floating-point exception handler).

Round operation control field 2559A—just as round operation control field 2558, its content distinguishes which one of a group of rounding operations to perform (e.g., Round-up, Round-down, Round-towards-zero and Round-to-nearest). Thus, the round operation control field 2559A allows for the changing of the rounding mode on a per instruction basis. In one embodiment of the disclosure where a processor includes a control register for specifying rounding modes, the round operation control field's 2550 content overrides that register value.

In the no memory access, write mask control, VSIZE type operation 2517 instruction template, the rest of the beta field 2554 is interpreted as a vector length field 2559B, whose content distinguishes which one of a number of data vector lengths is to be performed on (e.g., 128, 256, or 512 byte).

In the case of a memory access 2520 instruction template of class B, part of the beta field 2554 is interpreted as a broadcast field 2557B, whose content distinguishes whether or not the broadcast type data manipulation operation is to be performed, while the rest of the beta field 2554 is interpreted the vector length field 2559B. The memory access 2520 instruction templates include the scale field 2560, and optionally the displacement field 2562A or the displacement scale field 2562B.

With regard to the generic vector friendly instruction format 2500, a full opcode field 2574 is shown including the format field 2540, the base operation field 2542, and the data element width field 2564. While one embodiment is shown where the full opcode field 2574 includes all of these fields, the full opcode field 2574 includes less than all of these fields in embodiments that do not support all of them. The full opcode field 2574 provides the operation code (opcode).

The augmentation operation field 2550, the data element width field 2564, and the write mask field 2570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

Figures 26A, 26B, 26C:
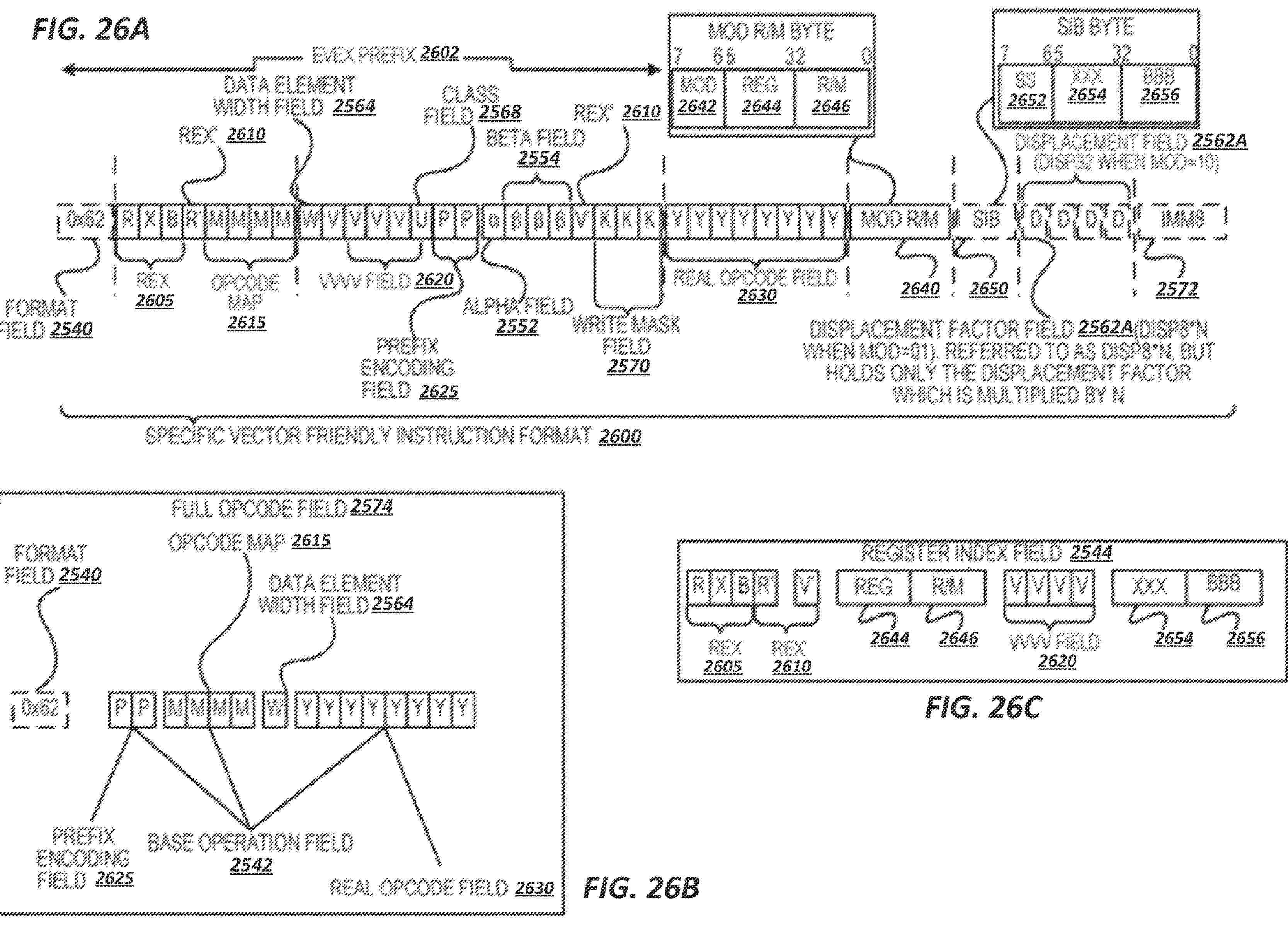
FIG. 26A is a block diagram illustrating fields for the generic vector friendly instruction formats in FIGS. 25A and 25B.
FIG. 26B is a block diagram illustrating the fields of the specific vector friendly instruction format in FIG. 26A that make up a full opcode field.
FIG. 26C is a block diagram illustrating the fields of the specific vector friendly instruction format in FIG. 26A that make up a register index field.

FIGS. 26A-26D are block diagrams illustrating an exemplary specific vector friendly instruction format according to embodiments of the disclosure. FIG. 26A shows a specific vector friendly instruction format 2600 that is specific in the sense that it specifies the location, size, interpretation, and order of the fields, as well as values for some of those fields. The specific vector friendly instruction format 2600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 25 into which the fields from FIG. 26 map are illustrated.

It should be understood that, although embodiments of the disclosure are described with reference to the specific vector friendly instruction format 2600 in the context of the generic vector friendly instruction format 2500 for illustrative purposes, the disclosure is not limited to the specific vector friendly instruction format 2600 except where claimed. For example, the generic vector friendly instruction format 2500 contemplates a variety of possible sizes for the various fields, while the specific vector friendly instruction format 2600 is shown as having fields of specific sizes. By way of specific example, while the data element width field 2564 is illustrated as a one bit field in the specific vector friendly instruction format 2600, the disclosure is not so limited (that is, the generic vector friendly instruction format 2500 contemplates other sizes of the data element width field 2564).

The generic vector friendly instruction format 2500 includes the following fields listed below in the order illustrated in FIG. 26A.

EVEX Prefix (Bytes 0-3) 2602—is encoded in a four-byte form.

Format Field 2540 (EVEX Byte 0, bits [7:0])—the first byte (EVEX Byte 0) is the format field 2540 and it contains 0x62 (the unique value used for distinguishing the vector friendly instruction format in one embodiment of the disclosure).

The second-fourth bytes (EVEX Bytes 1-3) include a number of bit fields providing specific capability.

REX field 2605 (EVEX Byte 1, bits [7-5])—consists of a EVEX.R bit field (EVEX Byte 1, bit [7]—R), EVEX.X bit field (EVEX byte 1, bit [6]—X), and 2557BEX byte 1, bit[5]—B). The EVEX.R, EVEX.X, and EVEX.B bit fields provide the same functionality as the corresponding VEX bit fields, and are encoded using Is complement form, i.e. ZMM0 is encoded as 2511B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2510—this is the first part of the REX' field 2510 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known known x86 32-bit mode) from the BOUND instruction, whose real opcode byte is 62, but does not accept in the MOD R/M field (described below) the value of 25 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2615 (EVEX byte 1, bits [3:0]—mmmm)—its content encodes an implied leading opcode byte (0F, 0F 38, or 0F 3).

Data element width field 2564 (EVEX byte 2, bit [7]—W)—is represented by the notation EVEX.W. EVEX.W is used to define the granularity (size) of the datatype (either 32-bit data elements or 64-bit data elements).

EVEX.vvvv 2620 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in Is complement form for certain vector shifts; or 3) EVEX.vvvv does not encode any operand, the field is reserved and should contain 2511*b*. Thus, EVEX.vvvv field 2620 encodes the 4 low-order bits of the first source register specifier stored in inverted (1s complement) form. Depending on the instruction, an extra different EVEX bit field is used to extend the specifier size to 32 registers.

EVEX.U 2568 Class field (EVEX byte 2, bit [2]—U)—If EVEX.U=0, it indicates class A or EVEX.U0; if EVEX.U=1, it indicates class B or EVEX.U1.

Prefix encoding field 2625 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 2554 (EVEX byte 3, bits [6:4]-SSS, also known as EVEX.$s_{2-0}$, EVEX.r2-0, EVEX.rr1, EVEX.LL0, EVEX.LLB; also illustrated with BBB)—as previously described, this field is context specific.

REX' field 2510—this is the remainder of the REX' field and is the EVEX. V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2570 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2630 (Byte 4) is also known as the opcode byte. Part of the opcode is specified in this field.

MOD R/M Field 2640 (Byte 5) includes MOD field 2642, Reg field 2644, and R/M field 2646. As previously described, the MOD field's 2642 content distinguishes between memory access and non-memory access operations. The role of Reg field 2644 can be summarized to two situations: encoding either the destination register operand or a source register operand, or be treated as an opcode extension and not used to encode any instruction operand. The role of R/M field 2646 may include the following: encoding the instruction operand that references a memory address, or encoding either the destination register operand or a source register operand.

Scale, Index, Base (SIB) Byte (Byte 6)—As previously described, the scale field's 2550 content is used for memory address generation. SIB.xxx 2654 and SIB.bbb 2656—the contents of these fields have been previously referred to with regard to the register indexes Xxxx and Bbbb.

Displacement field 2562A (Bytes 7-10)—when MOD field 2642 contains 10, bytes 7-10 are the displacement field 2562A, and it works the same as the legacy 32-bit displacement (disp32) and works at byte granularity.

Displacement factor field 2562B (Byte 7)—when MOD field 2642 contains 01, byte 7 is the displacement factor field 2562B. The location of this field is that same as that of the legacy x86 instruction set 8-bit displacement (disp8), which works at byte granularity. Since disp8 is sign extended, it can address −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2562B is a reinterpretation of disp8; when using displacement factor field 2562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2562B substitutes the legacy x86 instruction set 8-bit displacement. Thus, the displacement factor field 2562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2572 operates as previously described.

Full Opcode Field

FIG. 26B is a block diagram illustrating the fields of the specific vector friendly instruction format 2600 that make up the full opcode field 2574 according to one embodiment of the disclosure. Specifically, the full opcode field 2574 includes the format field 2540, the base operation field 2542, and the data element width (W) field 2564. The base operation field 2542 includes the prefix encoding field 2625, the opcode map field 2615, and the real opcode field 2630.

Register Index Field

FIG. 26C is a block diagram illustrating the fields of the specific vector friendly instruction format 2600 that make up the register index field 2544 according to one embodiment of the disclosure. Specifically, the register index field 2544 includes the REX field 2605, the REX' field 2610, the MODR/M.reg field 2644, the MODR/M.r/m field 2646, the VVVV field 2620, xxx field 2654, and the bbb field 2656.

Augmentation Operation Field

Figure 26D:
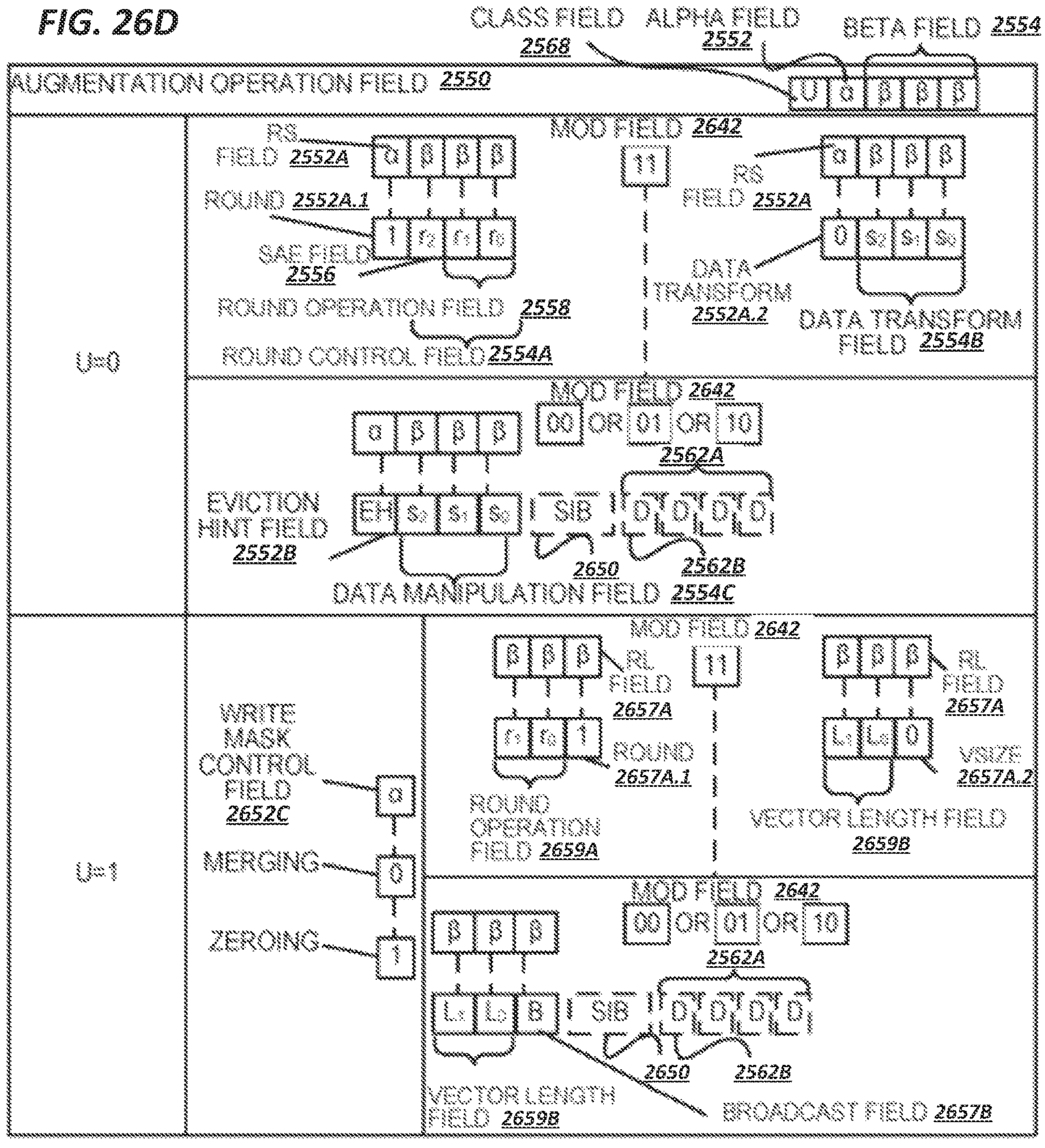
FIG. 26D is a block diagram illustrating the fields of the specific vector friendly instruction format in FIG. 26A that make up an example augmentation operation field.

FIG. 26D is a block diagram illustrating the fields of the specific vector friendly instruction format 2600 that make up the augmentation operation field 2550 according to one embodiment of the disclosure. When the class (U) field 2568 contains 0, it signifies EVEX.U0 (class A 2568A); when it contains 1, it signifies EVEX.U1 (class B 2568B). When U-0 and the MOD field 2642 contains 25 (signifying a no memory access operation), the alpha field 2552 (EVEX byte 3, bit [7]—EH) is interpreted as the rs field 2552A. When the rs field 2552A contains a 1 (round 2552A.1), the beta field 2554 (EVEX byte 3, bits [6:4]—SSS) is interpreted as the round control field 2554A. The round control field 2554A includes a one bit SAE field 2556 and a two bit round operation field 2558. When the rs field 2552A contains a 0 (data transform 2552A.2), the beta field 2554 (EVEX byte 3, bits [6:4]—SSS) is interpreted as a three bit data transform field 2554B. When U-0 and the MOD field 2642 contains 00, 01, or 10 (signifying a memory access operation), the alpha field 2552 (EVEX byte 3, bit [7]—EH) is interpreted as the eviction hint (EH) field 2552B and the beta field 2554 (EVEX byte 3, bits [6:4]—SSS) is interpreted as a three bit data manipulation field 2554C.

When U=1, the alpha field 2552 (EVEX byte 3, bit [7]—EH) is interpreted as the write mask control (Z) field 2552C. When U=1 and the MOD field 2642 contains 25 (signifying a no memory access operation), part of the beta field 2554 (EVEX byte 3, bit [4]—$S_0$) is interpreted as the RL field 2557A; when it contains a 1 (round 2557A.1) the rest of the beta field 2554 (EVEX byte 3, bit [6-5]—$S_{2-1}$) is interpreted as the round operation field 2559A, while when the RL field 2557A contains a 0 (VSIZE 2557.A2) the rest of the beta field 2554 (EVEX byte 3, bit [6-5]—$S_{2-1}$) is interpreted as the vector length field 2559B (EVEX byte 3, bit [6-5]—$L_{1-0}$). When U=1 and the MOD field 2642 contains 00, 01, or 10 (signifying a memory access operation), the beta field 2554 (EVEX byte 3, bits [6:4]—SSS) is interpreted as the vector length field 2559B (EVEX byte 3, bit [6-5]—$L_{1-0}$) and the broadcast field 2557B (EVEX byte 3, bit [4]—B).

Exemplary Register Architecture

Figure 27:
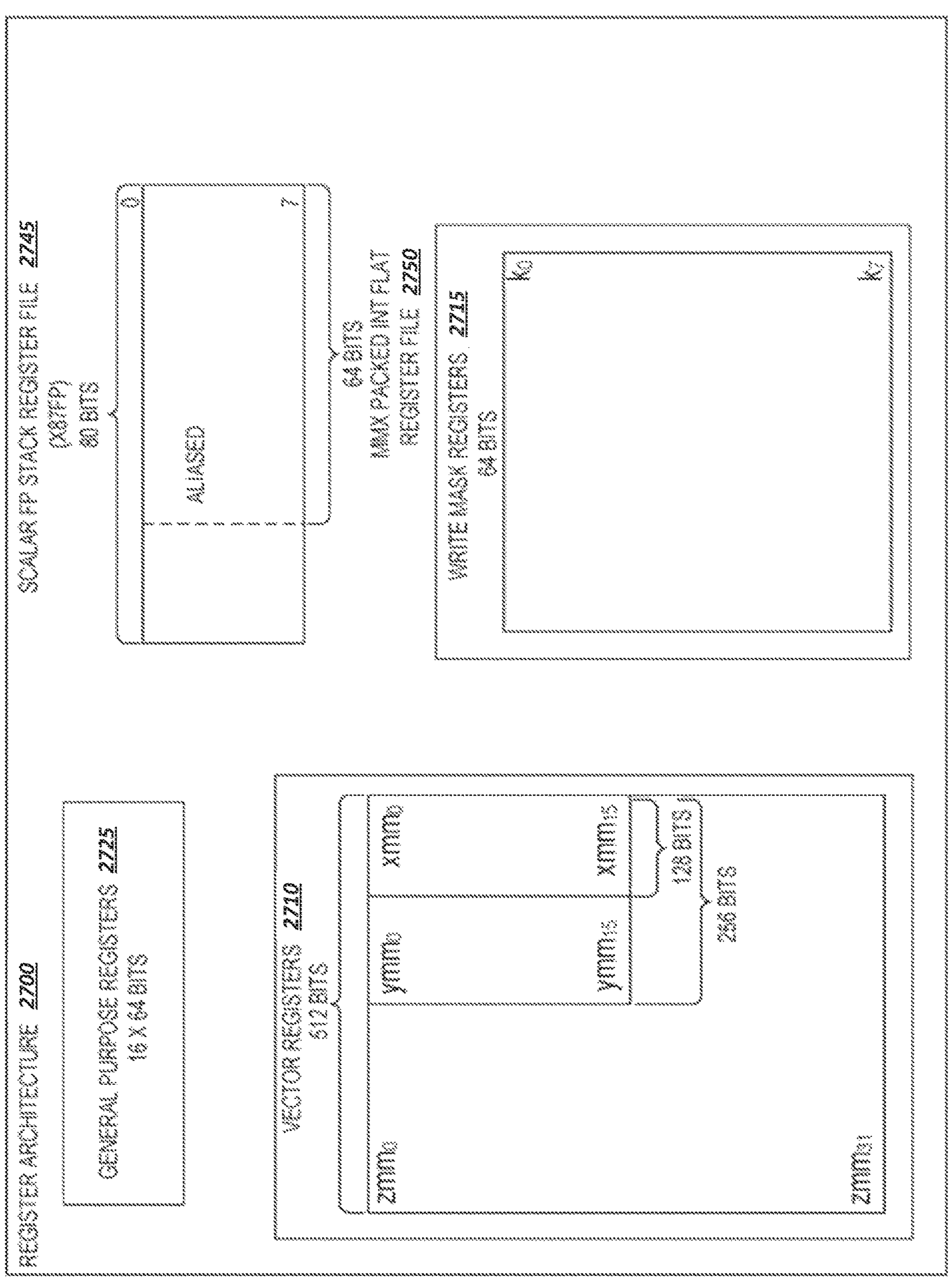
FIG. 27 is a block diagram of a register architecture.

FIG. 27 is a block diagram of a register architecture 2700 according to one embodiment of the disclosure. In the embodiment illustrated, there are 32 vector registers 2710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2600 operates on these overlaid register file as illustrated in Table 3 below.

TABLE 3

| Example Instruction Format | | | |
|---|---|---|---|
| Adjustable Vector Length | Class | Operations | Registers |
| Instruction Templates that do not include the vector length field 2559B | A (FIG. 25A; U = 0) | 1110, 2515, 2525, 2530 | zmm registers (the vector length is 64 byte) |
| | B (FIG. 25B; U = 1) | 252 | zmm registers (the vector length is 64 byte) |
| Instruction templates that do include the vector length field 2559B | B (FIG. 25B; U = 1) | 257, 2527 | zmm, ymm, or xmm registers (the vector length is 64 byte, 32 byte, or 16 byte) depending on the vector length field 2559B |

In other words, the vector length field 2559B selects between a maximum length and one or more other shorter lengths, where each such shorter length is half the length of the preceding length; and instructions templates without the vector length field 2559B operate on the maximum vector length. Further, in one embodiment, the class B instruction templates of the specific vector friendly instruction format 2600 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 2715—in the embodiment illustrated, there are 8 write mask registers (k0 through k7), each 64 bits in size. In an alternate embodiment, the write mask registers 2715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2745, on which is aliased the MMX packed integer flat register file 2750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 28A is a block diagram illustrating both an exemplary in-order pipeline and an exemplary register renaming, out-of-order issue/execution pipeline according to embodiments of the disclosure. FIG. 28B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 28A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 28A, a processor pipeline 2800 includes a fetch stage 2802, a length decode stage 2804, a decode stage 2806, an allocation stage 2808, a renaming stage 2810, a scheduling (also known as a dispatch or issue) stage 2812, a register read/memory read stage 2814, an execute stage 2816, a write back/memory write stage 2818, an exception handling stage 2822, and a commit stage 2824.

FIG. 28B shows processor core 2890 including a front end unit 2830 coupled to an execution engine unit 2850, and both are coupled to a memory unit 2870. The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like.

The front end unit 2830 includes a branch prediction unit 2832 coupled to an instruction cache unit 2834, which is coupled to an instruction translation lookaside buffer (TLB) 2836, which is coupled to an instruction fetch unit 2838, which is coupled to a decode unit 2840. The decode unit 2840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM or other medium that stores microcode for certain macro-instructions (e.g., in decode unit 2840 or otherwise within the front end unit 2830). The decode unit 2840 is coupled to a rename/allocator unit 2852 in the execution engine unit 2850.

The execution engine unit 2850 includes the rename/allocator unit 2852 coupled to a retirement unit 2854 and a set of one or more scheduler unit(s) 2856. The scheduler unit(s) 2856 represents any number of different schedulers, including reservations stations, central instruction window, etc. The scheduler unit(s) 2856 is coupled to the physical register file(s) unit(s) 2858. Each of the physical register file(s) units 2858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2858 includes a vector registers unit, a write mask registers unit, and a scalar registers unit. These register units may provide architectural vector registers, vector mask registers, and general-purpose registers. The physical register file(s) unit(s) 2858 is overlapped by the retirement unit 2854 to illustrate various ways in which register renaming and out-of-order execution may be implemented (e.g., using a reorder buffer(s) and a retirement register file(s); using a future file(s), a history buffer(s), and a retirement register file(s); using one or more register maps and a pool of registers; etc.). The retirement unit 2854 and the physical register file(s) unit(s) 2858 are coupled to the execution cluster(s) 2860. The execution cluster(s) 2860 includes a set of one or more execution units 2862 and a set of one or more memory access units 2864. The execution units 2862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2856, physical register file(s) unit(s) 2858, and execution cluster(s) 2860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2864). It should also be understood that where separate pipelines are used, one or more of these pipelines may be out-of-order issue/execution and the rest in-order.

The set of memory access units 2864 is coupled to the memory unit 2870, which includes a data TLB unit 2872 coupled to a data cache unit 2874 coupled to a level 2 (L2) cache unit 2876. In one exemplary embodiment, the memory access units 2864 may include a load unit, a store address unit, and a store data unit, each of which is coupled to the data TLB unit 2872 in the memory unit 2870. The instruction cache unit 2834 is further coupled to a level 2 (L2) cache unit 2876 in the memory unit 2870. The L2 cache unit 2876 is coupled to one or more other levels of cache and eventually to a main memory.

In certain embodiments, a prefetch circuit 2878 is included to prefetch data, for example, to predict access addresses and bring the data for those addresses into a cache or caches (e.g., from memory 2880).

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit 2840 performs the decode stage 2806; 3) the rename/allocator unit 2852 performs the allocation stage 2808 and renaming stage 2810; 4) the scheduler unit(s) 2856 performs the schedule stage 2812; 5) the physical register file(s) unit(s) 2858 and the memory unit 2870 perform the register read/memory read stage 2814; the execution cluster 2860 perform the execute stage 2816; 6) the memory unit 2870 and the physical register file(s) unit(s) 2858 perform the write back/memory write stage 2818; 7) various units may be involved in the exception handling stage 2822; and 8) the retirement unit 2854 and the physical register file(s) unit(s) 2858 perform the commit stage 2824.

The core 2890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 2890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 2834/2874 and a shared L2 cache unit 2876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 29B:
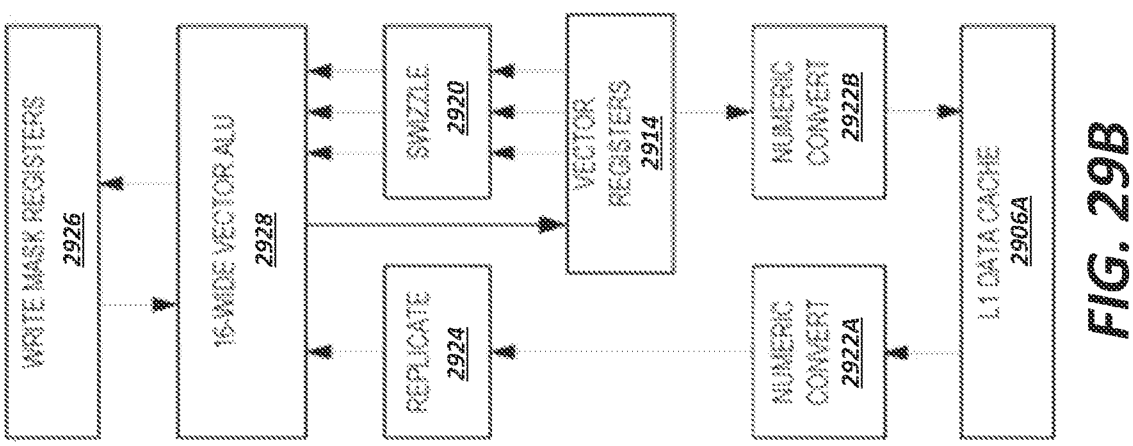
FIG. 29B is an expanded view of part of the processor core in FIG. 29A.
Figure 29A:
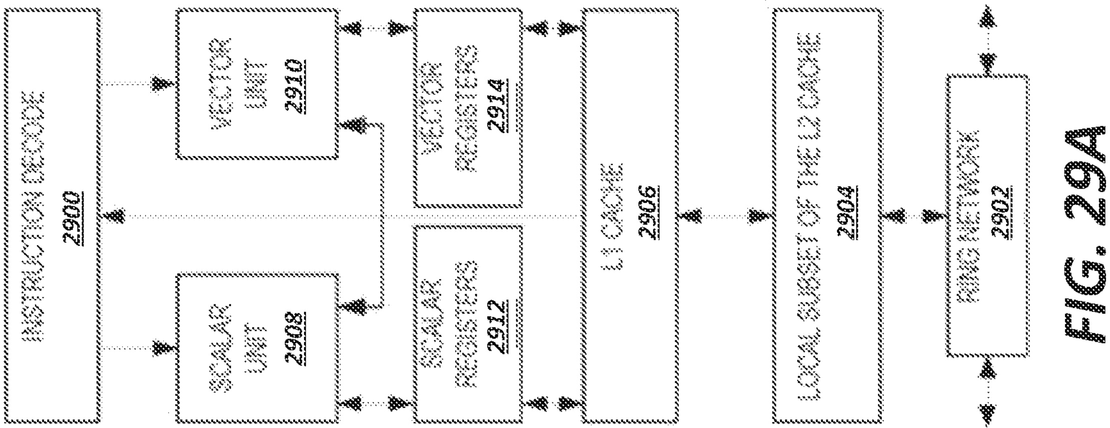
FIG. 29A is a block diagram of a single processor core, along with its connection to the on-die interconnect network and with its local subset of the Level 2 (L2) cache.

FIGS. 29A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 29A is a block diagram of a single processor core, along with its connection to the on-die interconnect network 2902 and with its local subset of the Level 2 (L2) cache 2904, according to embodiments of the disclosure. In one embodiment, an instruction decode unit 2900 supports the x86 instruction set with a packed data instruction set extension. An L1 cache 2906 allows low-latency accesses to cache memory into the scalar and vector units. While in one embodiment (to simplify the design), a scalar unit 2908 and a vector unit 2910 use separate register sets (respectively, scalar registers 2912 and vector registers 2914) and data transferred between them is written to memory and then read back in from a level 1 (L1) cache 2906, alternative embodiments of the disclosure may use a different approach (e.g., use a single register set or include a communication path that allow data to be transferred between the two register files without being written and read back).

The local subset of the L2 cache 2904 is part of a global L2 cache that is divided into separate local subsets, one per processor core. Each processor core has a direct access path to its own local subset of the L2 cache 2904. Data read by a processor core is stored in its L2 cache subset 2904 and can be accessed quickly, in parallel with other processor cores accessing their own local L2 cache subsets. Data written by a processor core is stored in its own L2 cache subset 2904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 29B is an expanded view of part of the processor core in FIG. 29A according to embodiments of the disclosure. FIG. 29B includes an L1 data cache 2906A part of the L1 cache 2904, as well as more detail regarding the vector unit 2910 and the vector registers 2914. Specifically, the vector unit 2910 is a 16-wide vector processing unit (VPU) (see the 16-wide ALU 2928), which executes one or more of integer, single-precision float, and double-precision float instructions. The VPU supports swizzling the register inputs with swizzle unit 2920, numeric conversion with numeric convert units 2922A-B, and replication with replication unit 2924 on the memory input. Write mask registers 2926 allow predicating resulting vector writes.

Figure 30:
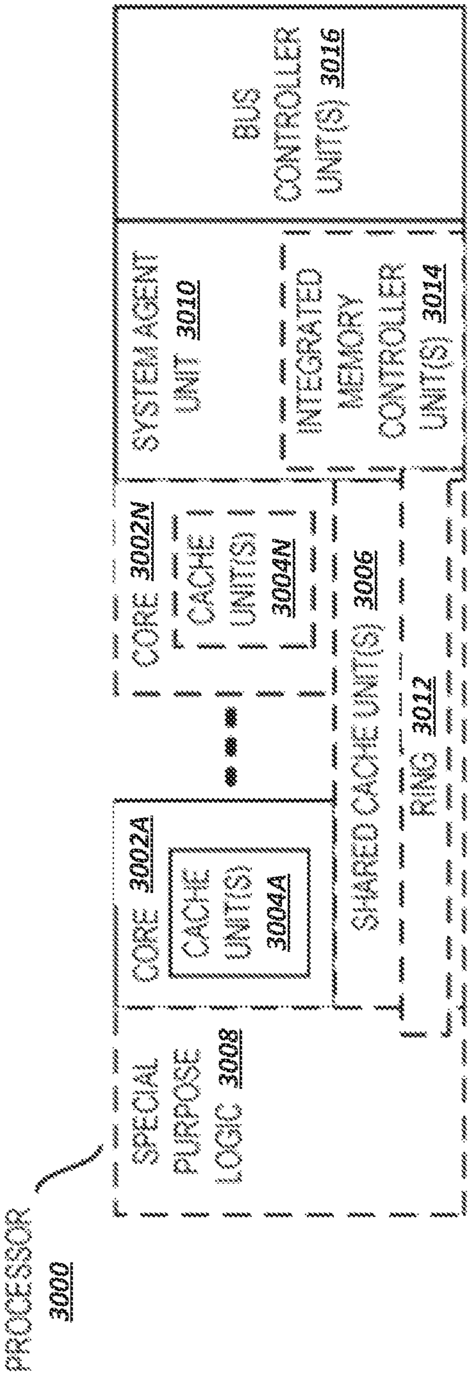
FIG. 30 is a block diagram of a processor that may have more than one core, may have an integrated memory controller, and may have integrated graphics.

FIG. 30 is a block diagram of a processor 3000 that may have more than one core, may have an integrated memory controller, and may have integrated graphics according to embodiments of the disclosure. The solid lined boxes in FIG. 30 illustrate a processor 3000 with a single core 3002A, a system agent 3010, a set of one or more bus controller units 3016, while the optional addition of the dashed lined boxes illustrates an alternative processor 3000 with multiple cores 3002A-N, a set of one or more integrated memory controller unit(s) 3014 in the system agent unit 3010, and special purpose logic 3008.

Thus, different implementations of the processor 3000 may include: 1) a CPU with the special purpose logic 3008 being integrated graphics and/or scientific (throughput) logic (which may include one or more cores), and the cores 3002A-N being one or more general purpose cores (e.g., general purpose in-order cores, general purpose out-of-order cores, a combination of the two); 2) a coprocessor with the cores 3002A-N being a large number of special purpose cores intended primarily for graphics and/or scientific (throughput); and 3) a coprocessor with the cores 3002A-N being a large number of general purpose in-order cores. Thus, the processor 3000 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3006, and external memory (not shown) coupled to the set of integrated memory controller units 3014. The set of shared cache units 3006 may include one or more mid-level caches, such as level 2 (L2), level 3 (L3), level 4 (L4), or other levels of cache, a last level cache (LLC), and/or combinations thereof. While in one embodiment a ring-based interconnect unit 3012 interconnects the integrated graphics logic 3008, the set of shared cache units 3006, and the system agent unit 3010/integrated memory controller unit(s) 3014, alternative embodiments may use any number of well-known techniques for interconnecting such units. In one embodiment, coherency is maintained between one or more cache units 3006 and cores 3002-A-N.

In some embodiments, one or more of the cores 3002A-N are capable of multi-threading. The system agent 3010 includes those components coordinating and operating cores 3002A-N. The system agent unit 3010 may include for example a power control unit (PCU) and a display unit. The PCU may be or include logic and components needed for regulating the power state of the cores 3002A-N and the integrated graphics logic 3008. The display unit is for driving one or more externally connected displays.

The cores 3002A-N may be homogenous or heterogeneous in terms of architecture instruction set; that is, two or more of the cores 3002A-N may be capable of execution the same instruction set, while others may be capable of executing only a subset of that instruction set or a different instruction set.

Exemplary Computer Architectures

FIGS. 31-34 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 31:
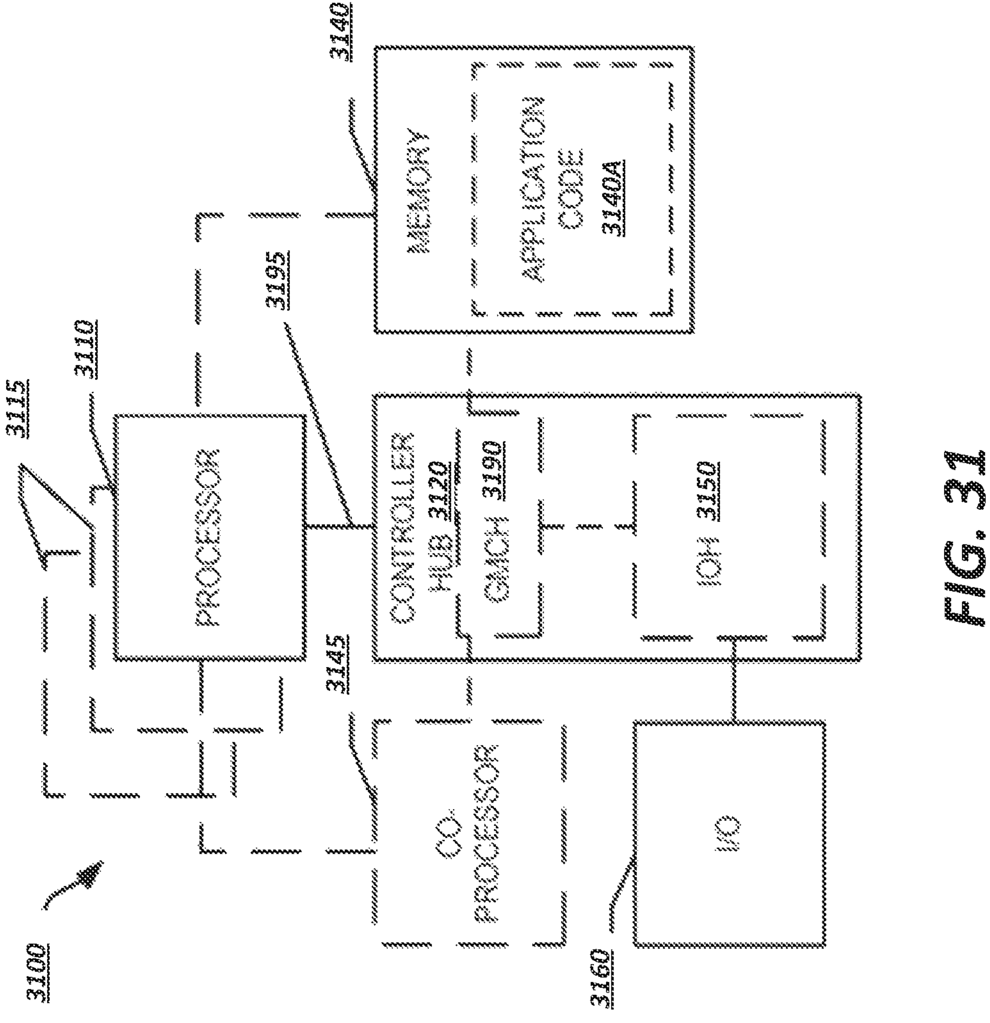
FIG. 31 is a block diagram of a system.

Referring now to FIG. 31, shown is a block diagram of a system 3100 in accordance with one embodiment of the present disclosure. The system 3100 may include one or more processors 3110, 3115, which are coupled to a controller hub 3120. In one embodiment the controller hub 3120 includes a graphics memory controller hub (GMCH) 3190 and an Input/Output Hub (IOH) 3150 (which may be on separate chips); the GMCH 3190 includes memory and graphics controllers to which are coupled memory 3140 and a coprocessor 3145; the IOH 3150 couples input/output (I/O) devices 3160 to the GMCH 3190. Alternatively, one or both of the memory and graphics controllers are integrated within the processor (as described herein), the memory 3140 and the coprocessor 3145 are coupled directly to the processor 3110, and the controller hub 3120 in a single chip with the IOH 3150. Memory 3140 may include application code 3140A, for example, to store code that when executed causes a processor to perform any method of this disclosure.

The optional nature of additional processors 3115 is denoted in FIG. 31 with broken lines. Each processor 3110, 3115 may include one or more of the processing cores described herein and may be some version of the processor 3000.

The memory 3140 may be, for example, dynamic random-access memory (DRAM), phase change memory (PCM), or a combination of the two. For at least one embodiment, the controller hub 3120 communicates with the processor(s) 3110, 3115 via a multi-drop bus, such as a frontside bus (FSB), point-to-point interface such as Quickpath Interconnect (QPI), or similar connection 3195.

In one embodiment, the coprocessor 3145 is a special-purpose processor, such as, for example, a high-throughput MIC processor, a network or communication processor, compression engine, graphics processor, GPGPU, embedded processor, or the like. In one embodiment, controller hub 3120 may include an integrated graphics accelerator.

There can be a variety of differences between the physical resources 3110, 3115 in terms of a spectrum of metrics of merit including architectural, microarchitectural, thermal, power consumption characteristics, and the like.

In one embodiment, the processor 3110 executes instructions that control data processing operations of a general type. Embedded within the instructions may be coprocessor instructions. The processor 3110 recognizes these coprocessor instructions as being of a type that should be executed by the attached coprocessor 3145. Accordingly, the processor 3110 issues these coprocessor instructions (or control signals representing coprocessor instructions) on a coprocessor bus or other interconnect, to coprocessor 3145. Coprocessor(s) 3145 accept and execute the received coprocessor instructions.

Figure 32:
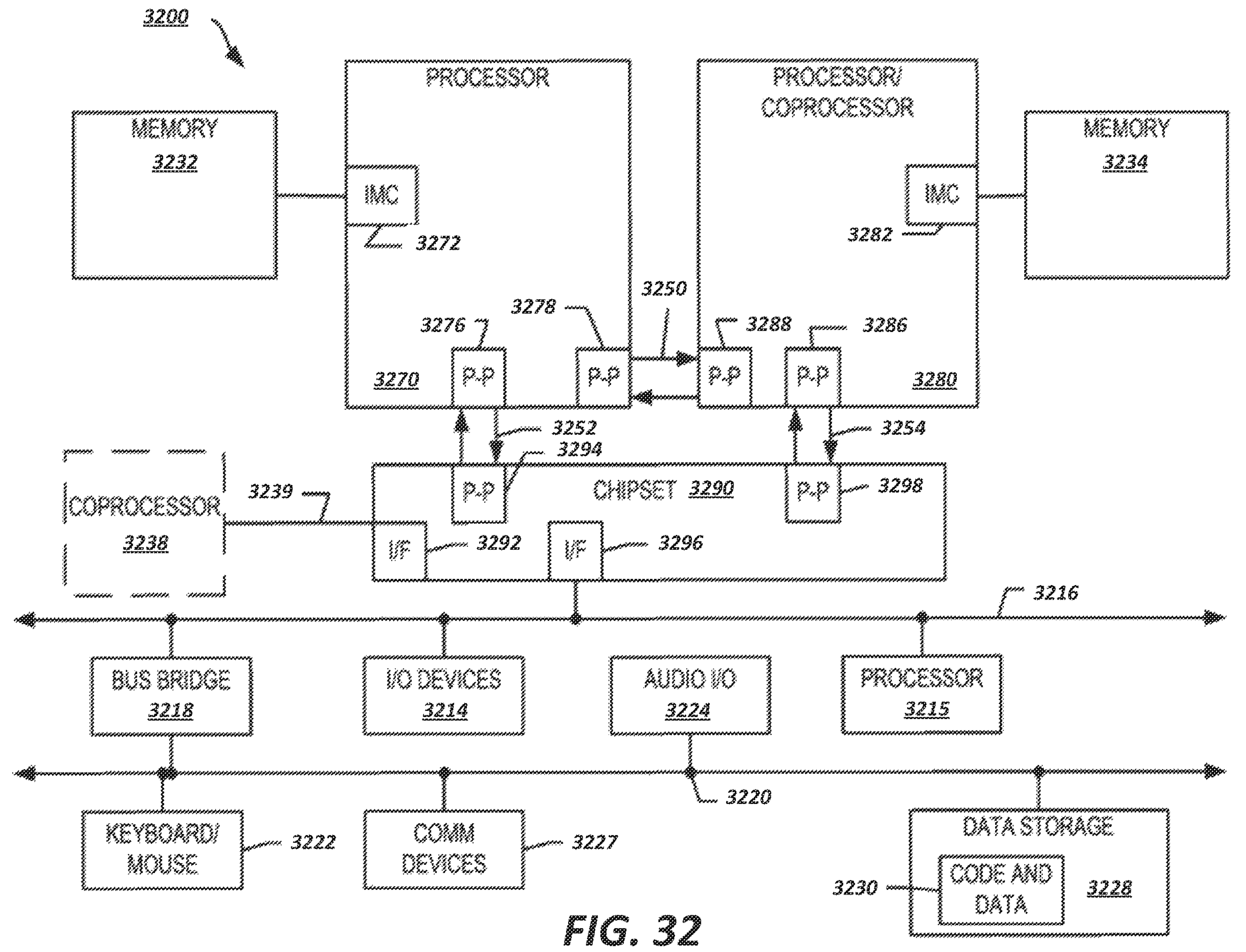
FIG. 32 is a block diagram of a more specific exemplary system.

Referring now to FIG. 32, shown is a block diagram of a first more specific exemplary system 3200 in accordance with an embodiment of the present disclosure. As shown in FIG. 32, multiprocessor system 3200 is a point-to-point interconnect system, and includes a first processor 3270 and a second processor 3280 coupled via a point-to-point interconnect 3250. Each of processors 3270 and 3280 may be some version of the processor 3000. In one embodiment of the disclosure, processors 3270 and 3280 are respectively processors 3110 and 3115, while coprocessor 3238 is coprocessor 3145. In another embodiment, processors 3270 and 3280 are respectively processor 3110 coprocessor 3145.

Processors 3270 and 3280 are shown including integrated memory controller (IMC) units 3272 and 3282, respectively. Processor 3270 also includes as part of its bus controller units point-to-point (P-P) interfaces 3276 and 3278; similarly, second processor 3280 includes P-P interfaces 3286 and 3288. Processors 3270, 3280 may exchange information via a point-to-point (P-P) interface 3250 using P-P interface circuits 3278, 3288. As shown in FIG. 32, IMCs 3272 and 3282 couple the processors to respective memories, namely a memory 3232 and a memory 3234, which may be portions of main memory locally attached to the respective processors.

Processors 3270, 3280 may each exchange information with a chipset 3290 via individual P-P interfaces 3252, 3254 using point to point interface circuits 3276, 3294, 3286, 3298. Chipset 3290 may optionally exchange information with the coprocessor 3238 via a high-performance interface 3239. In one embodiment, the coprocessor 3238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet is connected with the processors via P-P interconnect, such that either or both processors' local cache information may be stored in the shared cache if a processor is placed into a low power mode.

Chipset 3290 may be coupled to a first bus 3216 via an interface 3296. In one embodiment, first bus 3216 may be a Peripheral Component Interconnect (PCI) bus, or a bus such as a PCI Express bus or another third generation I/O interconnect bus, although the scope of the present disclosure is not so limited.

As shown in FIG. 32, various I/O devices 3214 may be coupled to first bus 3216, along with a bus bridge 3218 which couples first bus 3216 to a second bus 3220. In one embodiment, one or more additional processor(s) 3215, such as coprocessors, high-throughput MIC processors, GPGPU's, accelerators (such as, e.g., graphics accelerators or digital signal processing (DSP) units), field programmable gate arrays, or any other processor, are coupled to first bus 3216. In one embodiment, second bus 3220 may be a low pin count (LPC) bus. Various devices may be coupled to a second bus 3220 including, for example, a keyboard and/or mouse 3222, communication devices 3227 and a storage unit 3228 such as a disk drive or other mass storage device which may include instructions/code and data 3230, in one embodiment. Further, an audio I/O 3224 may be coupled to the second bus 3220. Note that other architectures are possible. For example, instead of the point-to-point architecture of FIG. 32, a system may implement a multi-drop bus or other such architecture.

Figure 33:
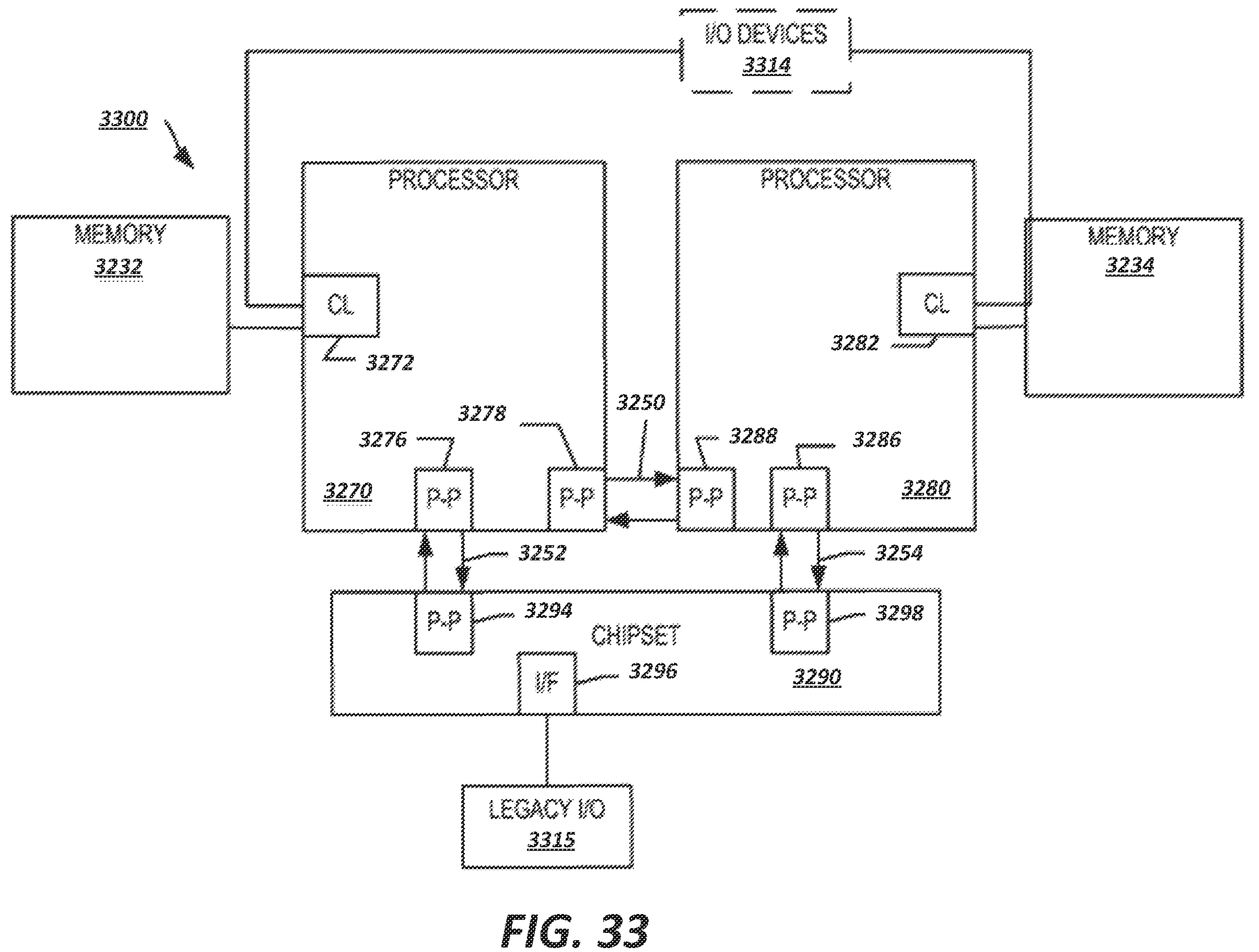
FIG. 33, shown is a block diagram of a second more specific exemplary system.

Referring now to FIG. 33, shown is a block diagram of a second more specific exemplary system 3300 in accordance with an embodiment of the present disclosure. Like elements in FIGS. 32 and 33 bear like reference numerals, and certain aspects of FIG. 32 have been omitted from FIG. 33 in order to avoid obscuring other aspects of FIG. 33.

FIG. 33 illustrates that the processors 3270, 3280 may include integrated memory and I/O control logic ("CL") 3272 and 3282, respectively. Thus, the CL 3272, 3282 include integrated memory controller units and include I/O control logic. FIG. 33 illustrates that not only are the memories 3232, 3234 coupled to the CL 3272, 3282, but also that I/O devices 3314 are also coupled to the control logic 3272, 3282. Legacy I/O devices 3315 are coupled to the chipset 3290.

Figure 34:
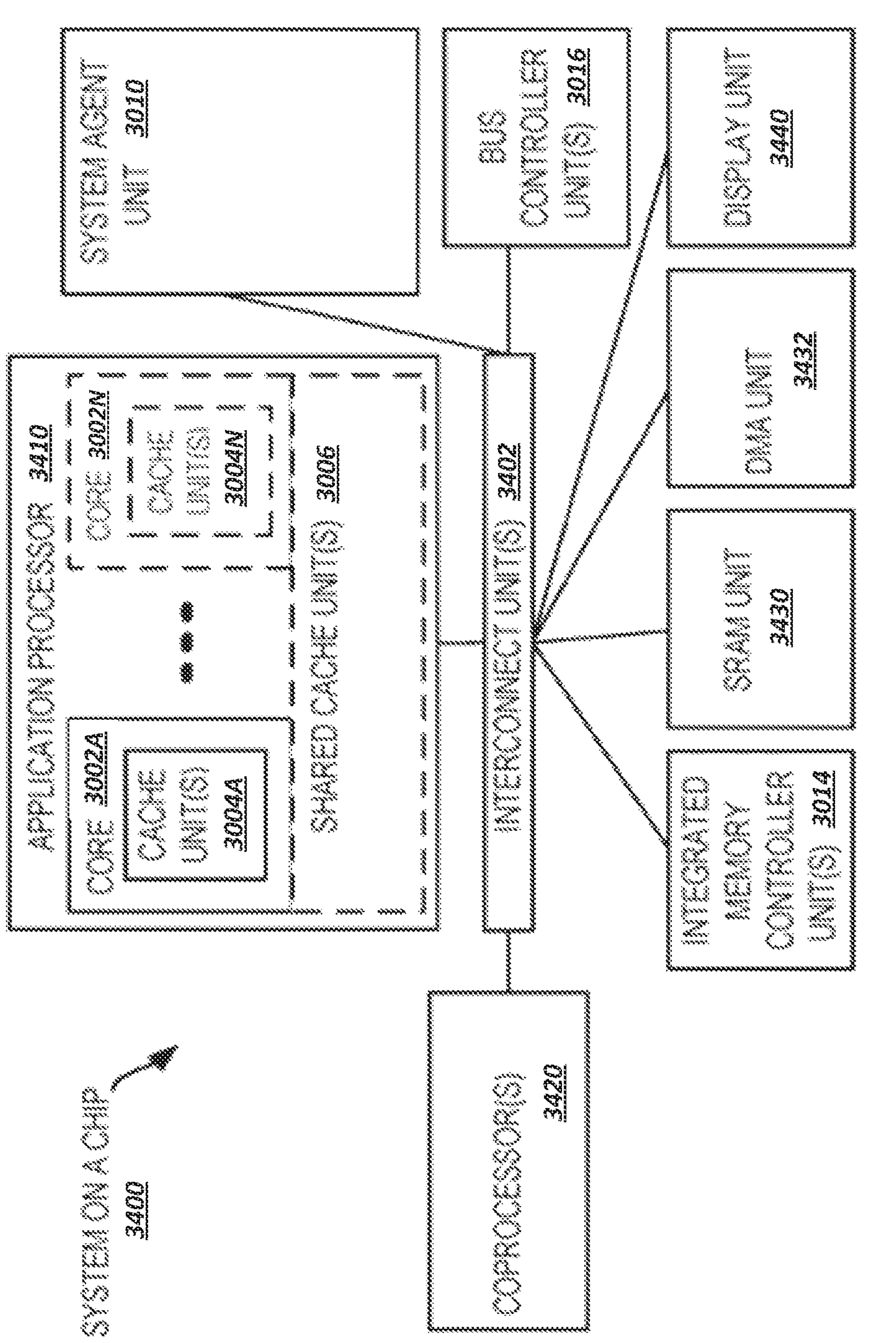
FIG. 34, shown is a block diagram of a system on a chip (SoC).

Referring now to FIG. 34, shown is a block diagram of a SoC 3400 in accordance with an embodiment of the present disclosure. Similar elements in FIG. 30 bear like reference numerals. Also, dashed lined boxes are optional features on more advanced SoCs. In FIG. 34, an interconnect unit(s) 3402 is coupled to: an application processor 3410 which includes a set of one or more cores 3002A-N and shared cache unit(s) 3006; a system agent unit 3010; a bus controller unit(s) 3016; an integrated memory controller unit(s) 3014; a set or one or more coprocessors 3420 which may include integrated graphics logic, an image processor, an audio processor, and a video processor; an static random access memory (SRAM) unit 3430; a direct memory access (DMA) unit 3432; and a display unit 3440 for coupling to one or more external displays. In one embodiment, the coprocessor(s) 3420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems including at least one processor, a storage system (including volatile and non-volatile memory and/or storage elements), at least one input device, and at least one output device.

Program code, such as code 3230 illustrated in FIG. 32, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 35:
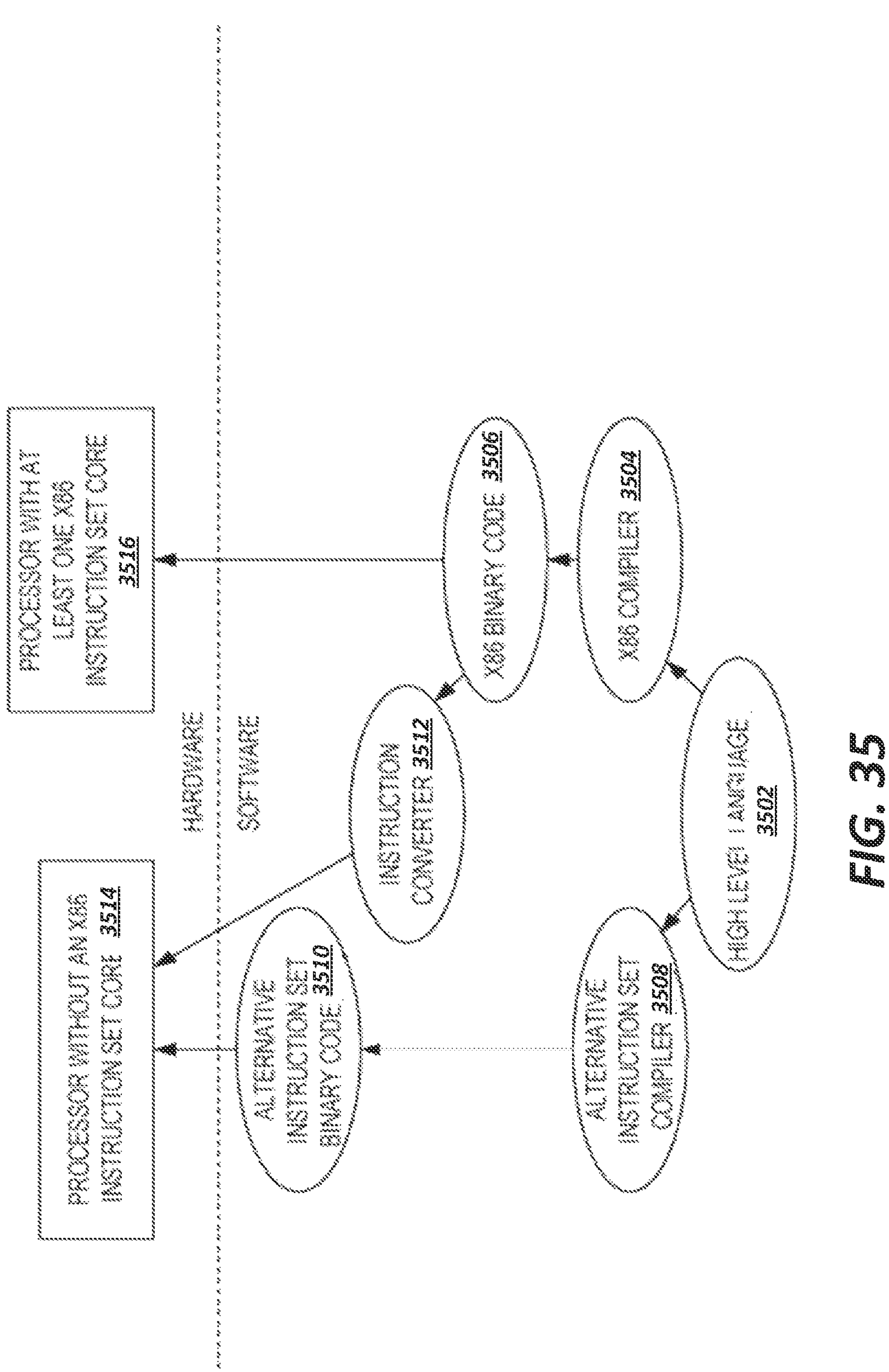
FIG. 35 is a block diagram contrasting the use of a software instruction converter to convert binary instructions in a source instruction set to binary instructions in a target instruction set.

FIG. 35 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 35 shows a program in a high-level language 3502 may be compiled using an x86 compiler 3504 to generate x86 binary code 3506 that may be natively executed by a processor with at least one x86 instruction set core 3516. The processor with at least one x86 instruction set core 3516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 3504 represents a compiler that is operable to generate x86 binary code 3506 (e.g., object code) that can, with or without additional linkage processing, be executed on the processor with at least one x86 instruction set core 3516. Similarly, FIG. 35 shows the program in the high level language 3502 may be compiled using an alternative instruction set compiler 3508 to generate alternative instruction set binary code 3510 that may be natively executed by a processor without at least one x86 instruction set core 3514 (e.g., a processor with cores that execute the MIPS instruction set of MIPS Technologies of Sunnyvale, CA and/or that execute the ARM instruction set of ARM Holdings of Sunnyvale, CA). The instruction converter 3512 is used to convert the x86 binary code 3506 into code that may be natively executed by the processor without an x86 instruction set core 3514. This converted code is not likely to be the same as the alternative instruction set binary code 3510 because an instruction converter capable of this is difficult to make; however, the converted code will accomplish the general operation and be made up of instructions from the alternative instruction set. Thus, the instruction converter 3512 represents software, firmware, hardware, or a combination thereof that, through emulation, simulation, or any other process, allows a processor or other electronic device that does not have an x86 instruction set processor or core to execute the x86 binary code 3506.

"Logic" (e.g., as found in offload engines, memory managers, memory controllers, network controllers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

It should be appreciated that logic, engines, components, and modules, as discussed above, may be implemented entirely in hardware circuitry, firmware, or software. In other instances, logic, engines, modules, and components may be implemented through a combination of hardware circuitry, firmware, or software. In some cases, components described as implemented at least partially in hardware may be emulated or simulated in hardware, such as in a system simulator, among other example implementations.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is a system including: a set of graph processing cores; and a set of dense compute cores, where the set of graph processing cores and the set of dense cores are interconnected in a network, where a particular one of the set of dense compute cores includes offload queue circuitry to: receive an offload request from a particular one of the set of graph processing cores, where the offload request identifies one or more functions in a workload to be performed by the particular dense compute core; queue the offload request; configure compute circuitry and memory of the particular dense compute core to perform the one or more functions; monitor status of performance of the one or more functions by the particular dense compute core; and identify, to the particular graph processing core, the status of performance of the one or more functions.

Example 2 includes the subject matter of example 1, where each graph processing core in the set of graph processing cores includes circuitry to implement a respective plurality of multi-threaded pipelines.

Example 3 includes the subject matter of example 2, where each graph processing core in the set of graph processing cores further includes circuitry to implement one or more single-threaded pipelines in addition to the plurality of multi-threaded pipelines.

Example 4 includes the subject matter of any one of examples 1-3, where each dense compute core in the set of dense compute cores includes a respective array of compute circuits.

Example 5 includes the subject matter of example 4, where the array of compute circuits includes a two-dimensional systolic array.

Example 6 includes the subject matter of any one of examples 4-5, where configuration of the compute circuitry includes configuration of the array of compute circuits.

Example 7 includes the subject matter of any one of examples 4-6, where the memory of the particular dense compute core includes local scratchpad memory.

Example 8 includes the subject matter of any one of examples 1-7, where one or more of the set of graph processing cores are resident on a same die with the one or more of the set of graph processing cores.

Example 9 includes the subject matter of example 8, where another one of the set of graph processing cores in on a different die.

Example 10 includes the subject matter of any one of examples 1-9, where each of the set of graph processing cores is optimized for sparse computations associated with graph-based data structures.

Example 11 includes the subject matter of any one of examples 1-10, where the network includes a high radix, low diameter network.

Example 12 includes the subject matter of any one of examples 1-11, where the request includes a single instruction and the particular graph processing core includes a decoder to decode the single instruction and further includes an execution unit to execute the single instruction to cause the functions to be performed.

Example 13 includes the subject matter of any one of examples 1-12, where the single instruction includes a program counter field to identify a first of the one or more functions to be performed in association with the request, a first address field to identify a location of first operand data, a second address field to identify a location of second operand data, a third address field to identify a destination for an output of the one or more functions, and a dense core address field to identify an address of the particular dense compute core.

Example 14 is an apparatus including: an array of compute circuits; a memory; a decoder circuity to decode a single instruction into a decoded single instruction, the single instruction including a program counter field to identify a first of one or more functions to be performed using the array of compute circuits, a first address field to identify a location of first operand data to be used in the one or more functions, a second address field to identify a location of second operand data to be used in the one or more functions, a third address field to identify a destination for an output of the one or more functions, and a dense core address field to identify an address of a dense compute core to perform the one or more functions; and an execution circuit to execute the decoded single instruction according to the fields.

Example 15 includes the subject matter of example 14, where execution of the single instruction causes the one or more functions to be launched on the array of compute circuits.

Example 16 includes the subject matter of example 15, where launching the one or more functions includes configuring the array of compute circuitry and the memory for the one or more functions.

Example 17 includes the subject matter of any one of examples 15-16, where the single instruction corresponds to a request to offload the one or more functions from a sparse compute core to the dense compute core, and execution of the single instruction causes the request to be queued and status of the request to be monitored using hardware of the dense compute core.

Example 18 includes the subject matter of example 17, where the execution of the single instruction causes a response message to be generated for the sparse compute core to identify acceptance of the one or more functions by the dense compute core.

Example 19 includes the subject matter of any one of examples 17-18, where the single instruction is issued by the sparse compute core.

Example 20 is a method including: receiving an offload request at a particular one of a set of dense compute cores from a particular one of a set of sparse compute cores, where the set of dense compute cores and the set of sparse compute cores are interconnected in a network, and one or more of the set of dense compute cores and one or more of the set of sparse compute cores are present on a common die; performing a portion of a workload at the particular dense compute core based on the offload request; and returning a result the portion of the workload to shared memory accessible to the particular sparse compute core.

Example 21 includes the subject matter of example 20, further including performing additional portions of the workload using the particular sparse core using the result.

Example 22 includes the subject matter of example 21, where the workload includes a graph analytics algorithm.

Example 23 includes the subject matter of any one of examples 20-22, further including, detecting that the portion includes a dense compute function and generating the offload request based on detecting that the portion includes the dense compute function.

Example 24 includes the subject matter of example 23, where the dense compute function includes one or a convolution, fast Fourier transform (FFT), or general matrix multiply (GeMM) function.

Example 25 includes the subject matter of any one of examples 20-24, further including: queuing the offload request in a hardware-implemented offload queue; determining that resources of the particular dense compute core are available to perform the portion of the workload; launching performance of the portion of the workload by the particular dense compute core; monitoring, in hardware of the particular dense compute core, status of the performance of the portion of the workload; and sending an acknowledgement to the particular sparse compute core that the particular dense compute core is handling the portion of the workload.

Example 26 includes the subject matter of example 25, where launching performance of the portion of the workload includes: configuring a reconfigurable array of compute units in the particular dense compute core to perform the portion of the workload based on the offload request; and preparing data for use by the reconfigurable array in scratchpad memory of the particular dense compute core based on the offload request.

Example 27 is a system including means to perform the method of any one of examples 20-26.

Example 28 is a memory controller, including: physical layer (PHY) circuitry to communicate with a memory module via a memory bus, wherein the memory module includes a first memory rank and a second memory rank, and wherein the memory bus includes: a command bus to send commands to the memory module, wherein the command bus is shared by the first memory rank and the second memory rank; a first data bus to receive data from the first memory rank, wherein the first data bus has a 4-bit width; and a second data bus to receive data from the second memory rank, wherein the second data bus has a 4-bit width; and control circuitry to: send, via the command bus, a plurality of read commands to the memory module, wherein the plurality of read commands alternate between the first memory rank and the second memory rank, and wherein each read command causes 8 bytes of data to be read from the first memory rank or the second memory rank.

Example 29 includes the subject matter of example 28, wherein: the plurality of read commands includes a first set of read commands and a second set of read commands, wherein the first set of read commands is for the first memory rank, and wherein the second set of read commands is for the second memory rank; and the first set of read commands and the second set of read commands are interleaved over the command bus.

Example 30 includes the subject matter of example 29, wherein the control circuitry is further to: receive, via the first data bus, a first set of data from the first memory rank based on the first set of read commands; and receive, via the second data bus, a second set of data from the second memory rank based on the second set of read commands.

Example 31 includes the subject matter of any of examples 29-30, wherein each read command of the plurality of read commands is for a different memory rank than an immediately preceding read command.

Example 32 includes the subject matter of any of examples 28-31, wherein each read command further causes the 8 bytes of data to be read over 16 cycles from the first memory rank or the second memory rank.

Example 33 includes the subject matter of any of examples 28-32, wherein: the memory bus further includes: a first chip select interface to selectively activate the first memory rank; and a second chip select interface to selectively activate the second memory rank; and the control circuitry is further to: schedule the plurality of read commands for transmission over the command bus; and selectively activate, via the first chip select interface and the second chip select interface, the first memory rank and the second memory rank to cause the plurality of read commands to alternate between the first memory rank and the second memory rank.

Example 34 includes the subject matter of example 33, wherein the control circuitry to selectively activate, via the first chip select interface and the second chip select interface, the first memory rank and the second memory rank to cause the plurality of read commands to alternate between the first memory rank and the second memory rank is further to: oscillate a chip select signal on each of the first chip select interface and the second chip select interface to cause the plurality of read commands to alternate between the first memory rank and the second memory rank.

Example 35 includes the subject matter of any of examples 28-34, wherein the memory module is a dual rank memory module.

Example 36 includes the subject matter of example 35, wherein the dual rank memory module is a Double Data Rate 5 (DDR5) dual rank memory module.

Example 37 includes the subject matter of example 36, wherein the command bus is a command/address (CA) bus for the DDR5 dual rank memory module.

Example 38 includes the subject matter of any of examples 35-37, wherein the dual rank memory module is a dual in-line memory module (DIMM).

Example 39 is one or more non-transitory computer-readable media including instructions that, when executed by a memory controller, cause the memory controller to: send, via a command bus, a plurality of read commands to a memory module, wherein: the memory module includes a first memory rank and a second memory rank; and the plurality of read commands includes a first set of read commands for the first memory rank and a second set of read commands for the second memory rank, wherein the first set of read commands and the second set of read commands are interleaved over the command bus, and wherein each read command causes 8 bytes of data to be read from the first memory rank or the second memory rank; receive, via a first data bus, a first set of data from the first memory rank based on the first set of read commands, wherein the first data bus has a 4-bit width; and receive, via a second data bus, a second set of data from the second memory rank based on the second set of read commands, wherein the second data bus has a 4-bit width.

Example 40 includes the subject matter of example 39, wherein each read command of the plurality of read commands is for a different memory rank than an immediately preceding read command.

Example 41 includes the subject matter of any of examples 39-40, wherein each read command further causes the 8 bytes of data to be read over 16 cycles from the first memory rank or the second memory rank.

Example 42 includes the subject matter of any of examples 39-41, wherein the instructions further cause the memory controller to: schedule the plurality of read commands for transmission over the command bus; and selectively activate, via a plurality of chip select interfaces, the first memory rank and the second memory rank to cause the plurality of read commands to alternate between the first memory rank and the second memory rank.

Example 43 includes the subject matter of example 42, wherein the instructions that cause the memory controller to selectively activate, via the plurality of chip select interfaces, the first memory rank and the second memory rank to cause the plurality of read commands to alternate between the first memory rank and the second memory rank further cause the memory controller to: oscillate a chip select signal on each of the plurality of chip select interfaces to cause the plurality of read commands to alternate between the first memory rank and the second memory rank.

Example 44 includes the subject matter of any of examples 39-43, wherein the memory module is a dual rank memory module.

Example 45 includes the subject matter of example 44, wherein the dual rank memory module is a Double Data Rate 5 (DDR5) dual rank memory module.

Example 46 is a system, including: a processor; a memory module, wherein the memory module includes a first memory rank and a second memory rank; and a memory controller according to any of examples 28-38.

Example 47 includes the subject matter of example 46, wherein the processor includes a graph processing node, wherein the graph processing node includes one or more single-thread cores or one or more multi-thread cores.

Example 48 is an apparatus including: memory controller circuitry to: perform a first training on a first rank of a memory module to determine a first delay line value for a skew of signals between the memory controller circuitry and the first rank of the memory module; perform a second training on a second rank of a memory module to determine a second delay line value for a skew of signals between the memory controller circuitry and the second rank of the memory module; determine a third delay line value based on the first and second delay line values; and program a delay line controller of the memory controller to implement the third delay line value for memory accesses to the first and second memory ranks. In some instances, the memory module includes the first memory rank and the second memory rank. In some instances, the apparatus may further include the delay line controller of the memory controller to implement the third delay line value for memory accesses to the first and second memory ranks.

Example 49 includes the subject matter of example 48, where the memory controller circuitry is to determine the third delay line value by averaging the first and second delay line values.

Example 50 includes the subject matter of example 48 or 49, where the first and second delay line values are for a skew between a clock signal and a data strobe signal.

Example 51 includes the subject matter of example 48 or 49, where the first and second delay line values are for a skew between a data strobe signal and a data signal.

Example 52 includes the subject matter of example 48 or 49, where the first and second delay line values are for a skew between a clock signal and a command signal.

Example 53 includes the subject matter of example 48 or 49, where the first and second delay line values are for a skew between a clock signal and a channel select signal.

Example 54 includes the subject matter of any one of examples 48-53, where the memory controller circuitry is further to interleave commands to the first and second ranks using the third delay line value for each command.

Example 55 is a method including: performing, by a memory controller, a first training on a first rank of a memory module to determine a first delay line value for a skew of signals between the memory controller circuitry and the first rank of the memory module; performing, by the memory controller, a second training on a second rank of a memory module to determine a second delay line value for a skew of signals between the memory controller circuitry and the second rank of the memory module; determining, by the memory controller, a third delay line value based on the first and second delay line values; and programming a delay line controller of the memory controller to implement the third delay line value for memory accesses to the first and second memory ranks.

Example 56 includes the subject matter of example 55, where determining the third delay line value includes averaging the first and second delay line values.

Example 57 includes the subject matter of example 55 or 56, where the first and second delay line values are for a skew between a clock signal and a data strobe signal.

Example 58 includes the subject matter of example 55 or 56, where the first and second delay line values are for a skew between a data strobe signal and a data signal.

Example 59 includes the subject matter of example 55 or 56, where the first and second delay line values are for a skew between a clock signal and a command signal.

Example 60 includes the subject matter of example 55 or 56, where the first and second delay line values are for a skew between a clock signal and a channel select signal.

Example 61 includes the subject matter of any one of examples 55-60, further including interleaving commands sent to the first and second ranks using the third delay line value for each command.

Example 62 is a non-transitory computer-readable media including instructions, that when executed by a memory controller, cause the memory controller to: perform a first training on a first rank of a memory module to determine a first delay line value for a skew of signals between the memory controller circuitry and the first rank of the memory module; perform a second training on a second rank of a memory module to determine a second delay line value for a skew of signals between the memory controller circuitry and the second rank of the memory module; determine a third delay line value based on the first and second delay line values; and program a delay line controller of the memory controller to implement the third delay line value for memory accesses to the first and second memory ranks.

Example 63 includes the subject matter of example 62, where the memory controller circuitry is to determine the third delay line value by averaging the first and second delay line values.

Example 64 includes the subject matter of example 62 or 63, where the first and second delay line values are for a skew between a clock signal and a data strobe signal.

Example 65 includes the subject matter of example 62 or 63, where the first and second delay line values are for a skew between a data strobe signal and a data signal.

Example 66 includes the subject matter of example 62 or 63, where the first and second delay line values are for a skew between a clock signal and a command signal.

Example 67 includes the subject matter of example 62 or 63, where the first and second delay line values are for a skew between a clock signal and a channel select signal.

Example 68 includes the subject matter of any one of examples 62-67, where the memory controller circuitry is further to interleave commands to the first and second ranks using the third delay line value for each command.

Example 69 is an apparatus including: a circuit board; a first set of dynamic random access memory (DRAM) chips on a first side of the circuit board; a second set of DRAM chips on a second side of the circuit board opposite the first side; and input/output pins at an edge of the apparatus;

where the first set of DRAM chips is associated with a first memory rank, the second set of DRAM chips is associated with a second memory rank, and the first and second sets of DRAM chips are positioned approximately equidistant from the input/output pins.

Example 70 includes the subject matter of example 69, where each DRAM chip of the first set of DRAM chips is associated with a respective memory channel of as set of memory channels, each DRAM chip of the second set of DRAM chips is associated with a respective memory channel of the set of memory channels.

Example 71 includes the subject matter of example 69 or 70, where a first DRAM chip of the first set of DRAM chips is associated with a first memory channel, a first DRAM chip of the second set of DRAM chips is associated with the first memory channel, and the first DRAM chip of the first set of DRAM chips is positioned above the first DRAM chip of the second set of DRAM chips relative to the circuit board.

Example 72 includes the subject matter of example 70, where the set of memory channels includes four memory channels.

Example 73 includes the subject matter of any one of examples 69-72, where each DRAM chip has an 8-bit wide data bus.

Example 74 includes the subject matter of any one of examples 69-73, where the apparatus is a dual inline memory module (DIMM).

Example 75 includes the subject matter of example 74, where the DIMM has a DDR5-compatible form factor.

Example 76 is an apparatus including: a circuit board; a first set of dynamic random access memory (DRAM) chips on a first side of the circuit board, the first set of DRAM chips including a number of subsets of DRAM chips, each subset corresponding to a respective memory channel of a set of memory channels, each of the first set of DRAM chips corresponding to a first rank of the memory channels; a second set of DRAM chips on a second side of the circuit board, the second set of DRAM chips including the number of subsets of DRAM chips, each subset corresponding to a respective memory channel of the memory channels, each of the second set of DRAM chips corresponding to a second rank of the memory channels; where each DRAM chip of the first set of DRAM chips has a corresponding DRAM chip of the second set of DRAM chips and the corresponding DRAM chips of the first and second sets are positioned generally opposite one another on the circuit board.

Example 77 includes the subject matter of example 76, where the set of memory channels includes four memory channels.

Example 78 includes the subject matter of example 76 or 77, where each subset of DRAM chips includes one DRAM chip corresponding to a memory channel of the set of memory channels.

Example 79 includes the subject matter of any one of examples 76-78, further including a set of input/output pins at an edge of the apparatus, where the first and second sets of DRAM chips are positioned approximately equidistant from the input/output pins.

Example 80 includes the subject matter of any one of examples 76-79, where: the first set of DRAM chips includes: a first DRAM chip associated with a first memory channel; a second DRAM chip associated with a second memory channel; a third DRAM chip associated with a third memory channel; and a fourth DRAM chip associated with a fourth memory channel; and the second set of DRAM chips includes: a first DRAM chip associated with a first memory channel and positioned opposite the first DRAM chip of the first set of DRAM chips; a second DRAM chip associated with a second memory channel and positioned opposite the second DRAM chip of the first set of DRAM chips; a third DRAM chip associated with a third memory channel and positioned opposite the third DRAM chip of the first set of DRAM chips; and a fourth DRAM chip associated with a fourth memory channel and positioned opposite the fourth DRAM chip of the first set of DRAM chips.

Example 81 includes the subject matter of any one of examples 76-80, where each DRAM chip has an 8-bit wide data bus.

Example 82 includes the subject matter of any one of examples 76-81, where the apparatus is a dual inline memory module (DIMM).

Example 83 includes the subject matter of example 82, where the DIMM has a DDR5-compatible form factor.

Example 84 is a system including: a graph processing node including: one or more multi-thread cores; one or more single-thread cores; and a memory module according to any one of examples 69-83.

Example 85 includes the subject matter of example 84, where the graph processing node further includes an offload engine.

Example 86 includes the subject matter of any one of examples 84-85, where the graph processing node is a first graph processing node, and the system further includes a second graph processing node including a multi-thread core, a single-thread core, and a memory module according to any one of examples 69-84.

Example 87 includes the subject matter of any one of examples 84-86, further including: a general-purpose processor the graph processing node; memory elements; and circuitry to interconnect the general-purpose processor, memory elements, and the graph processing node.

Example 88 includes the subject matter of any one of examples 84-87, further including a blade server, where the graph processing node is implemented in the blade server.

Example 89 is an apparatus including: memory controller circuitry to: schedule a set of memory access requests to first prioritize switching between memory ranks from transaction to transaction and second prioritize a same memory access request type from transaction to transaction; and perform the memory access requests in the scheduled order.

Example 90 includes the subject matter of example 89, where the memory controller circuitry is to third prioritize switching between bank groups from transaction to transaction.

Example 91 includes the subject matter of example 90, where the memory controller circuitry is to fourth prioritize read commands before write commands.

Example 92 includes the subject matter of example 91, where the memory controller circuitry is to fifth prioritize a same page address from transaction to transaction.

Example 93 includes the subject matter of example 92, where the memory controller circuitry is to sixth prioritize an expected arrival time from transaction to transaction.

Example 94 includes the subject matter of any one of examples 89-93, where the set of memory requests each indicate a memory address, the memory address formatted with a rank selection indication on a least significant bit (LSB) side of the memory address bits.

Example 95 includes the subject matter of example 94, where the memory address is formatted to indicate, from most significant bit to least significant bit, a page address, a bank, a bank group, a column-high address, a rank selection address, and a column-low address.

Example 96 includes the subject matter of example 94, where the memory address is formatted to indicate, from most significant bit to least significant bit, a page address, a column-high address, a bank, a bank group, a rank selection address, and a column-low address.

Example 97 is a method including: obtaining, at a memory controller, a set of memory access requests; scheduling, by the memory controller, the set of memory access requests to first prioritize switching between memory ranks from transaction to transaction and second prioritize a same memory access request type from transaction to transaction; and performing, by the memory controller, the memory access requests in the scheduled order.

Example 98 includes the subject matter of example 97, where the scheduling is to third prioritize switching between bank groups from transaction to transaction.

Example 99 includes the subject matter of example 98, where the scheduling is to fourth prioritize read commands before write commands.

Example 100 includes the subject matter of example 99, where the scheduling is to fifth prioritize a same page address from transaction to transaction.

Example 101 includes the subject matter of example 100, where the scheduling is to sixth prioritize an expected arrival time from transaction to transaction.

Example 102 includes the subject matter of any one of examples 97-101, where the set of memory requests each indicate a memory address, the memory address formatted with a rank selection indication on a least significant bit (LSB) side of the memory address bits.

Example 103 includes the subject matter of example 102, where the memory address is formatted to indicate, from most significant bit to least significant bit, a page address, a bank, a bank group, a column-high address, a rank selection address, and a column-low address.

Example 104 includes the subject matter of example 102, where the memory address is formatted to indicate, from most significant bit to least significant bit, a page address, a column-high address, a bank, a bank group, a rank selection address, and a column-low address.

Example 105 is a non-transitory computer-readable media including instructions, that when executed by a memory controller, cause the memory controller to: schedule a set of memory access requests to first prioritize switching between memory ranks from transaction to transaction and second prioritize a same memory access request type from transaction to transaction; and perform the memory access requests in the scheduled order.

Example 106 includes the subject matter of example 105, where the set of memory requests each indicate a memory address, the memory address formatted with a rank selection indication on a least significant bit (LSB) side of the memory address bits.

Example 107 includes the subject matter of example 105, where the memory address is formatted to indicate, from most significant bit to least significant bit, a page address, a bank, a bank group, a column-high address, a rank selection address, and a column-low address.

Example 108 includes the subject matter of example 105, where the memory address is formatted to indicate, from most significant bit to least significant bit, a page address, a column-high address, a bank, a bank group, a rank selection address, and a column-low address.

Example 109 is a system including: a first compute core including a plurality of multithreaded pipelines; a second compute core including a systolic array, where the first compute core is connected to the second compute core, and the first compute core includes offload logic to: identify an opportunity to offload a portion of a workload from the first compute core to the second compute core; and offload the portion of the workload to the second compute core.

Example 110 includes the subject matter of example 109, where the second compute core includes circuitry to: receive an offload request from the first compute core corresponding to the portion of the workload, where the offload request identifies one or more functions in the workload to be performed by the second compute core; queue the offload request; configure compute circuitry and memory of the second compute core to perform the one or more functions; monitor status of performance of the one or more functions by the second compute core; and identify, to the first compute core, the status of performance of the one or more functions.

Example 111 includes the subject matter of any one of examples 109-110, where the portion of the workload includes a dense compute portion of the workload.

Example 112 includes the subject matter of example 111, where the first compute core performs another portion of the workload.

Example 113 includes the subject matter of example 112, where the other portion includes a portion sensitive to memory latency.

Example 114 includes the subject matter of any one of examples 109-113, where the first compute core is a different type of compute core from the second compute core.

Example 115 includes the subject matter of example 114, where the first compute core includes a graph processing core and the second compute core includes a dense compute core.

Example 116 includes the subject matter of any one of examples 109-114, where offloading the portion of the workload to the second compute core includes executing a single instruction and the first compute core includes a decoder to decode the single instruction and further includes an execution unit to execute the single instruction to cause the functions to be performed.

Example 117 includes the subject matter of example 116, where the single instruction includes a program counter field to identify a first of the one or more functions to be performed in association with the request, a first address field to identify a location of first operand data, a second address field to identify a location of second operand data, a third address field to identify a destination for an output of the one or more functions, and a dense core address field to identify an address of the second compute core.

Example 118 is a system including: a plurality of graph processing cores, each graph processing core configured to execute a plurality of instructions in parallel within a multithreaded pipeline; a plurality of dense compute cores, each dense compute core configured to execute dense compute workloads using a systolic array; a network interconnecting the plurality of graph processing cores and the plurality of dense compute cores; where at least one dense compute core of the plurality of dense compute cores includes a circuitry configured to: receive an offload request from at least one of the plurality of graph processing cores, where the offload request identifies one or more functions in a workload to be performed by the at least one dense compute core of the plurality of dense compute cores; and configure compute circuitry and memory of the at least one dense compute core of the plurality of dense compute cores to perform the one or more functions.

Example 119 includes the subject matter of example 118, where the circuitry is further configured to provide results of the performed one or more functions to at least one of the plurality of graph processing cores.

Example 120 includes the subject matter of any one of examples 118-119, where the circuitry is further configured to monitor status of performance of the one or more functions by the at least one dense compute core of the plurality of dense compute cores; and identify, to the at least one of the plurality of graph processing cores, the status of performance of the one or more functions.

Example 121 includes the subject matter of any one of examples 118-120, further including memory shared by the at least one dense compute core of the plurality of dense compute cores and the at least one graph processing core of the plurality of graph processing cores.

Example 122 is an apparatus including: a plurality of compute circuits including at least one dense compute core; a memory; a decoder circuitry to decode a single computer instruction into a decoded single computer instruction, the single computer instruction including: a program counter field to identify a first of one or more functions to be performed using at least one of the plurality of compute circuits, a first address field to identify a location of first operand data to be used in the one or more functions, a second address field to identify a location of second operand data to be used in the one or more functions, a third address field to identify a destination for an output of the one or more functions, and a dense core address field to identify an address of the at least one dense compute core to perform the one or more functions.

Example 123 includes the subject matter of example 122, where the at least one dense compute core is configured to execute the decoded single computer instruction according to the fields.

Example 124 includes the subject matter of any one of examples 122-123, where execution of the single computer instruction causes the one or more functions to be launched on the plurality of compute circuits.

Example 125 is a memory controller including: a memory module; physical layer (PHY) circuitry to communicate with the memory module via a memory bus, where the memory module includes a first memory rank and a second memory rank, and where the memory bus includes: a command bus to send commands to the memory module, where the command bus is shared by the first memory rank and the second memory rank; a first data bus to receive data from the first memory rank, where the first data bus has a width of a plurality of bits; and a second data bus to receive data from the second memory rank, where the second data bus has a width of a plurality of bits; and control circuitry configured to: send, via the command bus, a plurality of read commands to the memory module, where the plurality of read commands alternate between the first memory rank and the second memory rank, and where each read command causes a plurality of bytes of data to be read from the first memory rank or the second memory rank.

Example 126 includes the subject matter of example 125, where the first data bus and the second data bus have the same number of bits as their data bus width.

Example 127 includes the subject matter of any one of examples 125-126, where the first data bus has a width of 4 bit and the second data bus has a width of 4 bit and where each read command causes 8 bytes of data to be read from the first memory rank or the second memory rank.

Example 128 is an apparatus including: memory controller circuitry configured to: schedule a set of memory access requests to switching between memory ranks from transaction to transaction according to a first priority and a set of memory access requests to a same memory access request type from transaction to transaction according to a second priority, the first priority being higher than the second priority; and perform the memory access requests in the scheduled order.

Example 129 includes the subject matter of example 128, where the memory further includes a plurality of memory ranks.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:

a set of one or more graph processing cores; and a set of one or more dense compute cores, wherein the set of graph processing cores and the set of dense compute cores are interconnected, and a particular one of the set of dense compute cores comprises offload queue circuitry to:

receive an offload request from a particular one of the set of graph processing cores, wherein the offload request identifies one or more functions in a workload to be performed by the particular dense compute core;

queue the offload request;

configure compute circuitry and memory of the particular dense compute core to perform the one or more functions;

monitor status of performance of the one or more functions by the particular dense compute core; and identify, to the particular graph processing core, the status of performance of the one or more functions.

2. The system of claim 1, wherein each graph processing core in the set of graph processing cores comprises circuitry to implement a respective plurality of multi-threaded pipelines.

3. The system of claim 2, wherein each graph processing core in the set of graph processing cores further comprises circuitry to implement one or more single-threaded pipelines in addition to the plurality of multi-threaded pipelines.

4. The system of claim 1, wherein each dense compute core in the set of dense compute cores comprises a respective array of compute circuits.

5. The system of claim 4, wherein the array of compute circuits comprises a two-dimensional systolic array.

6. The system of claim 4, wherein configuration of the compute circuitry comprises configuration of the array of compute circuits.

7. The system of claim 4, wherein the memory of the particular dense compute core comprises local scratchpad memory.

8. The system of claim 1, wherein one or more of the set of graph processing cores are resident on a same die with the one or more of the set of graph processing cores.

9. The system of claim 8, wherein another one of the set of graph processing cores in on a different die.

10. The system of claim 1, wherein each of the set of graph processing cores is optimized for sparse computations associated with graph-based data structures.

11. The system of claim 1, wherein the set of graph processing cores and the set of dense compute cores are interconnected in a network, and the network comprises a high radix, low diameter network.

12. The system of claim 1, wherein the request comprises a single instruction and the particular graph processing core comprises a decoder to decode the single instruction and further comprises an execution unit to execute the single instruction to cause the functions to be performed.

13. The system of claim 1, wherein the single instruction comprises a program counter field to identify a first of the one or more functions to be performed in association with the request, a first address field to identify a location of first operand data, a second address field to identify a location of second operand data, a third address field to identify a destination for an output of the one or more functions, and a dense core address field to identify an address of the particular dense compute core.

14. An apparatus comprising:

an array of compute circuits;

a memory;

a decoder circuitry to decode a single instruction into a decoded single instruction, the single instruction comprising a program counter field to identify a first of one or more functions to be performed using the array of compute circuits, a first address field to identify a location of first operand data to be used in the one or more functions, a second address field to identify a location of second operand data to be used in the one or more functions, a third address field to identify a destination for an output of the one or more functions, and a dense core address field to identify an address of a dense compute core to perform the one or more functions, wherein the single instruction corresponds to a request to offload the one or more functions from a sparse compute core to the dense compute core; and an execution circuit to execute the decoded single instruction according to the fields.

15. The apparatus of claim 14, wherein execution of the single instruction causes the one or more functions to be launched on the array of compute circuits.

16. The apparatus of claim 15, wherein launching the one or more functions comprises configuring the array of compute circuitry and the memory for the one or more functions.

17. The apparatus of claim 15, wherein execution of the single instruction causes the request to be queued and status of the request to be monitored using hardware of the dense compute core.

18. The apparatus of claim 17, wherein the execution of the single instruction causes a response message to be generated for the sparse compute core to identify acceptance of the one or more functions by the dense compute core.

19. The apparatus of claim 17, wherein the single instruction is issued by the sparse compute core.

20. A method comprising:

receiving an offload request at a particular one of a set of dense compute cores from a particular one of a set of sparse compute cores, wherein the set of dense compute cores and the set of sparse compute cores are interconnected in a network, and one or more of the set of dense compute cores and one or more of the set of sparse compute cores are present on a common die;

performing a portion of a workload at the particular dense compute core based on the offload request, wherein the workload is associated with a graph data structure; and returning a result the portion of the workload to shared memory accessible to the particular sparse compute core.

21. The method of claim 20, further comprising performing additional portions of the workload using the particular sparse core using the result.

22. The method of claim 21, wherein the workload comprises a graph analytics algorithm to be applied to the graph data structure.

23. The method of claim 20, further comprising, detecting that the portion comprises a dense compute function and generating the offload request based on detecting that the portion comprises the dense compute function.

24. The method of claim 23, wherein the dense compute function comprises one of a convolution, fast Fourier transform (FFT), or general matrix multiply (GeMM) function.

25. The method of claim 20, further comprising:

queuing the offload request in a hardware-implemented offload queue;

determining that resources of the particular dense compute core are available to perform the portion of the workload;

launching performance of the portion of the workload by the particular dense compute core;

monitoring, in hardware of the particular dense compute core, status of the performance of the portion of the workload; and sending an acknowledgement to the particular sparse compute core that the particular dense compute core is handling the portion of the workload.

* * * * *